United States Patent
Takahashi et al.

(10) Patent No.: US 6,330,050 B1
(45) Date of Patent: *Dec. 11, 2001

(54) IMAGE PROCESSING DEVICE FOR PROVIDING CORRECTION OF A CURVATURE DISTORTION OF A BOUND PORTION OF A SPREAD BOOK

(75) Inventors: Hiroshi Takahashi; Hiroya Hata, both of Kanagawa; Koichi Noguchi, Tokyo, all of (JP)

(73) Assignee: Ricoh Company, LTD, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,116

(22) Filed: Jul. 24, 1998

(30) Foreign Application Priority Data

| Jul. 24, 1997 | (JP) | 9-198161 |
| Jul. 24, 1997 | (JP) | 9-198648 |
| Jul. 24, 1997 | (JP) | 9-198649 |
| Jul. 24, 1997 | (JP) | 9-198650 |

(51) Int. Cl.[7] .......................... G03B 27/32; G03B 27/58; G03B 27/68; G03G 15/00
(52) U.S. Cl. ................. 355/25; 355/47; 355/52; 399/362
(58) Field of Search .................... 358/296, 452, 358/453, 474, 450, 488; 399/362, 187; 355/25, 82, 47, 52; 250/208.1

(56) References Cited

U.S. PATENT DOCUMENTS

| 5,585,926 | * | 12/1996 | Fujii et al. | 358/471 |
| 5,654,807 | * | 8/1997 | Miyaza | 358/450 |
| 5,751,446 | * | 5/1998 | Fujioka | 358/474 |
| 5,790,262 | * | 8/1998 | Kanno | 358/296 |
| 5,835,241 | * | 11/1998 | Saund | 358/488 |
| 5,886,342 | * | 3/1999 | Matsui | 250/208.1 |
| 6,111,667 | * | 8/2000 | Mishima et al. | 358/488 |

* cited by examiner

*Primary Examiner*—Russell Adams
*Assistant Examiner*—Peter B. Kim
(74) *Attorney, Agent, or Firm*—Oblon, Spivak, McClelland, Maier & Neustadt, P.C.

(57) ABSTRACT

An image processing device for processing an image read by an image scanner or similar image reading device is disclosed. The image processing device is capable of accurately detecting, without resorting to a range finding sensor or similar special sensing means, the bound portion of a spread book by recognizing the configuration of the bound portion out of a read image, and thereby accurately correcting the distortion of the portion of the image representative of the bound portion.

51 Claims, 49 Drawing Sheets

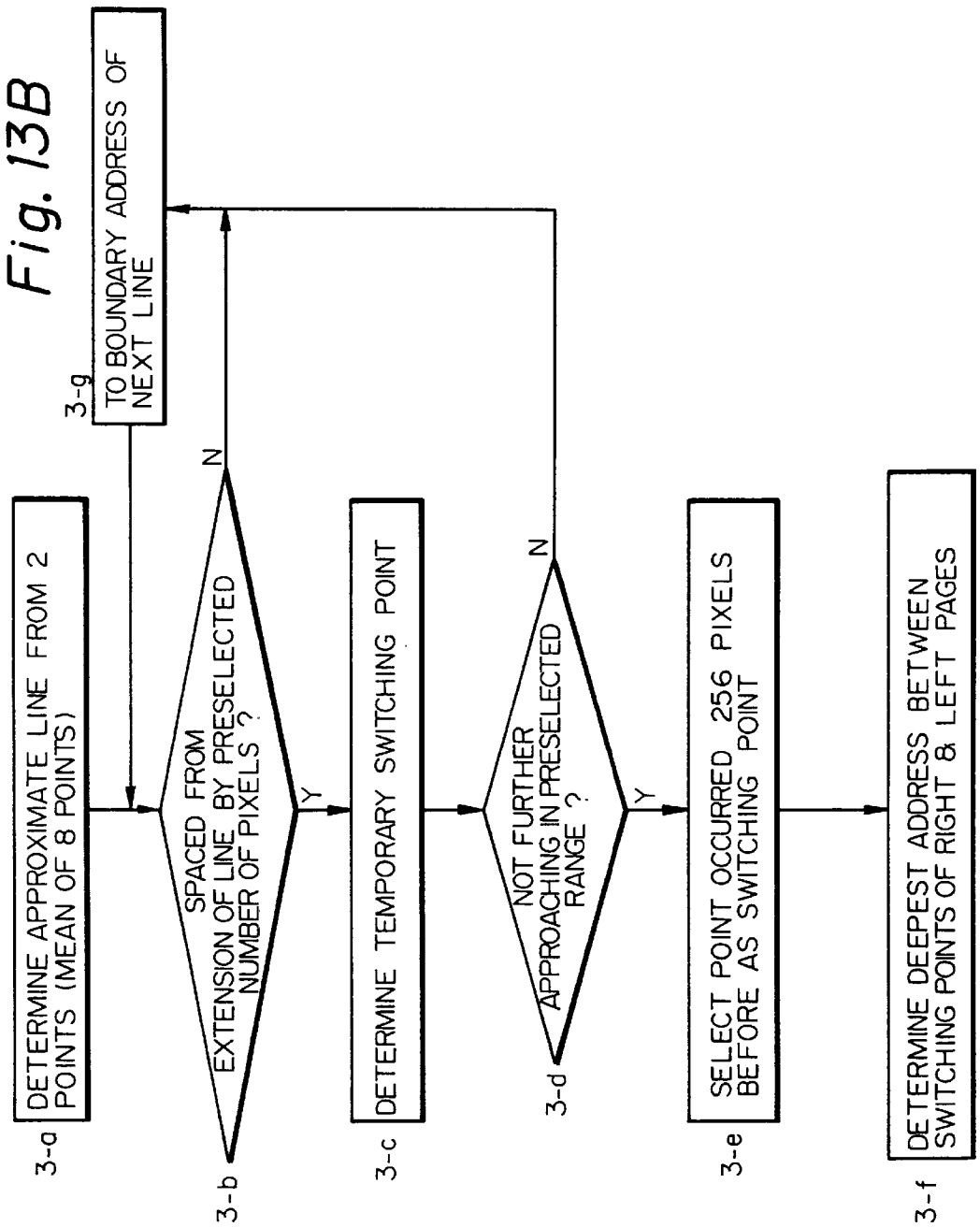

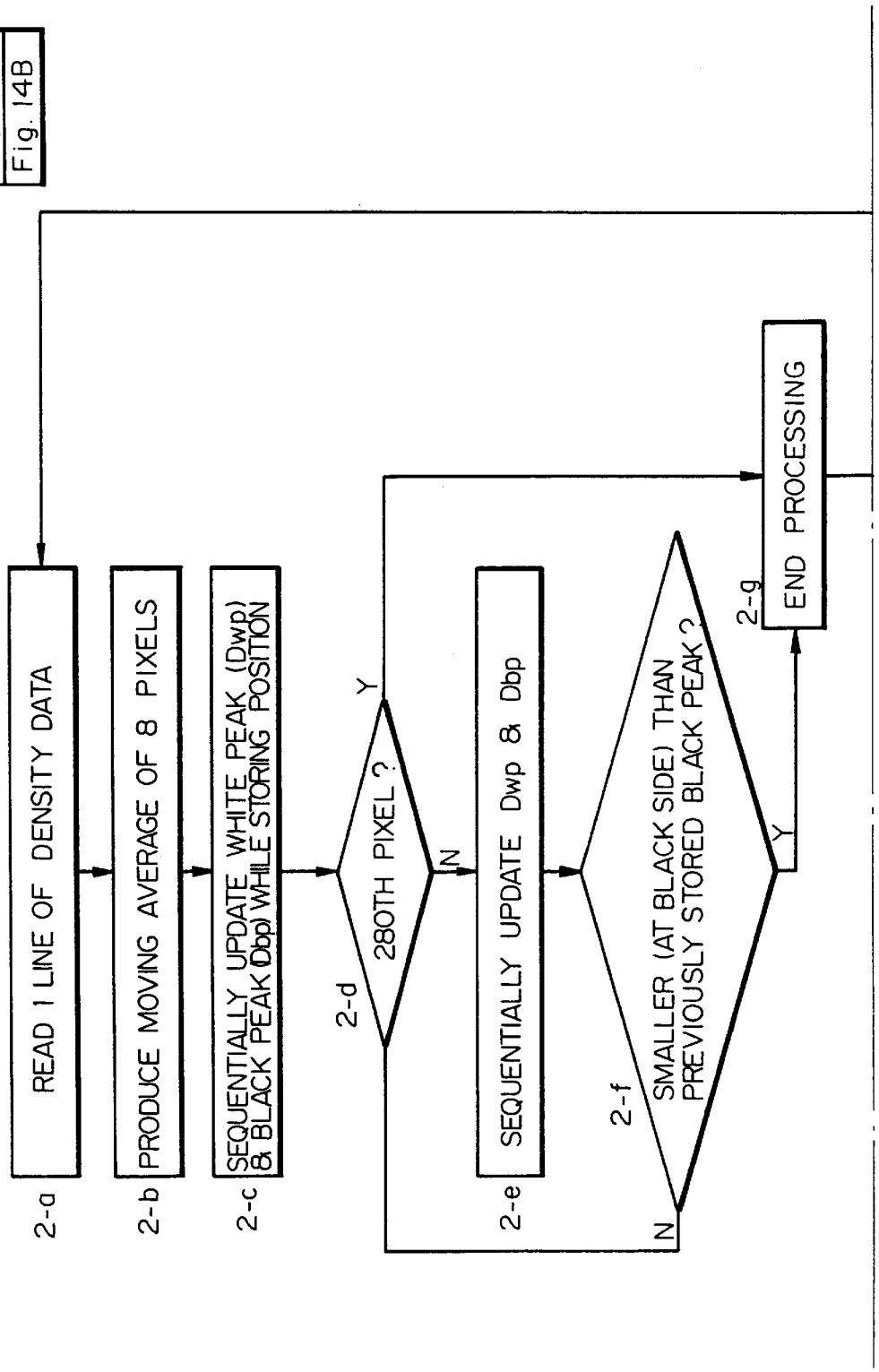

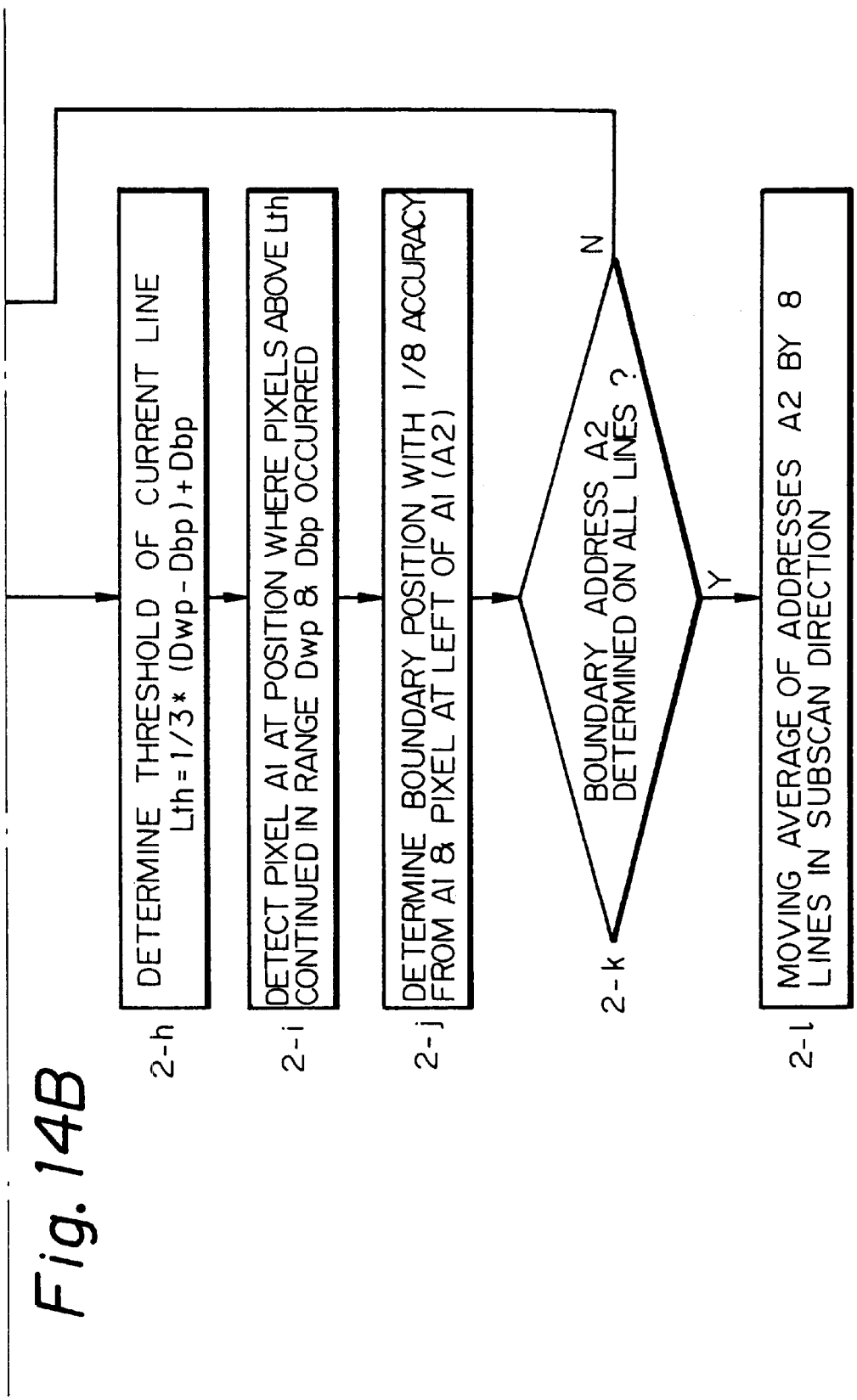

$$Eq \quad \frac{N1+N2+N3+N4+x+N5+N6+N7}{8}$$

Fig. 62

RESULTS OF MEASUREMENT (%)                                   +:INCREASING

| MEASURED POSITION | ABOVE (BOUNDARY SIDE) | | BELOW (OPPOSITE SIDE) | |
|---|---|---|---|---|
| RIGHT & LEFT PAGES | RIGHT PAGE | LEFT PAGE | RIGHT PAGE | LEFT PAGE |
| DEPTH 10mm | -1.8 | -1.8 | -5.3 | +1.8 |
| DEPTH 25mm | +12.3 | +14.0 | -10.5 | — |

Fig. 63

RESULTS OF MEASUREMENT (mm)                                  +:BROADENING

| MEASURED POSITION | ABOVE (BOUNDARY SIDE) | | BELOW (OPPOSITE SIDE) | |
|---|---|---|---|---|
| RIGHT & LEFT PAGES | RIGHT PAGE | LEFT PAGE | RIGHT PAGE | LEFT PAGE |
| DEPTH 10mm | +0.13 | +0.13 | -0.19 | +0.19 |
| DEPTH 25mm | +0.25 | +0.38 | -0.69 | +0.93 |

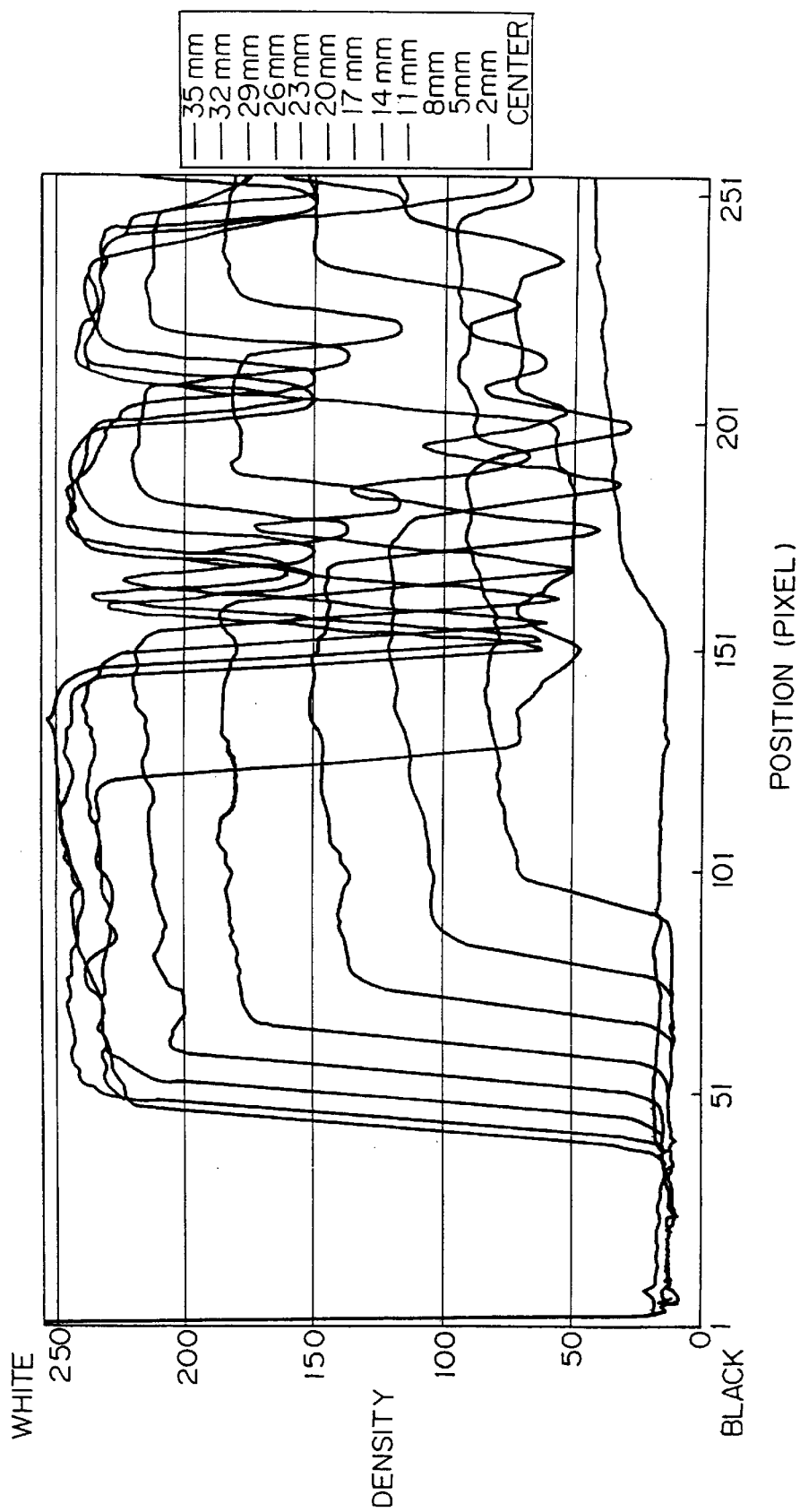

IMAGE PROCESSING DEVICE FOR PROVIDING CORRECTION OF A CURVATURE DISTORTION OF A BOUND PORTION OF A SPREAD BOOK

BACKGROUND OF THE INVENTION

The present invention relates to an image processing device for use in a copier, printer or similar image forming apparatus and, more particularly, to an image processing device for processing an image read by an image scanner or similar image reading device.

The problem with a copier, printer or similar image forming apparatus with an image scanner is that when the scanner scans a spread book document, the bound portion of the book rises above a glass platen, i.e., away from the focal plane of the scanner. As a result, the image of the bound portion is distorted, shadowed, blurred or otherwise deteriorated, as well known in the art. This is particularly true with a relatively thick book document. The operator therefore must press the bound portion of the spread book document against the glass platen, sometimes damaging the bound portion. When the spread book document is read by a flat bed type scanner customarily with a copier, the image of the bound portion of the document is distorted, shadowed, blurred or otherwise deteriorated.

Japanese Patent Laid-Open Publication No. 60-65668 teaches an image processing device capable of reproducing a distortion-free image. The device taught in this document measures the length of a spread book in the subscanning direction, determines the radius of curvature of the bound portion of the book, and then executes processing with a deformed image. Japanese Patent Laid-Open Publication No. 60-65669 proposes an image processing device capable of correcting the deformation of an image by determining, based on the radius of curvature of the bound portion of a spread book, a correction value in the main scanning direction, and correcting information representative of the bound portion with the correction value. These conventional devices both include means for correcting the distortion of the portion of a read image representative of the bound portion in the main and subscanning directions. In any case, the configuration of the bound portion is determined in terms of a radius r on the basis of the length of the document and the actual length.

Japanese Patent Laid-Open Publication No. 58-130361 discloses an image reading device using a light-sensitive unit for reading the surface of a book or similar object having a substantial thickness. The distance between the light-sensitive unit and the object is measured in order to control the distance between the object and the light-sensitive unit or a lens. Japanese Patent Laid-Open Publication Nos. 61-171272, 61-237569 and 1-232872 teach a scanner and a reading device each including means for measuring the height of a document. This kind of scanner or reading device controls a relative speed between an image sensor and a document in accordance with the variation of the height of the document, thereby correcting the distortion of image data. These implementations each includes an extra sensor for measuring the distance to the surface of a document and moves it along the document.

Japanese Patent Laid-Open Publication No. 5-161000 proposes an image processing device including range finding means for determining distances to a plurality of points of a document, interpolating means for interpolating data representative of a document, and means for correcting the curvature of the book in response to the output of the interpolating means. Japanese Patent Laid-Open Publication No. 5-161001 discloses an image processing device including measuring means for measuring the configuration of a document, means for calculating an image extension rate pixel by pixel, and extending means for interpolating density to thereby extend pixels.

Japanese Patent Laid-Open Publication No. 5-161002 proposes an image processing device including measuring means for measuring the configuration of a document and means for correcting a curvature in the direction of lines (main scanning direction). This device corrects a curvature, corrects blurring, and then executes extension (subscanning direction). Japanese Patent Laid-Open Publication No. 5-161003 teaches an image processing device including boundary detecting means for detecting a boundary between a document and a glass platen, output detecting means for detecting an output at a point spaced from the boundary by a preselected distance, and means for correcting an output read.

Japanese Patent Laid-Open Publication No. 5-161004 discloses an image processing device including reading means for reading a document at a preselected distance from a glass platen, boundary detecting means for detecting a boundary between the document and the glass platen, height detecting means for determining the height of the document in response to the output of the boundary detecting means, and correcting means for executing correction in accordance with the output of the height detecting means. Japanese Patent Laid-Open Publication No. 6-164852 shows and describes an image processing device constructed to detect a boundary between a document and a glass platen, calculate a magnification change ratio (main scanning direction), and thereby correct the distortion of an image.

The above Laid-Open Publication Nos. 5-161003 and 5-161004, among others, each teaches an implementation for detecting a boundary between a document and a glass platen and thereby determining the height of the document so as to correct an image. Laid-Open Publication Nos. 5-16000, 5-161001, 1-161002, 5-161003, 5-161004 and 6-164852 deal with a spread book positioned face up.

The conventional image processing devices described above each includes means for correcting the portion of an image representative of the bound portion of a spread book in the main and subscanning directions. The correcting means translates the configuration of the bound portion to a radius r and determines the radius r on the basis of the length of the document and the actual length. This, however, brings about a problem that the distortion of the bound portion cannot be accurately corrected unless the bound portion is circular.

Laid-Open Publication Nos. 58-130361, 61-171272, 6-1237569 and 1-232872 each has a drawback that an extra sensor must be used and moved along a document in order to measure the distance to the document.

Further, Laid-Open Publication Nos. 5-161000, 5-161001, 5-161002, 5-161003, 5-161004 and 6-164852 dealing with a spread document positioned face up have the following problems. Because the spread book positioned face up is curved over its entire surface, it is necessary to measure the height of the entire spread pages by the detection of a boundary, and then execute correction over the entire curved pages. Moreover, none of the above documents teaches a specific method for the detection of a page boundary.

SUMMARY OF THE INVENTION

It is therefore an object of the present invention to provide an image processing device capable of accurately detecting, without resorting to a range finding sensor or similar special sensing means, the bound portion of a spread book document by recognizing the configuration of the bound portion out of a read image, and thereby accurately correcting the distortion of the portion of the image representative of the bound portion.

It is another object of the present invention to provide an image processing device capable of restoring, without resorting to a range finding sensor or similar special sensing means, a curved document to a flat document by image processing on the basis of the configuration of the bound portion of a book document.

In accordance with the present invention, an image processing device includes a reading section for reading the image of a spread book, a recognizing section for recognizing the configuration of the spread book, a separating section for separating, based on data output from the reading section, the bound portion of the spread book between page portions, and a correcting section for correcting, based on the configuration of the spread book recognized, the distortion of an image representative of the bound portion.

Also, in accordance with the present invention, an image processing device includes a reading section for reading the image of a spread book, a boundary reading section for reading the page boundary of the spread book, a page boundary recognizing section for recognizing, based on read data output from the boundary reading section, the configuration of the page boundary, a book recognizing section for recognizing the configuration of the spread book on the basis of the configuration recognized by the page boundary recognizing section, and a correcting section for correcting, based on the configuration of the spread book recognized, the distortion of an image representative of the bound portion of the spread book.

Further, in accordance with the present invention, an image processing device includes a reading section for reading the image of a spread book, a separating section for separating the bound portion of the spread book with respect to image processing, a book recognizing section for recognizing the configuration of the spread book, and a correcting section for correcting the image of the spread book in accordance with the configuration of the spread book recognized.

BRIEF DESCRIPTION OF THE DRAWINGS

The above and other objects, features and advantages of the present invention will become apparent from the following detailed description taken with the accompanying drawings in which:

FIGS. 13A and 13B are flowcharts each showing a particular procedure for switching (detecting) the straight line and bound portion of a spread book and a switching point detection range and executed by the illustrative embodiment;

FIG. 14 is a flowchart showing how the illustrative embodiment recognizes a configuration by detecting boundaries;

FIG. 62 shows magnification errors particular to the illustrative embodiment;

FIG. 63 shows bends in the subscanning direction particular to the illustrative embodiment;

FIG. 65 shows the density distribution of the data achievable with the illustrative embodiment by eight-pixel moving averages.

DESCRIPTION OF THE PREFERRED EMBODIMENTS

Figure 59:
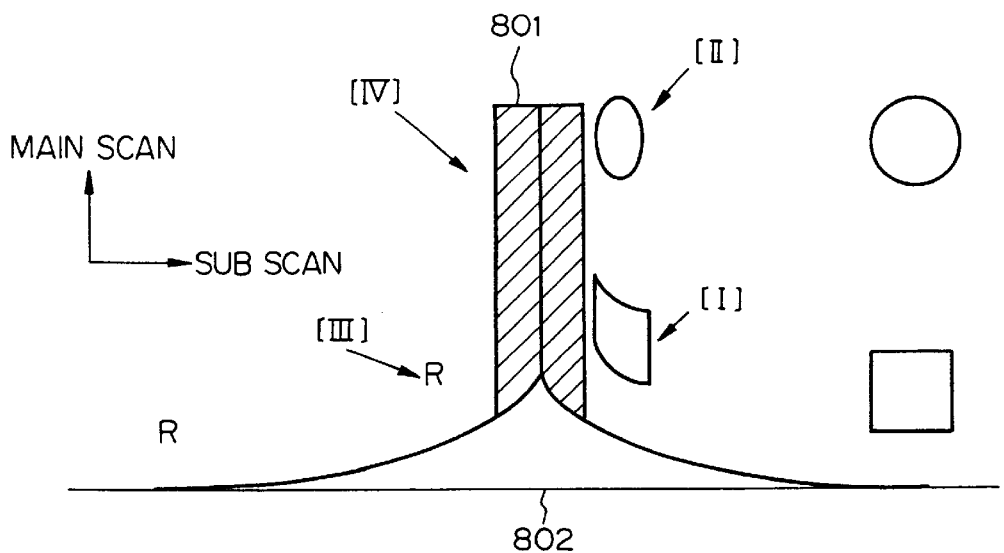
FIG. 59 is a front view showing a spread book laid on a glass platen.

Referring to FIG. 59, a book or similar bound document (book hereinafter) 801 loaded on a glass platen 802 is shown. The problem with a conventional copier, printer or similar image forming apparatus is that when an image scanner scans the book 801, the bound portion of the book 801 rises above the table 802, i.e., away from the focal plane of the scanner. As a result, the image of the bound portion is distorted, shadowed, blurred or otherwise deteriorated. FIG. 59 shows specifically an image [I] reduced in size in the main scanning direction (characters and lines are bent), an image [II] reduced in size in the subscanning direction (characters are defaced), an image [III] out of focus (characters are defaced), and an image [IV] shadowed (background is contaminated).

Figure 24:
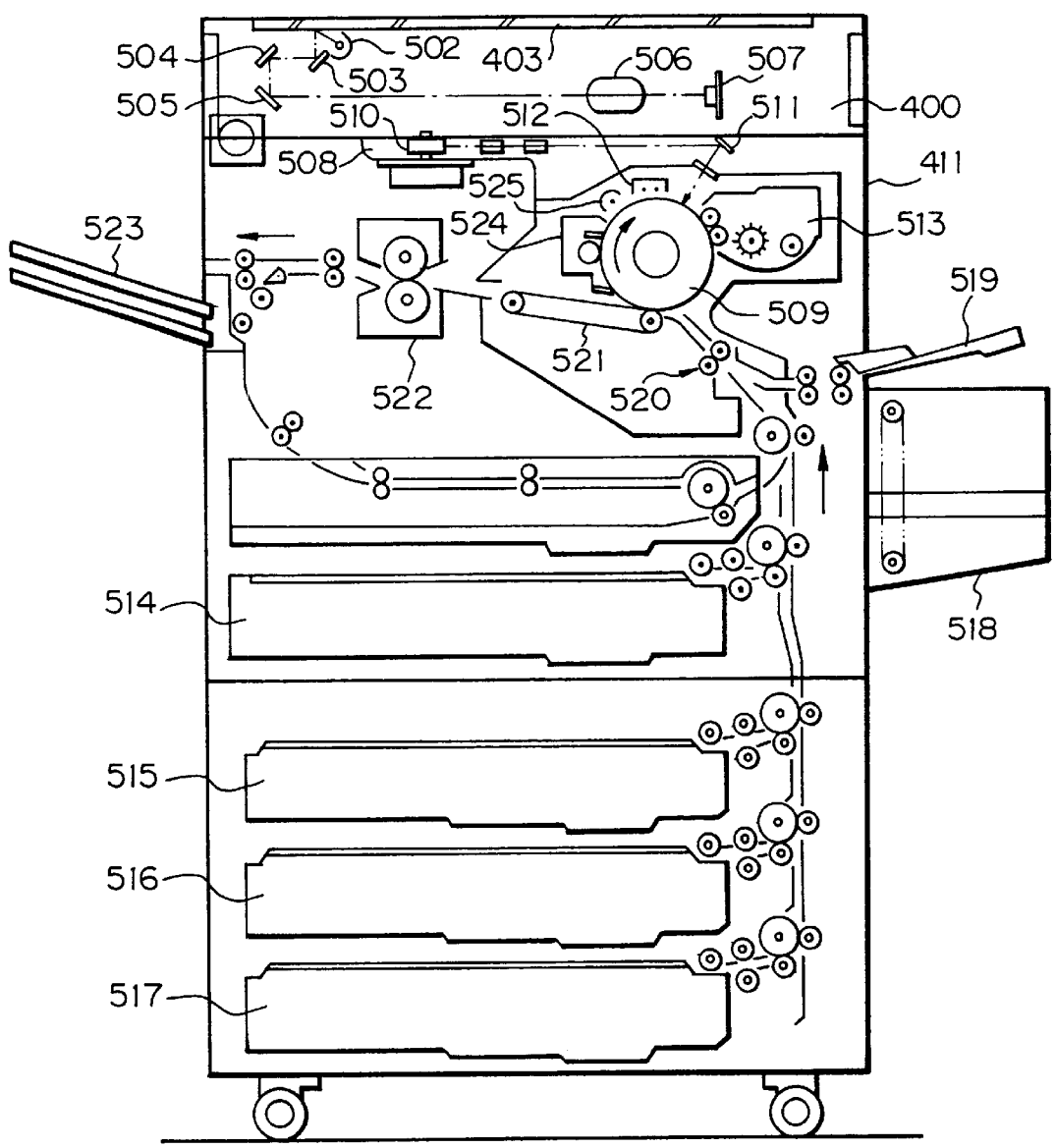
FIG. 24 is a section showing the general construction of an image forming apparatus to which the illustrative embodiment is applied.

FIG. 24 shows an image forming apparatus to which an image processing device embodying the present invention is applied. As shown, the image forming apparatus is implemented as a digital copier by way of example and includes a scanner or image reading unit 400. An image recording device 411 constitutes an image forming section and is implemented by a laser printer. The scanner 400 includes a flat glass platen 403 to be loaded with a book or a sheet document, as desired. While a lamp 502 illuminates the document, the resulting reflection from the document is incident to an image sensor 507 via a group of mirrors 503–505 and a lens 506. The lamp 502 and mirrors 503–505 are moved to read image information out of the document. As a result, the image sensor 507 outputs an electric image signal representative of the document. The image signal is sent to the image reading device (printer hereinafter) 411 via circuitry which will be described later.

The printer 411 includes an optical writing unit 508 playing the role of exposing means. The writing unit 508 transforms the image signal to an optical signal and exposes an image carrier 509 therewith. In the illustrative embodiment, the image carrier 509 is implemented as a photoconductive drum. Specifically, the writing unit 508 causes a drive controller to drive a semiconductor laser with the image signal, so that the laser emits a laser beam modulated in intensity by the image signal. The laser beam scans the drum 509 via an f-theta lens and a mirror 511 while being steered by a polygonal mirror 510.

While the drum 509 is rotated clockwise, as indicated by an arrow in FIG. 24, a charger 512 uniformly charges the surface of the drum 508. The writing unit 509 scans the charged surface of the drum 509 with the laser beam so as to electrostatically form a latent image on the drum 509. A developing unit 513 develops the latent image to produce a corresponding toner image. A paper or similar recording medium is fed from any one of a plurality of paper cassettes 514–518 and a manual feed section 519 to a registration roller pair 520.

The registration roller pair 520 drives the paper in synchronism with the rotation of the drum 509 carrying the toner image thereon. A transfer belt 521 conveys the paper while being applied with a transfer bias from a transfer power source, so that the toner image is transferred from the drum 509 to the paper. The paper with the toner image is conveyed to a fixing unit 522 by the transfer belt 521 and has the toner image fixed by the fixing unit 522. Finally, the paper is driven out to a tray 523 as a hard copy. After the image transfer, the drum 509 is cleaned by a cleaning unit 524 and then discharged by a discharger 525 to prepare for the next image formation.

Figure 2:
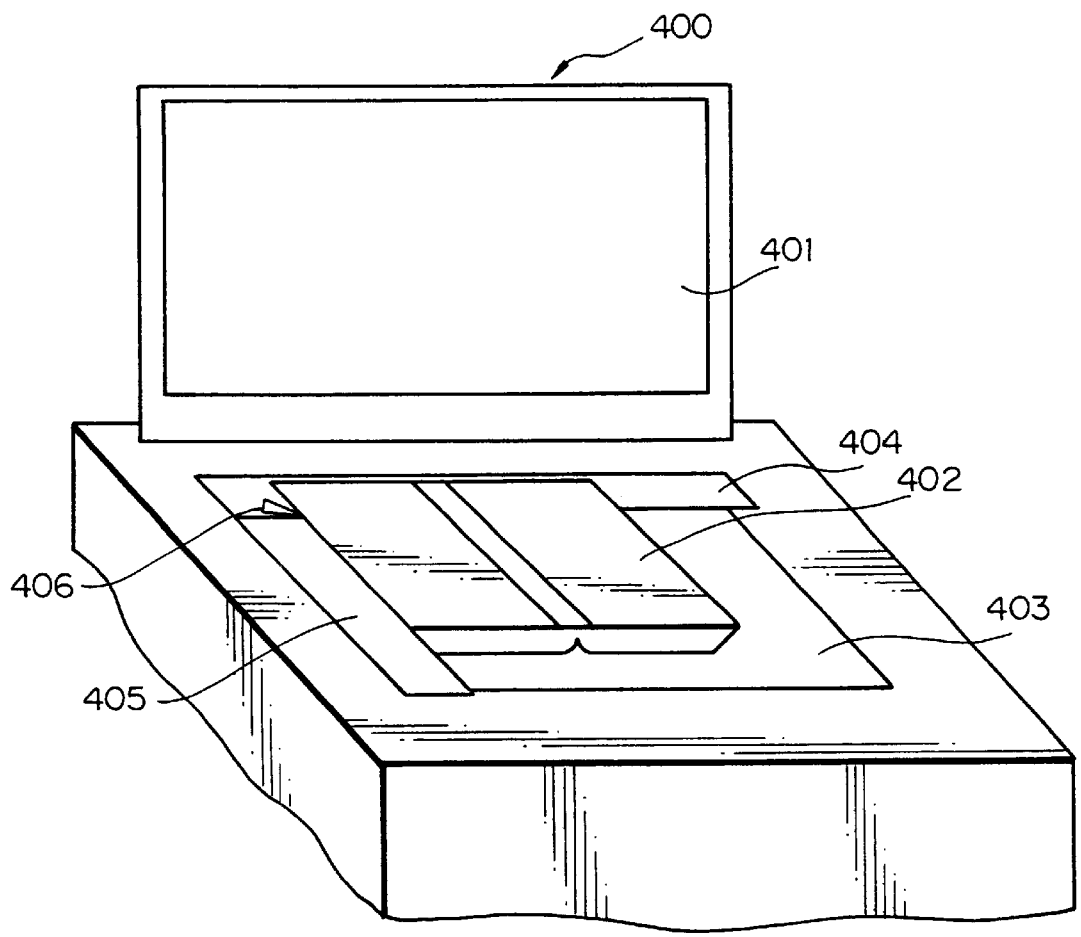
FIG. 2 is an external perspective view showing a scanner included in the illustrative embodiment.

As shown in FIG. 2, the scanner 400 is a flat bed type scanner customary with an image forming apparatus. The printer 411 is positioned below the scanner 400. To allow the scanner 400 to read a book 402, the operator opens a cover plate 401 away from the glass platen 403, spreads the book 402 to show a desired page, and lays the spread book 402 on the glass platen 403 face down. In the illustrative embodiment, the book 402 is positioned with its left back corner 406 used as a reference. The operator therefore positions the book 402 such that the back edge and left edge of the book 402 abut against scales 404 and 405, respectively. The scales 404 and 405 are higher in level than the glass platen 403 so as to facilitate the setting of the book 402. When the book 402 is relatively thick, the operator sometimes presses it against the glass platen 403 for the faithful reproduction of the bound portion of the document 402. The cover plate 401 is therefore often held open while the book 402 is read.

When the operator inputs a read command on an operation panel, the book 402 laid on the glass platen 403 begins to be read. The underside of the scale 404 contacting the back edge of the book 402 is painted black so as to be readily distinguished from the book 402 with respect to density.

Figure 3:
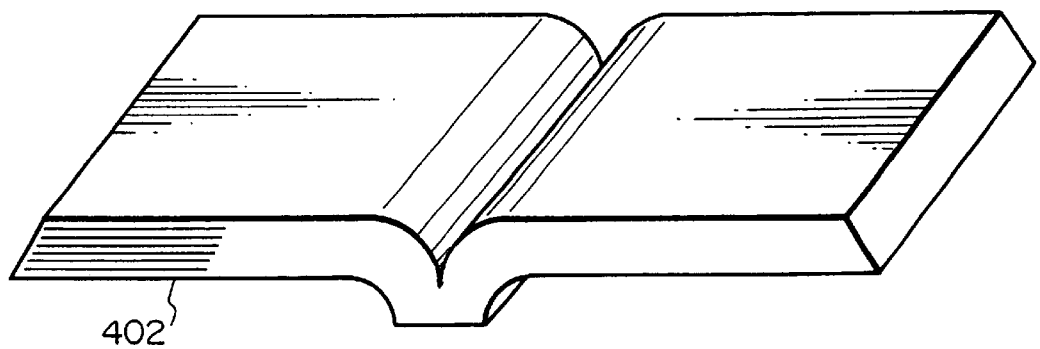
FIG. 3 is a perspective view showing a general book document in its spread position.
Figure 4:
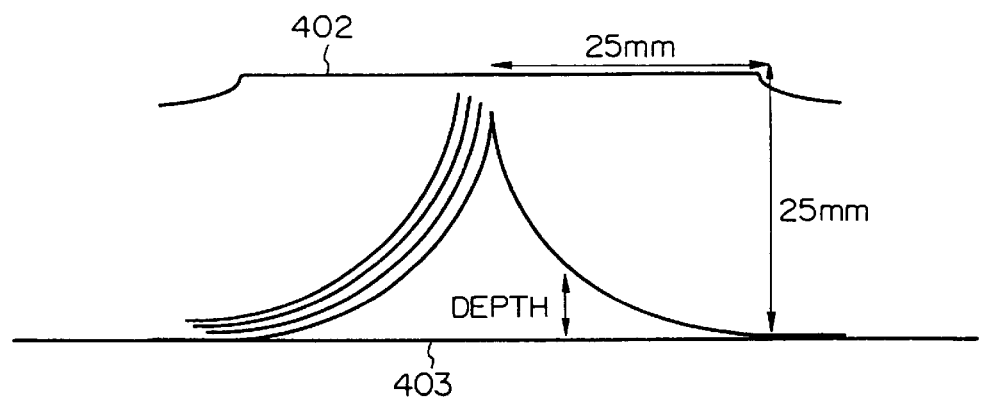
FIG. 4 is a front view showing an about 5 mm thick book document laid on the glass platen of the scanner by being opened at or around its intermediate page.
Figure 5:
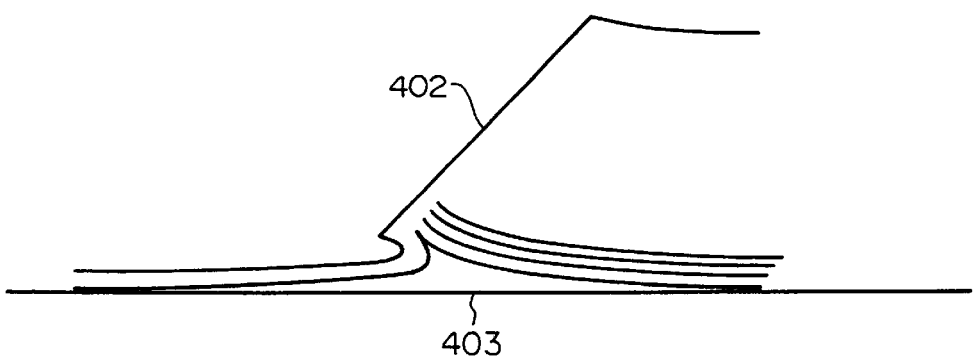
FIG. 5 is a view similar to FIG. 4, showing the book spread at its first page.

FIG. 3 shows the book 402 spread and positioned face up. FIGS. 4 and 5 each shows, in a front view, the bound portion of the spread document 402 laid on the glass platen 403 of the flat bed type scanner face down. FIG. 4 shows the book 402 which is about 5 mm thick and spread at or around its intermediate page and laid on the glass platen 403. Generally, in the condition shown in FIG. 4, the bound portion of the spread book 402 has the greatest depth, i.e., the greatest height above the glass platen 403. FIG. 5 shows the book 402 having the same thickness, but laid on the glass platen 403 with its first page opened; the bound portion of the book 402 is out of balance. This is also true when the book 402 is laid on the glass platen 403 with its last page opened although the configuration will be opposite to the configuration of FIG. 5 in the right-and-left direction.

Figure 6:
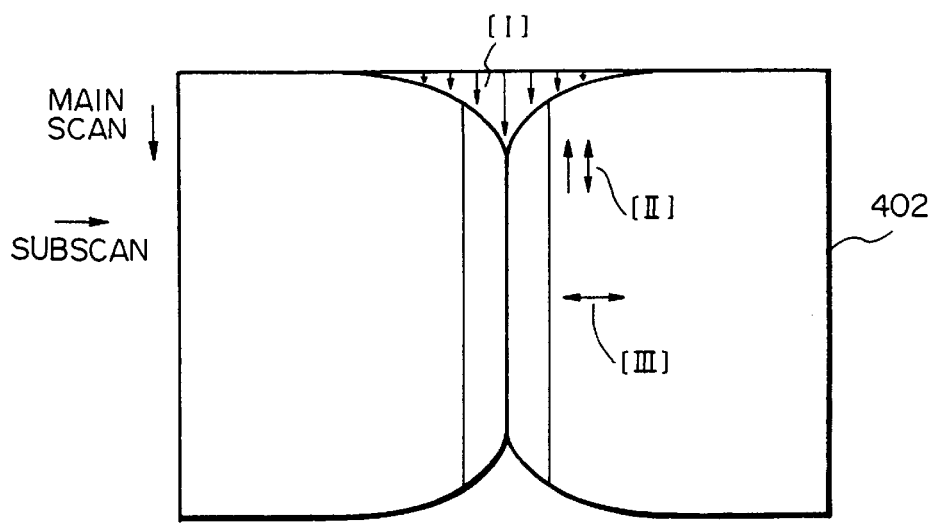
FIG. 6 demonstrates image processing particular to the illustrative embodiment.

As shown in FIG. 6, in the illustrative embodiment, there is executed bound portion correction processing including [I] recognition of the configuration of the bound portion, [II] restoration in the main scanning direction, and [III] restoration in the subscanning direction. To recognize the configuration of the bound portion, the position of a page boundary at the back side of the book 402 on the glass platen 403 is determined on the basis of image data output from the scanner 400. Specifically, the position of the page boundary is read on the basis of the black portion of the scale 404 or the black portion of the space below the open cover plate 401, so that the white background of the page of the book 402 is identified.

For the restoration in the main scanning direction, the image is shifted to a preselected position in the main scanning direction by pixel correction such that the page boundary is positioned horizontally in a page portion where the page of the book 402 is flat. For the bound portion where the page is curved, the image is extended by pixel correction. For the restoration in the subscanning direction, the image is extended at the bound portion by pixel correction, but not processed in the page portion.

Figure 1:
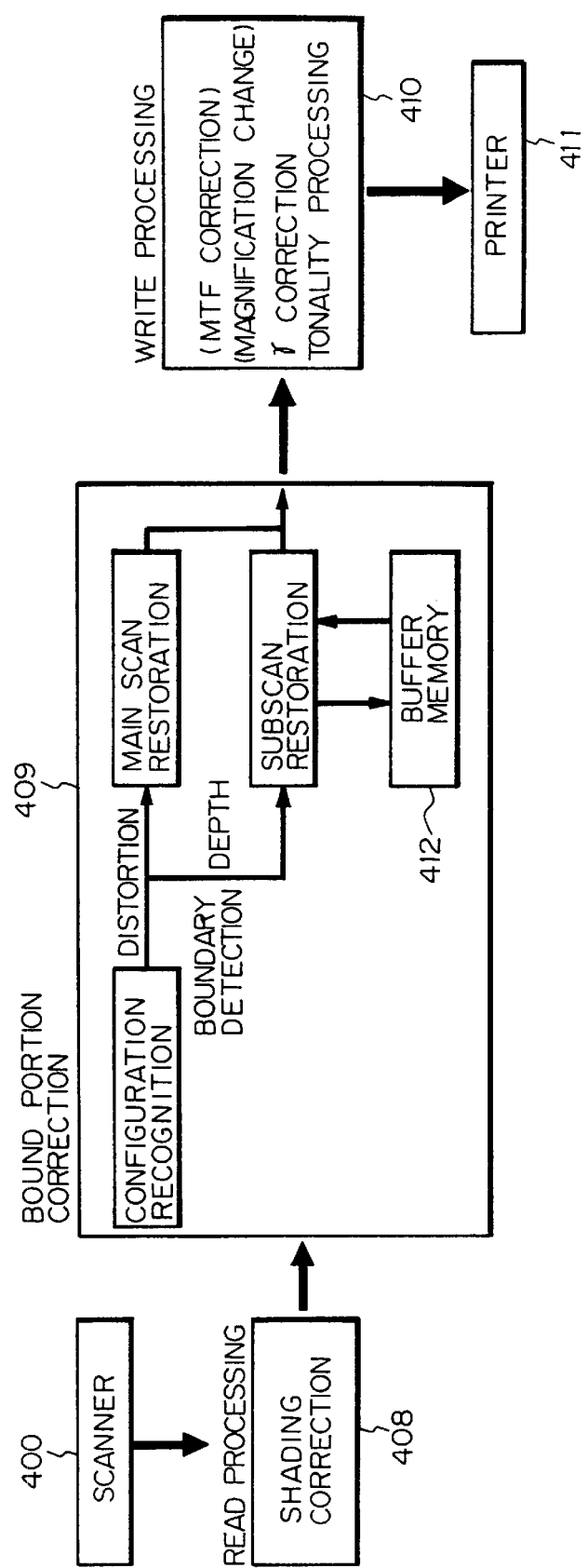
FIG. 1 is a block diagram schematically showing the flow of image data and image processing representative of a preferred embodiment of the present invention.

FIG. 1 shows the flow of image data and image processing particular to the illustrative embodiment. As shown, the image data output from the scanner 400 are transferred to the printer 411 via read processing means 408, bound portion correcting means 409, and write processing means 410. The read processing means 408, bound portion correcting means 409 and write processing means 410 may be implemented as a microcomputer by way of example.

Figure 7:
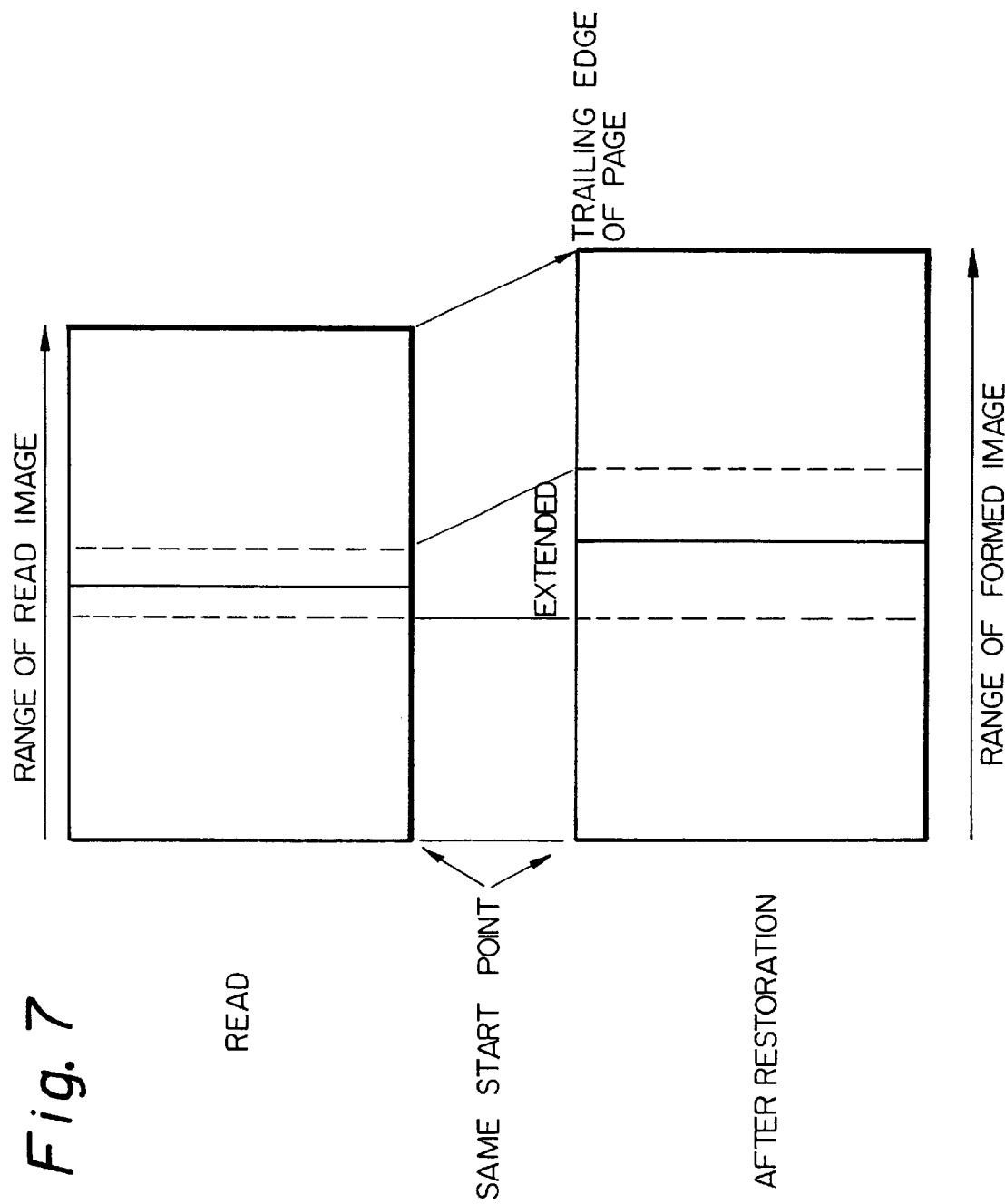
FIG. 7 is a plan view showing a document image read and a document image subjected to restoration processing by the illustrative embodiment.

The read processing means 408 executes shading correction with the image data having eight bits for a pixel. The bound portion correcting means 409 executes correction relating to the bound portion (recognition of the configuration and restoration in the main and subscanning directions). Generally, the image of the spread book 402 is reduced in length due to the curvature of its bound portion. Therefore, such an image is different in length from a printed image undergone restoration, i.e., a true page image. FIG. 7 shows an image read by the scanner 400 and an image extended by the restoration.

During copying, the document 402 is read and printed at the same time by real-time processing. As shown in FIG. 1, the bound portion correcting means 409 includes a buffer memory 412 for the restoration in the subscanning direction. The buffer memory 412 implements a delay corresponding to the extension of the image. Specifically, the buffer memory 412 is a multilevel memory allowing an image to be extended by a width of 28.5 mm and has a capacity of 4.8 megabytes. The image data processed by the read processing means 408 are once written to the buffer memory 412, subjected to bound portion correction for extending the image, and then transferred to the write processing means 410 in synchronism with the writing operation. Consequently, the operation of the printer 411 completes later than the end of book reading by a period of time corresponding to the extension of the image.

The write processing means 410 enlarges or reduces the corrected image data output from the bound portion correcting means 409 in accordance with a desired mode, and executes MTF (Modulation Transfer Function) processing based on image file processing. Subsequently, the processing means 410 executes gamma correction matching with the density reproducibility of the printer 411 and tonality processing based on a text mode or a photo mode. The image data output from the write processing means 410 are fed to the printer 411.

How the bound portion correcting means 409 recognizes the configuration of the bound portion on the basis of the page boundary will be described hereinafter. For the detection of the page boundary, the following schemes (A)–(G) may be suitably combined.

(A) Before the identification of the page boundary, the correcting means 409 produces a moving average of, among the image data output from the read processing means 408, a plurality of pixels, e.g., eight pixels in the main scanning direction. With the moving average, the correcting means 409 calculates an accurate page boundary portion against the irregularity of image density. Because circuitry for producing moving averages is simple, it is comparable with a smoothing filter used to smooth a density distribution.

(B) The correcting means 409 searches for, in the image data received from the read processing means 408 and stored in the memory, a peak density representative of a page boundary and an address indicative of the page boundary position over thirty pixels to 280 pixels in the main scanning direction line by line. Specifically, the correcting means 409 compares the image data with a threshold value over 30 pixels to 280 pixels in the main scanning direction line by line. The correcting means 409 calculates the position of the page boundary portion from data representative of the page, data representative of the glass platen 403, and data representative of the space below the open cover plate 401. This makes it needless for the correcting means 409 to search for a page boundary at needless portions and thereby realizes accurate and rapid page boundary detection. The scanner 400 reads the spread pages of the book 402, glass platen 403, and space below the open cover plate 401 and constitutes document reading means and page boundary reading means.

The correcting means 409 is free from erroneous page boundary detection because it searches for a page boundary within a range where high density image data derived from the glass platen 403 and space and low density image data derived from the page have appeared. Because the correcting means 409 detects a page boundary on the basis of the end of the range where high density image data have occurred, i.e., the end of the space, the detection is not effected by dust and smears which may be present on the glass platen 403. Also, because the processing means 409 detects a page boundary on the basis of the range where low density image data have occurred, i.e., the frame of a page, the detection is effective when characters and patterns are present on a page.

(C) Assume a line above or below the page boundary of the book 402. Then, the correcting means 409 determines an adaptive threshold value for each read line by using, among image density data representative of a line perpendicular to the above line, pixel data at the high density side and pixel data at low density side. For the line-by-line adaptive threshold value, use is made of the pixel data at the high density side and the pixel data at the low density side in a ratio of 1:2 or thereabound. The adaptive threshold value allows a page boundary position to be determined over the entire bound portion, i.e., from the shallow portion to the deepest portion.

(D) When a plurality of pixels, e.g., seven pixels above the threshold appear continuously, the correcting means 409 determines that a boundary position has been reached and thereby obviates erroneous detection. This is particularly effective when dust and smears are present on the glass platen 403 and introduce noise in the density of the image data.

(E) The correcting means 409 linearly interpolates a density distribution with the density data of nearby pixels at a point intersecting the threshold, and thereby calculates a page boundary position by use of a unit smaller than the minimum pixel (e.g. ⅛ pixel). This successfully realizes the shift and extension of an image with high image quality by using the boundary position data. Resolution of one pixel would result in jagged rules and other defective images after restoration because one pixel is ¹⁄₁₆ millimeter for 400 dpi (dots per inch).

(F) The correcting means 409 produces the moving average of boundary position data calculated. With the moving average, it is possible to uniform the boundary position data in the subscanning direction and thereby reduce irregularity in the arrangement of page boundary positions. Generally, the boundary portions of spread pages are free from sharp variation. The moving average implements a smooth boundary arrangement comparable with the true page boundary. Restoration based on such a smooth boundary arrangement insures an accurate restored image.

(G) On detecting a page image region, the correcting means 409 ends detecting a page boundary. Specifically, the correcting means searches for page boundary positions within a range in which, among the density data of a read line perpendicular to a line above or below the page boundary, pixel data at the high density side and pixel data at the low density side have occurred, but a page image region is not detected. This obviates erroneous boundary position detection ascribable to characters or patterns existing in the page. More specifically, the correcting means 409 detects the peak of, among the above density data, the pixel data at the high density side, detects image data above the detected peak at the low density side, and then detects a pixel above the peak at the high density side, thereby detecting a page image region.

Figure 15:
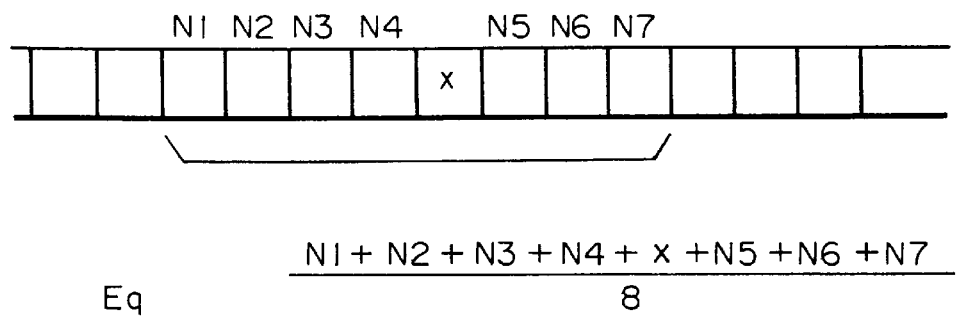
FIG. 15 is a graph showing the moving average of image data particular to the illustrative embodiment.

Referring to FIG. 14, how the bound portion correcting means 409 recognizes the configuration of a bound portion on the basis of a page boundary will be described. First, the correcting means 409 reads one line of image density data out of the image file (frame memory) storing the image data output from the scanner 400 (step 2-*a*). Then, the correcting means 409 produces a moving average of eight pixels in the main scanning direction, i.e., a pixel being observed, four pixels preceding it, and three pixels following it (step 2-*b*). Specifically, as shown in FIG. 15, the correcting means 409 produces a moving average of a pixel X being observed, four preceding pixels N1–N4 (left-hand side), and three following pixels N5–N7 (right-hand side) and substitutes the average for the density data of the pixel X:

$$\text{pixel } X = (N1+N2+N3+N4+X+N5+N6+N7)/8$$

The correcting means 409 repeats the above procedure with all of the one line of density data. Subsequently, the correcting means 409 searches for a white peak (Dwp) and a black peak (Dbp) in the one line of density data subjected to the above moving average processing, while sequentially updating their positions (steps 2-*c* through 2-*g*).

Figure 16:
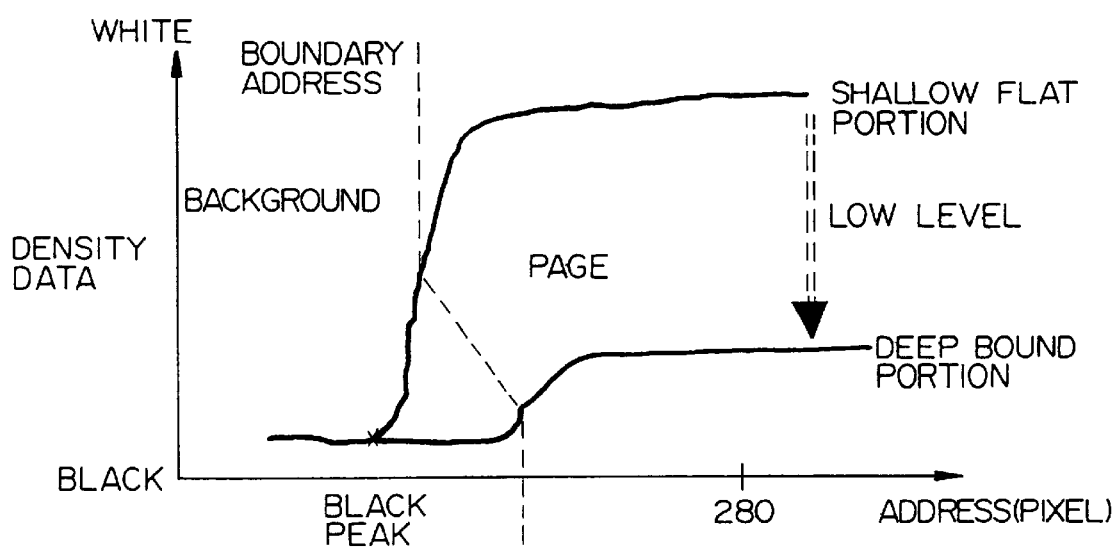
FIG. 16 is a graph showing data read by the illustrative embodiment.
Figure 17:
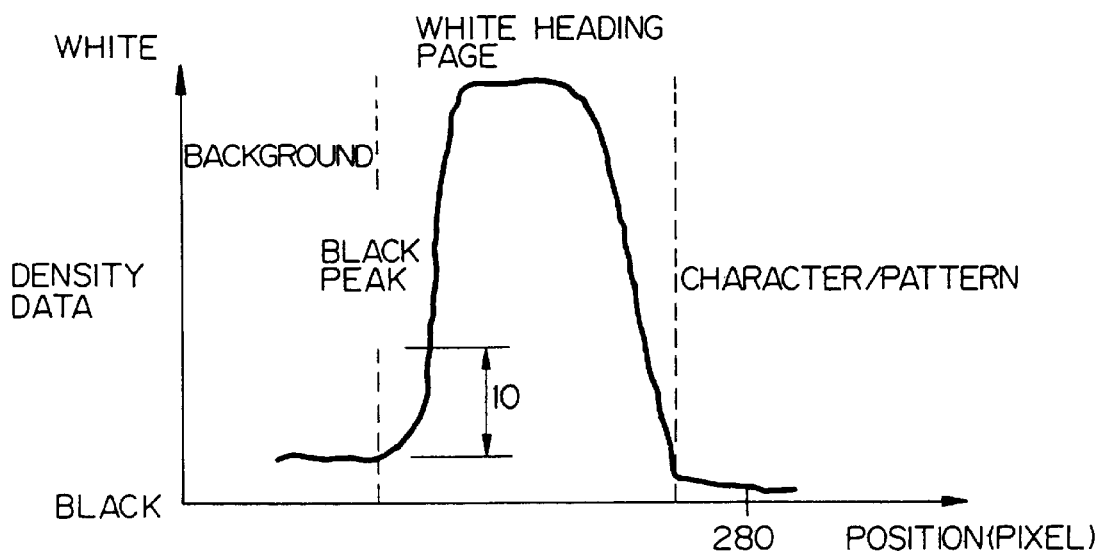
FIG. 17 shows how the illustrative embodiment detects the boundary of a page portion.

As shown in FIG. 16, the correcting means 409 stops updating the white peak and black peak at the 280th pixel and holds the positions of the white peak and black peak (steps 2-*d* and 2-*g*). As shown in FIG. 17 specifically, at the right-hand side of a position higher than a black peak toward the white side by a preselected level, e.g., level 10, there is another black peak which is short of the 280th pixel.

In the above condition, when the stored black peak has a smaller value (at the black side) than a black peak stored before the position higher than the above black peak by level 10, the correcting means 409 determines that the stored black peak is representative of an image portion, stops updating the white peak and black peak, and holds the existing white peak an black peak (steps 2-*f* and 2-*g*). Subsequently, the correcting means 409 calculates an adaptive threshold Lth line by line (step 2-*h*):

$$L_{th} = \tfrac{1}{3}*(Dwp-Dbp)+Dpb$$

Figure 18:
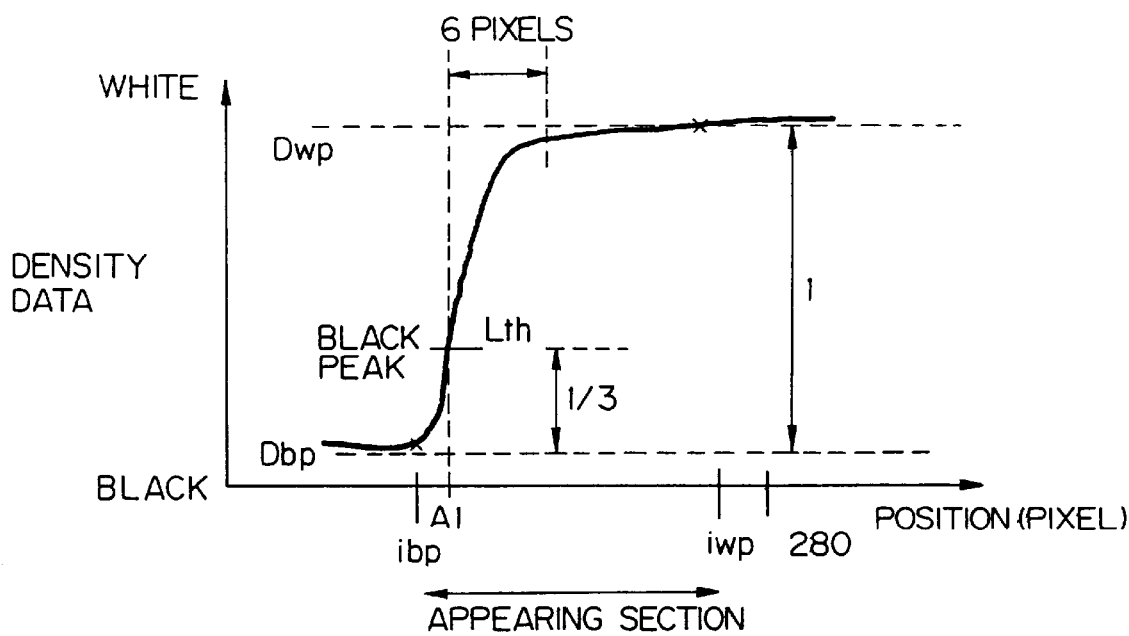
FIG. 18 shows an adaptive threshold particular to the illustrative embodiment.
Figure 19:
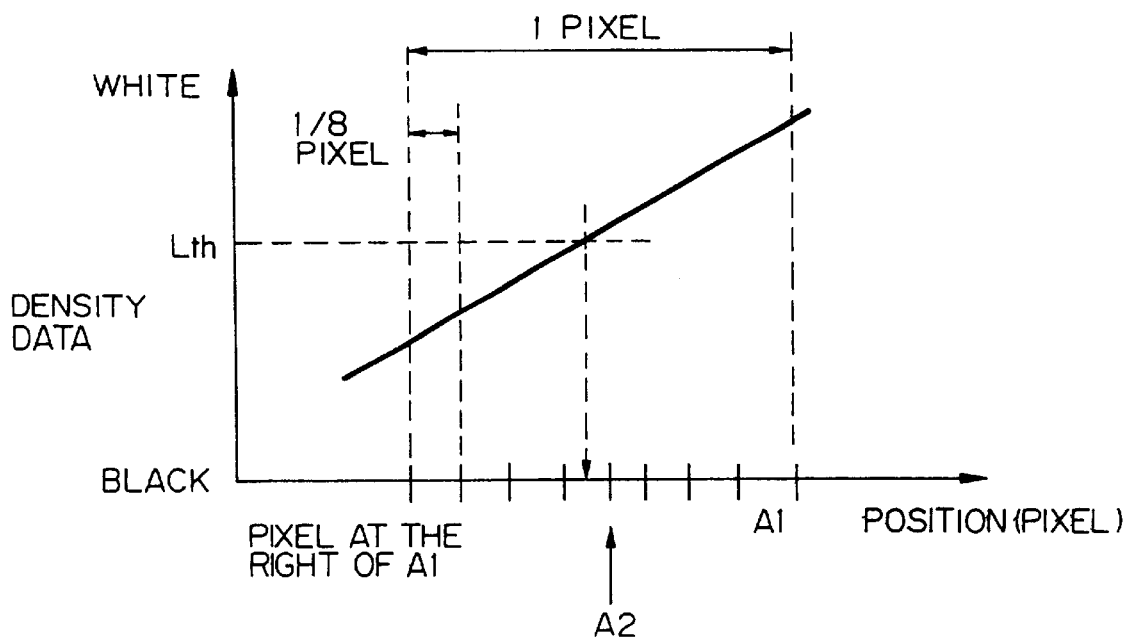
FIG. 19 shows a unit for the calculation of the page boundary particular to the illustrative embodiment.

The correcting means 409 compares with the adaptive threshold $L_{th}$ the one line of density data subjected to the moving average processing between the pixels where the white pixel (Dwp) and black peak (Dbp) respectively appeared. As shown in FIG. 18, the correcting means 409 determines the address A1 of the first one of seven consecutive pixels over which density data above the adaptive threshold $L_{th}$ continuously appear (step 2-*i*). In FIG. 18, ibp and iwp respectively indicate a black peak position and a white peak position. That is, the correcting means 409 selects, as the threshold $L_{th}$, a medium value dividing the range between the white peak (Dwp) and the black peak (Dbp) in a ratio of 1:2, and determines a portion where the following six consecutive pixels are above the threshold $L_{th}$ to be a boundary. As shown in FIG. 19, the correcting means 409 executes linear interpolation with the density data of the above pixel A1 and the density data of the pixel next to the pixel address A1 at the left-hand side, thereby determining a boundary address A2 with an accuracy of ⅛ pixel (step 2-*j*).

The correcting means 409 determines the above boundary address A2 for every line of the image (step 2-*k*). Next, the correcting means 409 produces a moving average of the boundary addresses A2 of eight consecutive lines in the subscanning direction, i.e., a line being observed, four preceding lines, and three following lines, and uses it as a boundary address A3 (step 2-*l*).

FIGS. 15–19 each plots a density distribution around the boundary address of one line in the main scanning direction. As shown in FIG. 16, at a shallow flat portion, a density difference between black representative of background and white representative of page is noticeable. By contrast, the above difference is small at the deep bound portion. This indicates that white cannot be sufficiently read at the boundary portion because it is remote from the glass platen 403. The page boundary is shifted to the right at the deep boundary portion than at the shallow flat portion. Stated another way, as regards the data stored in the memory, the bound portion appears to be smaller in scale than the flat portion.

Figure 8:
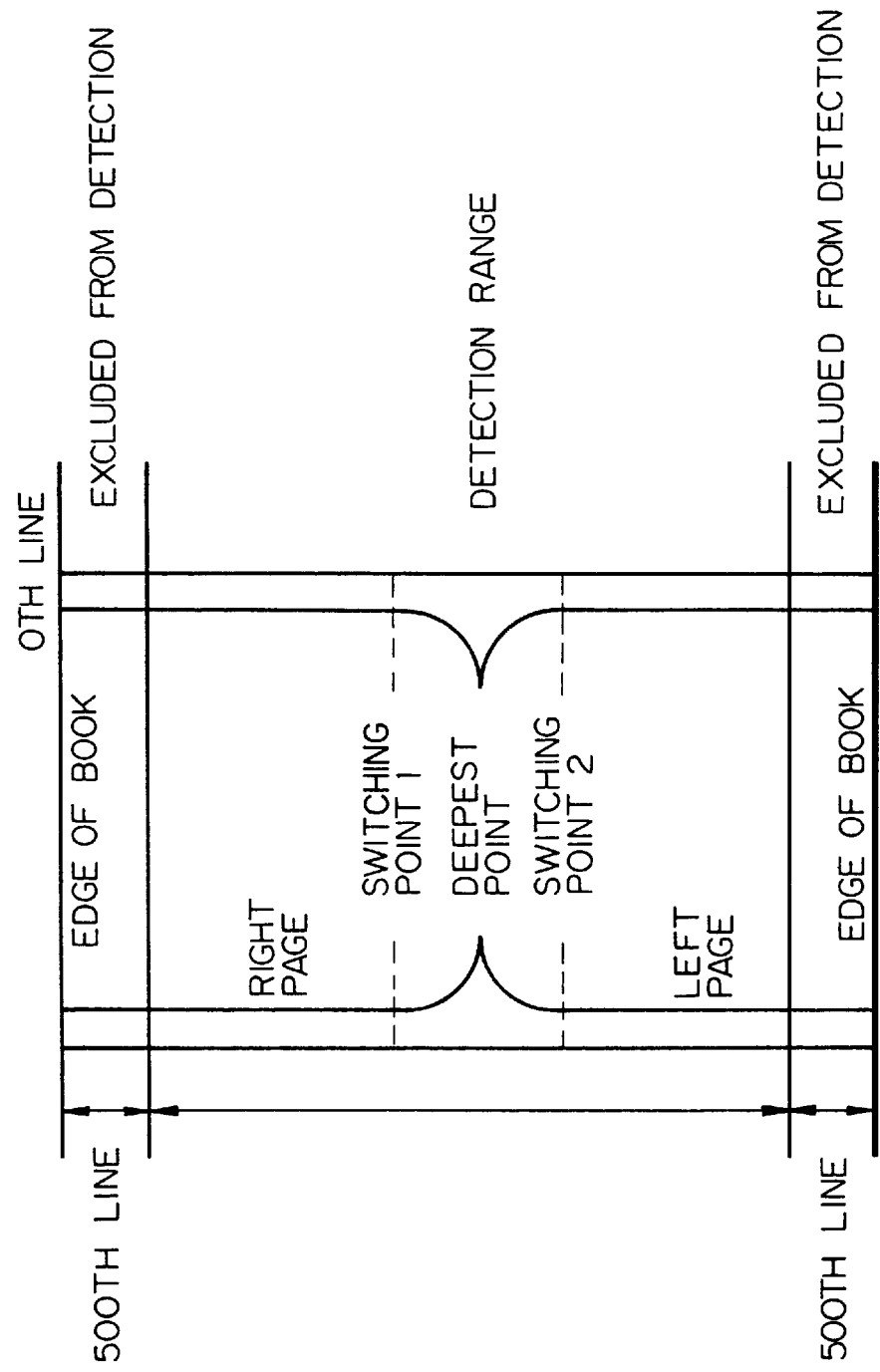
FIGS. 8–12 each shows a switching point detection range.

Hereinafter will be described switching (detection) between the straight line and bound portion of the spread book 402, and a procedure for determining a switching point detection range. First, as regards the switching point detection range, the image data output from the scanner 400 are representative of a document portion and a background portion which are divided by a boundary. The boundary distribution is linear at a page portion, but curved at a boundary portion. Let the boundary between the page portion and the bound portion be referred to as a switching point. FIG. 8 shows a range in which the switching points are searched for. The correcting means 409 writes the image data output from the read processing means 408 in the frame memory in the format shown in FIG. 8. In FIG. 8, an image begins at the top left corner; the horizontal direction and vertical direction are the main scanning direction and sub-scanning direction, respectively.

Stepped portions, e.g., the edge portions of the right and left pages are projected by the scanner 400 to a plane spaced from the focal plane of the scanner 400. It is therefore possible to accurately detect switching points by excluding the data representative of the stepped portions. The length of the spread book 402 laid on the glass platen 403 is sensed beforehand by size sensing means implemented as document size sensing means or page sensing means. Assume that the spread document 402 has a size corresponding to size A3. Then, as shown in FIG. 8, the correcting means 409 does not search for switching points from the leading edge of the book 402 to, e.g., the 500th line and from a line 500 lines before the trailing edge to the trailing edge. The correcting means 409 calculates the position of the bound portion of the spread book 402 on the basis of the sensed document size, and then searches for switching points around the bound portion other than the above edge portions.

Figure 12:
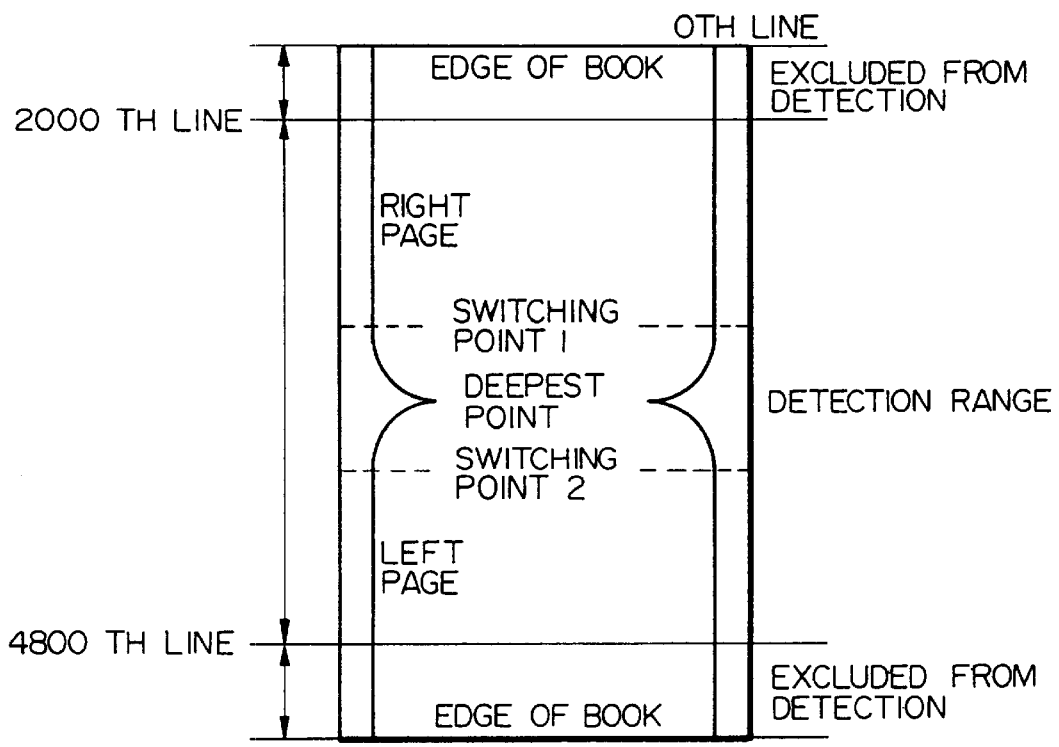

By detecting switching points out of the image data at accurate positions around the calculated bound portion, the correcting means 409 achieves an accurate detection range with a minimum of processing. In practice, the correcting means 409 detects switching points out of the image data over a width of $\alpha$ around the center of the document 402. For example, assume that the spread book 402 is of size A3. Then, as shown in FIG. 12, the correcting means 409 searches for switching points over a range of, e.g., 2,000 lines to 4,800 lines other than the edge portions of the document 402. When the spread book 402 is of size A4, the correcting means 409 searches for switching points over a range of, e.g., 1,000 lines to 3,800 lines other than the edge portions.

Figure 9:
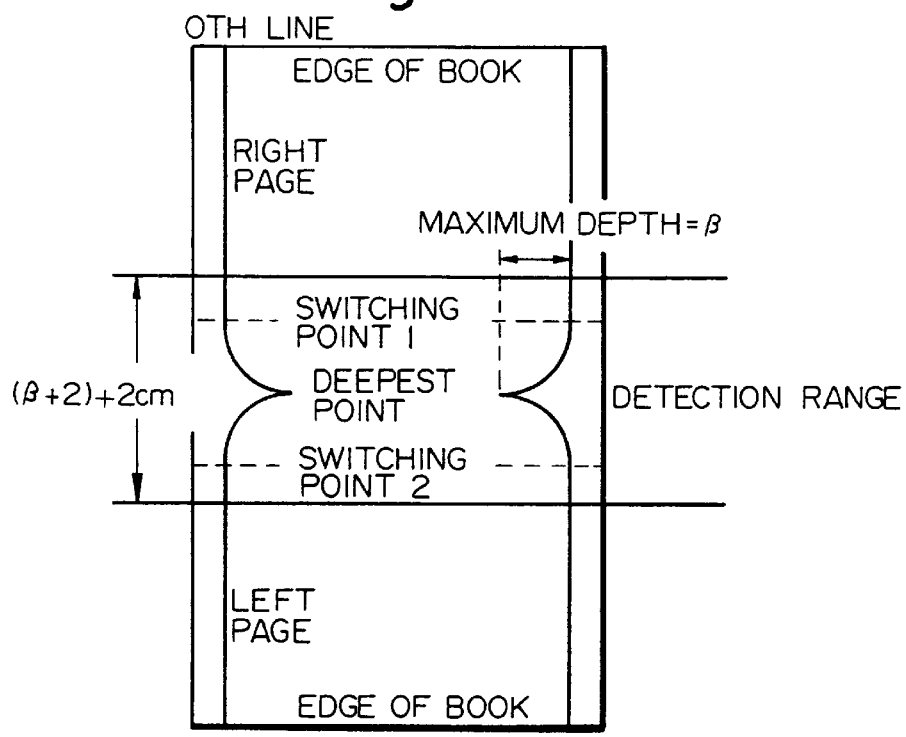

Further, the correcting means 409 increases the bound portion (switching point) detection range when the book 402 is relatively thick and has a deep bound portion, or reduces it when the book 402 has a shallow bound portion. This insures an adequate switching point detection range matching with the size of the document 402 and thereby promotes rapid detection of a bound portion. As shown in FIG. 9, assume that the bound portion of the document 402 has a depth $\beta$ at its deepest line. Then, in practice, the correcting means 409 searches for a bound portion or switching points over a angle of $(\beta+2)\times 2$ cm.

Figure 10:
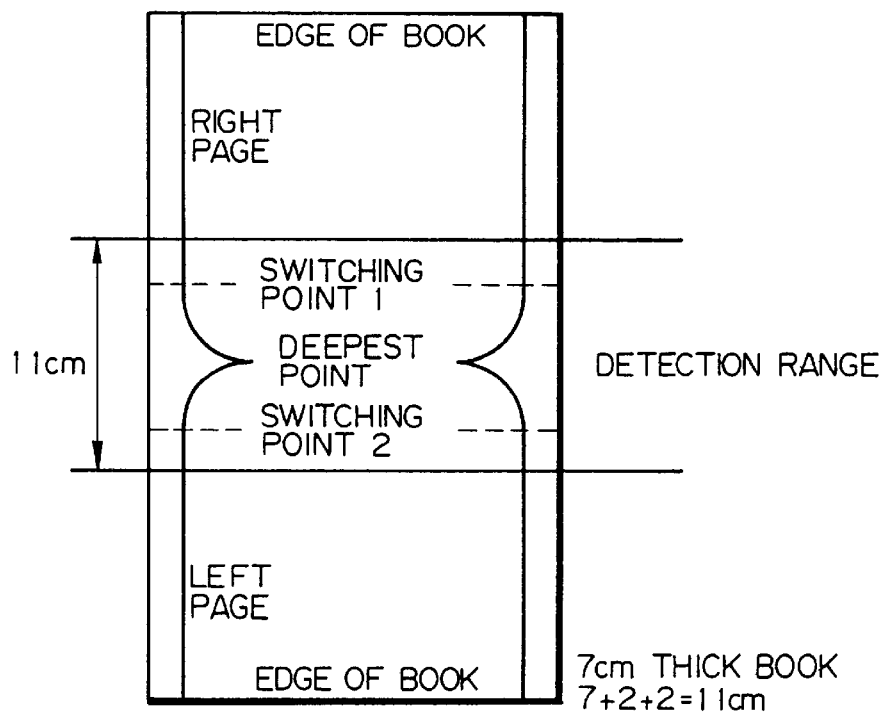

The illustrative embodiment is practicable with the maximum book thickness of, e.g., 7 cm. The bound portion of such a document 402 rises above the glass platen 403 over a width of less than 7 cm when spread on the glass platen 403. In light of this, as shown in FIG. 10, the correcting means 409 searches for switching points in the image data over a width of 11 cm including extra 2 cm at both sides of the above width. This allows switching points to be detected within the minimum adaptive range, i.e., allows it to be searched for in the image data over a preselected width without regard to the image data.

Figure 11:
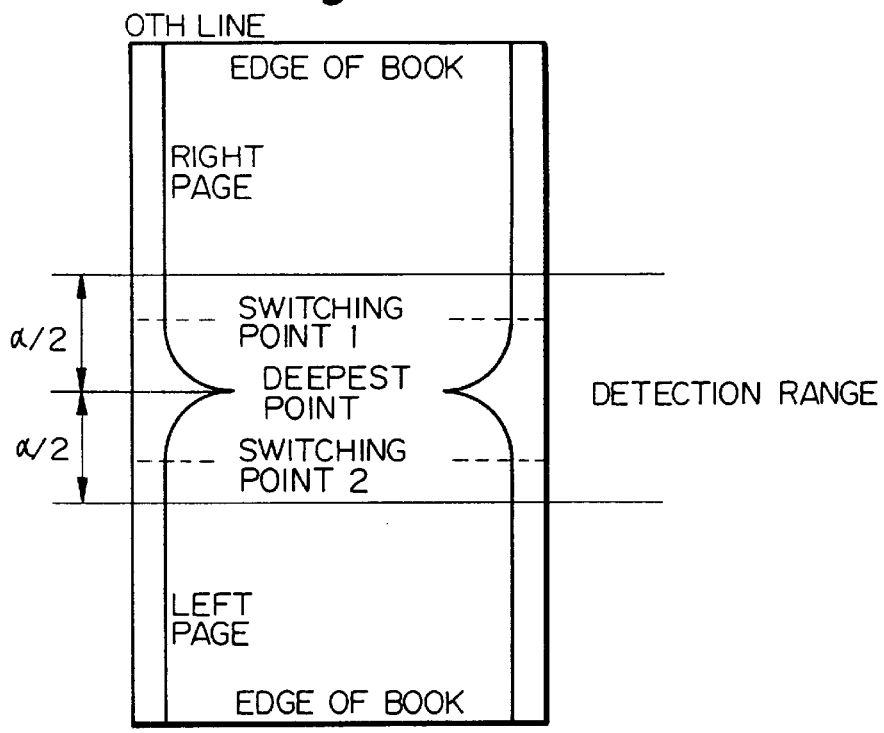

The correcting means 409 defines a bound portion detection range of given width at each of the right and left pages of the spread document 402. In practice, as shown in FIG. 11, the processing means 409 defines a bound portion detection range having a width of $\alpha/2$ at each of the right and left pages of the spread document 20; the overall detection range has a width of $\alpha$.

Switching between the straight lines (flat portion) and bound portion of the spread book 402 is as follows. In the illustrative embodiment, a bound region where pages are curved and page regions where pages is flat are separated from each other, and switching points between the two different kinds of regions are detected. This allows the bound portion and page portions to be processed independently of each other.

The correcting means 409 calculates, based on the data representative of two spaced points detected by the above procedure, the inclination and position of a straight portion at the boundary of each of the right and left pages of the spread document 402. The correcting means 409 can therefore determine an amount of skew representative of the degree of rotation of the page on the basis of the condition in which the flat page portion is laid on the glass platen 403, e.g., the inclinations and positions of straight portions at the right and left boundaries of the spread book. The correcting means 409 makes the two spaced positions symmetrical at the right and left pages of the document 402. This, coupled with the fact that the right and left pages of a spread document are generally substantially symmetrical, allows the amount of skew of each page to be determined on the basis of the boundary of the page.

The correcting means 409 produces the inclination and position of a straight portion at the boundary of each page by the minimum square method. This allows the amount of skew of the page to be accurately determined even when the positions where the page boundary is sampled are irregular. The correcting means 409 identifies the bound region of the spread pages if the region is spaced from the extension of the straight line of the page boundary by a preselected distance and if it does not further approach the extension in a preselected range.

The above preselected distance from the extension of the line of the page boundary may cover a plurality of pixels, e.g., four pixels. With this configuration, the correcting means 409 can identify, with a minimum of processing, a bound range where an image is distorted.

The correcting means 409 determines, within the range between the two spaced points of the right and left pages, the position where the bound portion is deepest to be the boundary between the right and left pages of the spread document. The correcting means 409 subtracts data representative of the extension of the straight portion of the page boundary from the data representative of the detected bound portion, thereby determining the true amount of page distortion. With the true amount of page distortion, it is possible to calculate the original page depth and enhance the accurate restoration of an image at the bound portion.

Figure 13A:
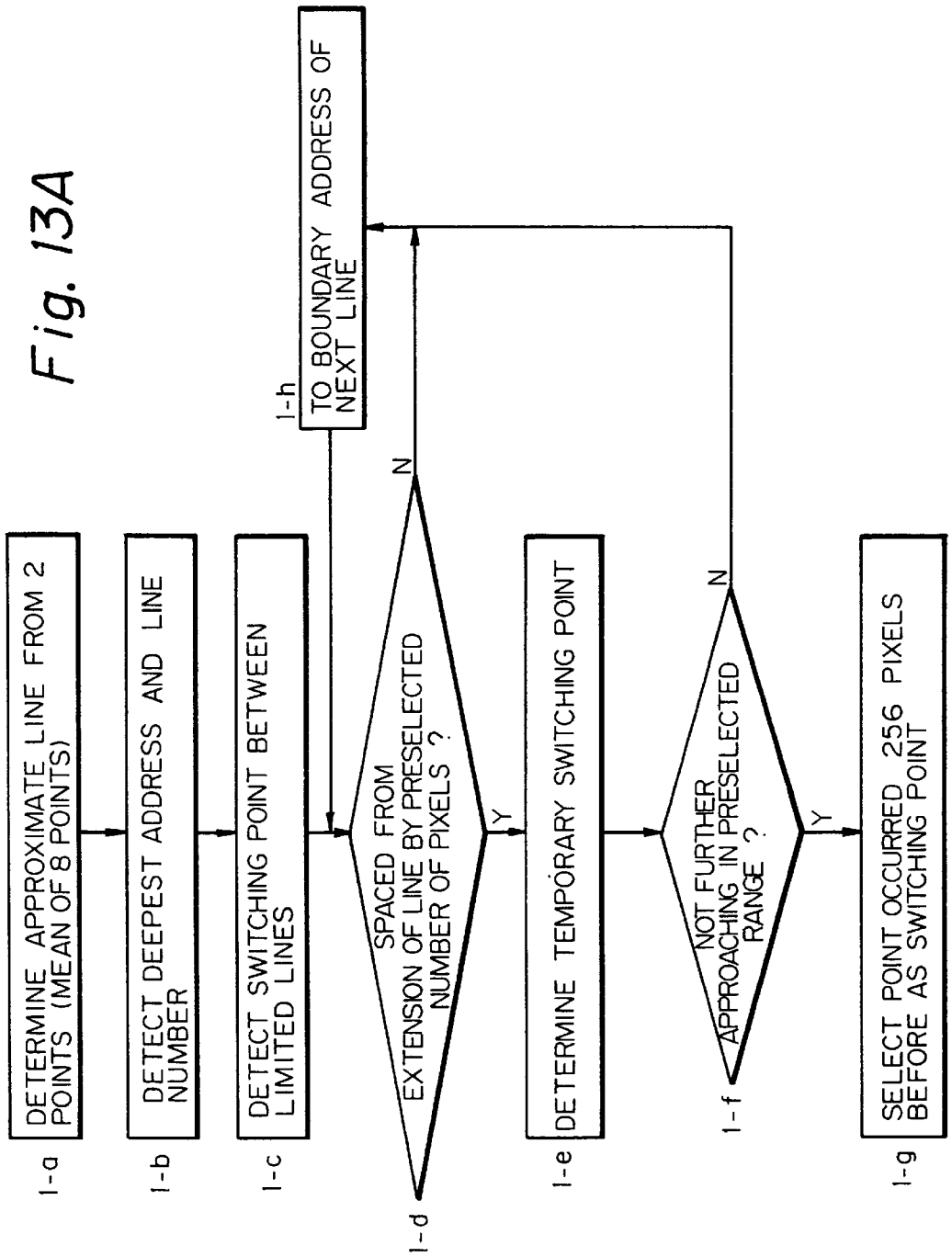

FIG. 13A shows how the correcting means 409 switches the straight line and bound portion of the book 402 and how it determines a switching point detection range. The correcting means 409 determines, based on the address A3 of the page boundary detected by the above procedure, an approximate boundary line on which the boundary distribution of the page is linear, recognizes a portion curved away from the approximate boundary line as a bound portion, and separates the bound portion from the page portion. With this procedure, the correcting means 409 recognizes the configuration of the bound portion and executes particular processing with each of the page portion and bound portion.

Assume two points coinciding with the 500th pixel and 2,000th pixel as counted from the image start point (edge of the page), i.e., the boundary address A3 which is the mean value of eight points including a plurality of pixels. Then, as shown in FIG. 13A, the correcting means 409 determines a line connecting the two points to be a page boundary by the mean square method using the boundary address A3, and determines the inclination of the boundary (step 1-*a*). The reference position for determining the amount of image distortion of the right and left pages of the spread document is the boundary addresses of the switching points. Therefore, the correcting means 409 selects a point having the largest boundary address (center of the bound portion) as the point for switching the reference point of the right or left page. The correcting means 409 searches for a boundary address having the largest (deepest) boundary address and its line (step 1-*b*). The correcting means 409 searches for a switching point between the above defined lines (bound portion detection range).

As stated above, the correcting means 409 compares the above line and boundary address A3 in order to determine a temporary switching point from a straight line to a curve (step 1-*e*), on condition that the address A3 be spaced from the line by a plurality of pixels, e.g., four pixels (step 1-*d*). If the distance between the line and the boundary address A3 is not greater than four pixels, then the correcting means 409 compares the boundary address A3 of the next line and the above line (step 1-*h*). The correcting means determines whether or not the above line and boundary address A3 do not approach each other by more than four pixels (step 1-*f*) within a preselected range. Specifically, the correcting means 409 determines whether or not a plurality of lines, e.g., five consecutive lines each having a boundary address A3 spaced from the above line by more than four pixels toward the page appear continuously. If the line and boundary address A3 approach each other by more than four pixels within the preselected range, i.e., if a line having a boundary address A3 spaced from the line by more than four pixels toward the page does not continuously appear over five lines, then the program returns to the step 1-*h*.

Assume that the above line and boundary address A3 do not approach each other by more than four pixels within the preselected range, i.e., five lines each having a boundary address A3 spaced from the above line by more than four pixels toward the page appear continuously. Then, the correcting means 409 calculates a point appeared 256 pixels (16 mm) before the above temporary switching point and determines it to be a switching point between a straight line and a curve (1-*g*). With such a procedure, the processing means 409 determined the switching points of the right and left pages of the spread book.

FIG. 13B shows an alternative procedure for switching (detecting) the straight line and bound portion of the spread book. The procedure will be describe with reference also made to FIG. 20. Again, the correcting means 409 determines, based on the address A3 of the page boundary, an approximate boundary line on which the boundary distribution of the page is linear, recognizes a portion curved away from the above line as a bound portion, and separates the bound portion from the page portion. The correcting means 409 executes particular processing with each of the page portion and bound portion.

Figure 20:
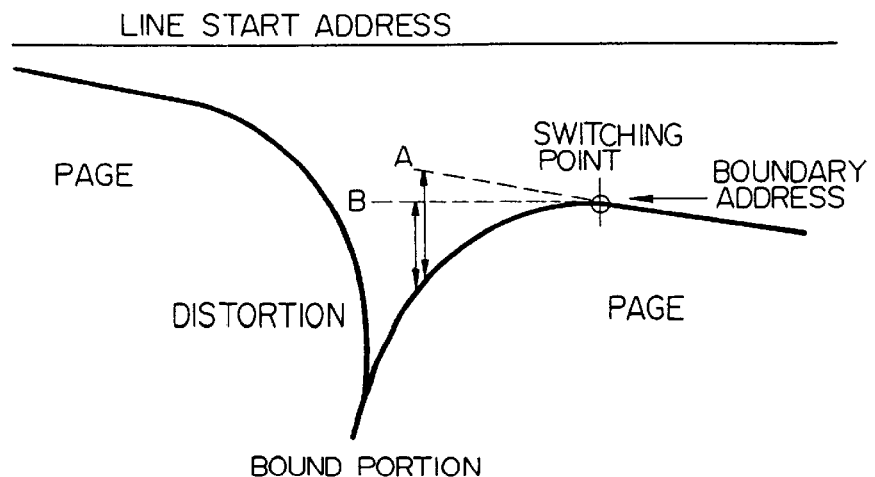
FIG. 20 shows the distortion of the boundary of the bound portion.

As shown in FIGS. 13B and 20, assume two points at the 500th pixel and 2,000th pixel as counted from the image start point (edge of the page), i.e., the boundary address A3 which is the mean value of eight points including a plurality of pixels. Then, as shown in FIG. 13A, the correcting means 409 determines a line connecting the two points to be a page boundary by the mean square method using the boundary address A3, and determines the inclination of the boundary (step 3-*a*). The correcting means 409 compares the above line and boundary address A3 in order to determine a temporary switching point from a straight line to a curve (step 3-*c*), on condition that the boundary address A be spaced from the line by a plurality of pixels, e.g., four pixels (step 3-*b*).

If the distance between the line and the boundary address A3 is not greater than four pixels, then the processing means 409 compares the boundary address A3 of the next line and the above line (step 3-*g*). The correcting means 409 determines whether or not the above line and boundary address A3 do not approach each other by more than four pixels within the preselected range (step 3-*d*). Specifically, the correcting means 409 determines whether or not a plurality of lines, e.g., five consecutive lines each having a boundary address A3 spaced from the above line by more than four pixels toward the page appear continuously. If the line and boundary address A3 approach each other by more than four pixels within the preselected range, i.e., if a line having a boundary address A3 spaced from the line by more than four pixels toward the page does not continuously appear over five lines, then the program returns to the step 3-*b*.

Assume that the above line and boundary address A3 do not approach each other by more than four pixels within preselected rang, i.e., five lines each having a boundary address A3 spaced from the above line by more than four pixels toward the page appear continuously. Then, the correcting means 409 calculates a point appeared 256 pixels (16 mm) before the above temporary switching point and determines it to be a switching point between a straight line and a curve (3-*e*). With such a procedure, the correcting means 409 determined the switching points of the right and left pages of the spread book. The reference position for determining the amount of image distortion of the right and left pages of the spread book is the boundary address of the switching point. The processing means 109 selects a point having the largest boundary point (center of the bound portion) as a point for switching the reference points of the right or left page (step 3-*f*).

Usually, a straight line representative of the boundary of a page portion is inclined, as seen from a line corresponding to the image start position of a memory or image file. As shown in FIG. 20, the correcting means 409 determines the amount of inclination by subtracting the boundary address A of the switching point from the boundary address of the bound portion or by subtracting the boundary address of the bound portion from a line B derived from the boundary address of the page portion.

As regards the depth of the bound portion of the spread book, assume that the boundary address of the switching point is coincident with the beginning of the memory. Then, the correcting means 409 produces the depth T of the bound portion with, e.g., the following equation:

$$T = P * A3 / (Ak - A3)$$

where Ak and P respectively denote the position of the optical axis and the distance to the focal plane. The position A3 may be replaced with A2 or A1, if desired.

When a spread book is laid on the image reading section of a copier or that of a scanner, it is sometimes slightly deviated from an expected position. Further, when the book is relatively thick, it is difficult to accurately abut the edges of the book against scales defining a reference position because the book hide the scales. In light of this, if the boundary address of the switching point is not coincident with the beginning of the memory, the correcting means 409 calculates the depth of the bound portion on the basis of the detected page boundary position without regard to the position of the book on the image reading section. Specifically, the correcting means 409 determines the depth T of the bound portion with, e.g., the following equation:

$$T = P * (A3 - Ka) / \{(Ak - Ka) - (A3 - Ka)\}$$

where Ka denotes the position of the flat page portion.

The correcting means 409 produces a difference between the depths T of nearby lines with an equation:

$(T_n-T_{n-1})$=distance to focal plane*(difference between boundary addresses of nearby line)/{(Ak–Ka)–(A3–Ak)}.

If the boundary address of the switching point is coincident with the beginning of the memory, then the correcting means 409 determines the depth T with T=P*A3/(Ak–A3) and then determines a difference $(T_n-T_{n-1})$.

By calculating the depth T from the boundary position of the detected flat page portion, as stated above, the calculating means 409 is capable of detecting the depth T even when the spread book 402 is deviated from the reference position defined by the scales 404 and 405. That is, even if the position where the spread document should be positioned is not fixed, the correcting means 409 is capable of recognizing the configuration of the bound portion by calculating the depth T.

When the spread book is laid on the image reading section of a copier or that of a scanner, the bound portion of the book is smoothly curved and free from sharp changes or vertical undulations. When the configuration of the page boundary is detected in order to recognize the configuration of the bound portion, the recognized configuration of the bound portion is not faithful due to a detection error and noise included in data. To recognize the configuration of the bound portion more accurately, the correcting means 409 limits the processing in accordance with the characteristic of the configuration of the bound portion. Specifically, the processing means 409 calculates the depth of the bound portion from the detected page boundary position and then limits a variation of the calculated depth, thereby obviating the influence of detection errors and noise. This successfully increases the applicable range of the illustrative embodiment.

When the spread book is laid on the image reading section of a copier or that of a scanner, the bound portion of the book is curved, and the angle of page inclination increases with an increase in the depth of the bound portion. To recognize the configuration of the bound portion more accurately on the basis of the configuration of the page boundary, the correcting means 409 limits the depth at the time of recognition in accordance with the characteristic of the configuration of the bound portion. In addition, the correcting means 409 limits a variation of the depth in accordance with the depth of the current position. In this manner, the correcting means 409 applies adequate limitations to the correction in accordance with the position of the bound portion within a range not effecting the calculation of the true configuration of the spread book.

Specifically, the correcting means 409 limits a variation of nearby depths to about 1/80 of the depth of the current position. For example, at a point where the detected depth is 10 mm, a variation between nearby lines should preferably be limited to 0.125 mm or 63.1° in terms of a page inclination angle.

Figure 21:
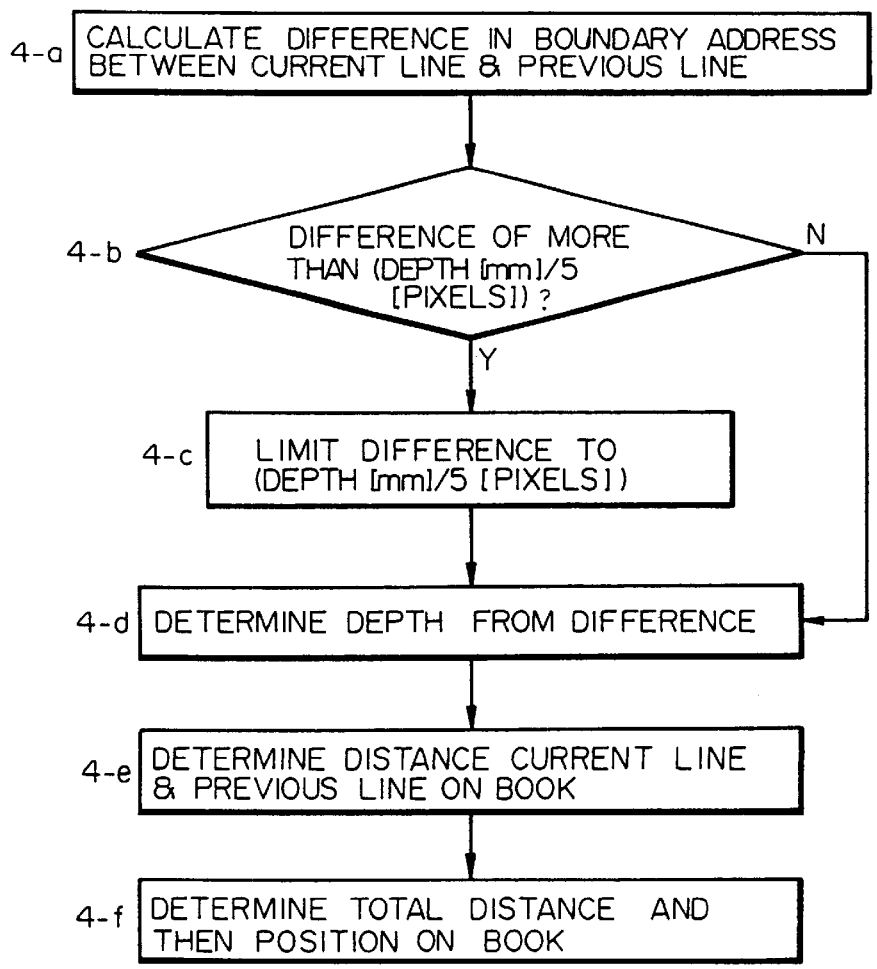
FIG. 21 is a flowchart demonstrating a procedure executed by the illustrative embodiment for calculating the depth of the bound portion.

FIG. 21 shows a procedure in which the correcting means 409 calculates the depth of the bound portion. As for restoration in the subscanning direction, the correcting means 409 calculates depths from the boundary addresses A3, and in addition determines the positions of sampling points on the spread book output from the scanner 400 beforehand. As shown in FIG. 21, the correcting means 409 calculates a difference between the boundary address A3 of one line and the boundary address of the next line, i.e., between the boundary addresses A3 of nearby lines (step 4-*a*). Usually, a variation of the depth increases with an increase in depth.

Should the detected boundary address be deviated from the true boundary, the bound portion would be excessively extended or contracted by the restoration in the subscanning direction. In light of this, the correcting means 409 limits the extension of the bound portion in the subscanning direction in accordance with the depth of the current position (steps 4-*b* and 4-*c*). Specifically, assume that the boundary address of a given line differs from the boundary address of the preceding line by more than [depth (mm)/5 (pixels)] based on the position of the given line. Then, the correcting means 409 limits the difference in boundary address to [depth (mm)/5 (pixels)] so as to reduce an error ascribable to the erroneous detection of a boundary.

Figure 22:
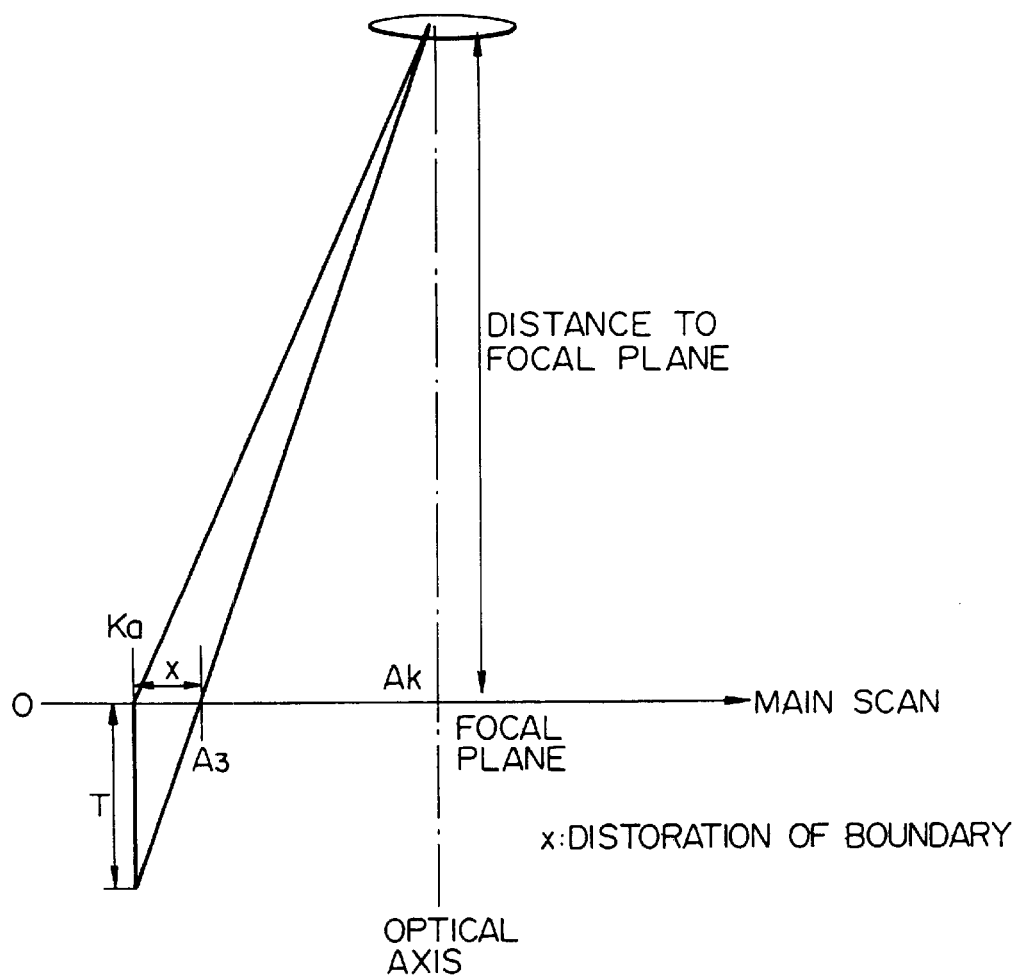
FIG. 22 also shows the distortion of the boundary of the bound portion.
Figure 23A:
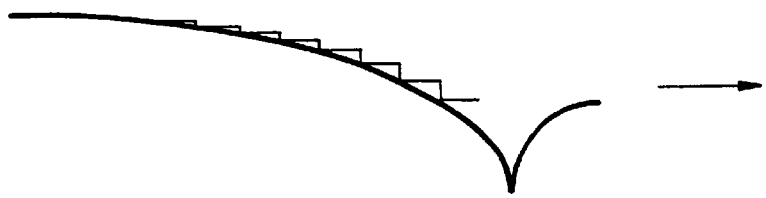
FIGS. 23A and 23B show how the illustrative embodiment calculates the length of an image.
Figure 23B:
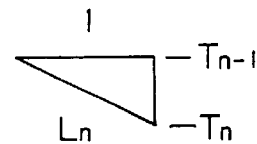

The correcting means 409 produces a difference $(T_n-T_{n-1})$ between the depths T of nearby lines based on the boundary addresses A3 by using the previously stated equation (step 4-*d*). As shown in FIG. 22, the boundary address A3 detected at the boundary position Ka of the flat page portion is deviated from Ka by a bend x of the boundary in the main scanning direction. The distance to the focal plane and the address Ak of the optical axis are constant values given by the scanner 400 and are assumed to be 427.757 (mm) and 2,400 (pixels), respectively. Subsequently, as sown in FIG. 23, the correcting means 409 determines, based on the difference $(T_n-T_{n-1})$ between nearby lines n and n−1, a distance $L_n$ between the line and the immediately preceding line on the book (step 4-*e*):

$$L_n=\sqrt{1+(T_n-T_{n-1})^2}$$

Next, the correcting means 409 calculates, based on the differences in depth between the consecutive lines, the restored position of the page approximated by a pixel-by-pixel line having a fine pitch (step 4-*f*). The line-by-line image length $L_n$ in the subscanning direction and to be restored can be determined by use of the above equation using the depth T.

The correcting means 409 may limit a variation of the depth, e.g., a difference (variation) between the current line and the preceding line as to a bend (boundary address— switching address) and then calculate a difference between the lines. The variation may be limited to 1/80 of the depth of the current position, as mentioned earlier.

The bend and depth of the bound portion have a 1:1 correspondence. Because a bend multiplied by 3 is the depth of the bound portion, the same effect is achievable by limiting either one of the depth or the bend. The correcting means 309 may determine, based on a difference between the boundary addresses A3 of nearby lines, a difference $(T_n-T_{n-1})$ by using the previously stated equation.

How the correcting means 409 switches the page portion (flat portion) and bound portion of the book is as follows. The correcting means separates the bound portion, but does not process the page portions. Specifically, the correcting means 409 separates the bound region of the spread book and recognizes the configuration of the document on the basis of the configuration of the page boundaries. The correcting means 409 executes correction with the bound region, but does not execute it with the flat page regions. The correction may be the extension of the image in the vertical and horizontal directions. Image portions representative of the page regions are therefore left as they are.

The correcting means 409 separates the bound portion and shifts only the page portions. Therefore, even when the image of the spread document laid on the glass platen 402 is skewed due to rotation, an image free from skew and having page edges in the direction of boundaries accurately aligned is achieved.

The procedure beginning with the detection of page boundaries (A+C+B+F) and ending with the image shift copes with the skew of page portions. The correcting means 409 separates the bound portion and corrects, during correction of the page portions outside of the bound portion, the skew of the page portions by a movement from the detected page boundary position in the direction of the page boundary, i.e., in the main scanning direction.

Assume that page boundaries are detected by a resolution of one pixel in order to calculate an amount of image shift on the basis of the page boundary position data, and then an image is shifted. Then, a movement occurs with a pitch of one pixel and brings about a positional error of less than one pixel, rendering, e.g, rules jagged. To solve this problem, the correcting means 409 corrects, during image correction of the flat page portions, the skew of pages with accuracy by using the page boundary position data detected with accuracy. This successfully reduces the image shift error to less than 1/8 inclusive and thereby frees rules from jaggedness.

As for the image shift using the boundary position data, the correcting means 409 calculates an amount of shift while separating it into an integral number of pixels and a fraction. The correcting means 409 shifts, by address conversion, an image in the direction of the detected page boundaries (main scanning direction) by the integer portion of the number of pixels of the boundary position data. The correcting means 409 deals with the fragment portion of the number of pixels by the cubic function convolution method. The correcting means 409 restores the image representative of the separated bound portion on the basis of the boundary position data. Specifically, the correcting means 409 extends the curved bound portion in the main and subscanning directions, thereby restoring the distorted image to a flat image.

While the correcting means 409 executes particular image correction with each of the different portions, it provides the resulting image with uniformity at the points of separation. Specifically, the correcting means 409 separates the bound portion, corrects an image by use of detected boundary position data, and then executes particular image correction with each of the bound portion and flat page portions. As a result, the boundary position data at the points of separation are identical and continuous. This renders image portions representative of the points of separation uniform and obviates undesirable boundaries ascribable to the separation.

Figure 25:
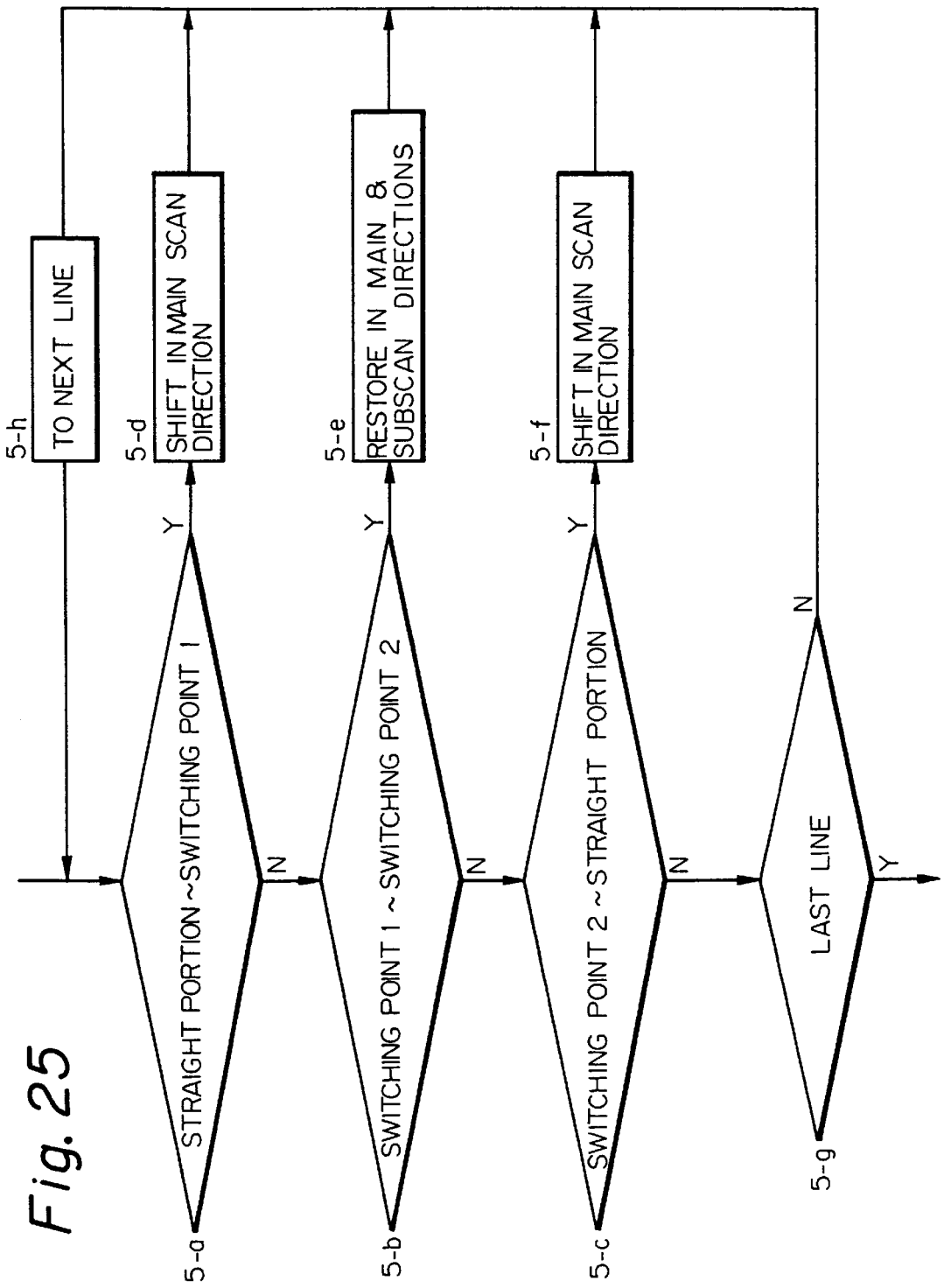
FIG. 25 is a flowchart showing how the illustrative embodiment switches page portions (flat portions) and a bound portion.

FIG. 25 shows how the correcting means 409 switches the page portions or flat portions and the bound portion during processing. The correcting means 409 shifts the data representative of page portions only in the main scanning direction because the data are read with a ×1 magnification. On the other hand, the correcting means 409 restores the bound portion on the basis of the reduced magnification in the main and subscanning directions.

Figure 26:
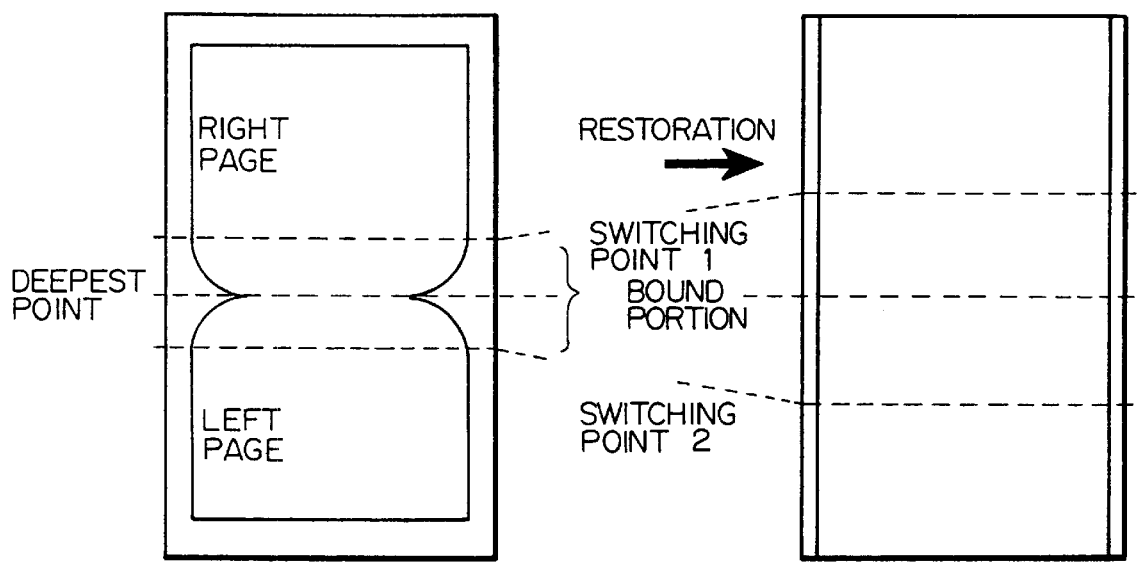
FIGS. 26 and 27 show the interpolation of pixels in the main scanning direction particular to the illustrative embodiment FIG. 28 demonstrates a procedure executed by the illustrative embodiment for calculating a projection magnification and determining the address of an optical axis.
Figure 27:
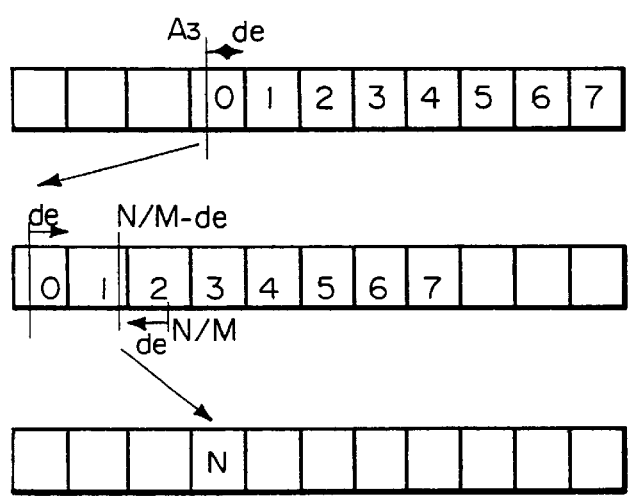

The image data output from the scanner 400 and representative of the spread document 402 are written to the memory in the format shown in FIG. 8. In FIG. 8, the right page of the spread book is positioned above the left page. As shown, the portions of the document 402 contacting the glass platen 403 have straight boundary lines. While these portions are referred to as straight portions in FIG. 25, they are identical with the page portions or flat portions. The points where the boundary lines change from straight lines to curves are referred to as switching points. A switching point on the right page and a switching point on the left page are denoted switching points 1 and 2, respectively. The bound portion begins at the switching point 1. The line at the center of the bound portion is the deepest point. When the image of FIG. 8 is restored, an image whose bound portion is free from curves, as shown in FIG. 26, is output.

As shown in FIG. 25, the correcting means 409 determines whether or not the read data are representative of a line lying in the straight portion ending at the switching point 1 (step 5-$a$). If the answer of the step 5-$a$ is positive (Y), then the correcting means 409 shifts the read data in the main scanning direction (step 5-$d$) and then reads the next line of image data (step 5-$h$). If the answer of the step 5-$a$ is negative (N), then the correcting mean 409 determines whether or not the data are representative of a line between the two switching points 1 and 2 (step 5-$b$). If the answer of the step 5-$b$ is Y, then the correcting means 409 restores the image data in the main and subscanning directions (step 5-$e$) and advances to the next line (step 5-$h$). If the answer of the step 5-$b$ is N, then the correcting means 409 determines whether or not the image data are representative of a line between the switching point 2 and the adjoining straight portion (step 5-$c$).

If the answer of the step 5-$c$ is Y, then the correcting means 409 shifts the data in the main scanning direction (step 5-$f$) and then reads the next line (step 5-$h$). Further, if the answer of the step 5-$c$ is N, then the correcting means 409 determines whether or not the image data are representative of the last line (step 5-$g$). If the answer of the step 45-$g$ is N, then the correcting means 409 deals with the next line.

Figure 28:
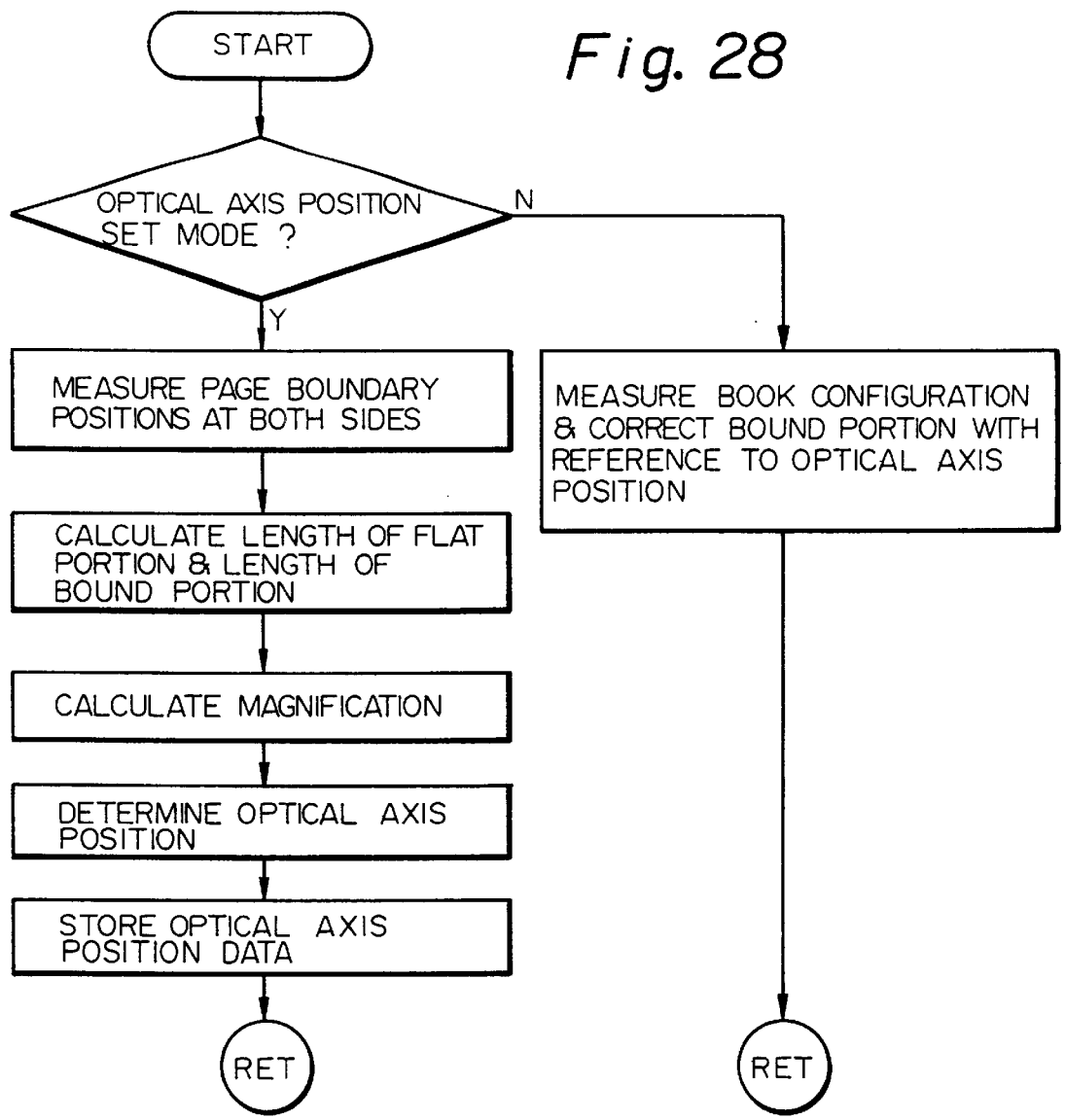

The correcting means 409 shifts the read data in the main scanning direction, as shown in FIG. 28. As shown, the correcting means 409 shifts the integer portion of the pixels at the boundary address A3 to the left in the array and subtracts the fraction portion r from 1 so as to determine a residual de (de=1−r). The correcting means 409, assuming a sampling point N, interpolates the position N with the density data of a position N/M after magnification change by the cubic function convolution method. As for the bound portion, the correcting means 409 determines a magnification for enlargement on the basis of the addresses of the switching points. This, coupled with the fact that the data are shifted in the main scanning direction at the switching points on the basis of the switching addresses, provides the image with uniformity.

Referring again to FIG. 22, how the projection magnification and the address of the optical axis are determined will be described. As shown, the memory has an origin O. The bound portion of the spread book 402 is positioned above the glass platen 403 by a distance corresponding to the depth T of the bound portion of the book 402. Therefore, although the book 402 has a length extending from the optical axis address Ak of the scanner 400 to the position Ka of the flat page portion, the data output from the scanner 400 cover only a range between the optical axis address Ak and the boundary address A3. The boundary address A3 may be replaced with A1 or A2, if desired. Considering the above difference, the correcting means 409 produces the projection magnification Mm of the scanner 400 in the direction perpendicular to the boundary (main scanning direction):

$$Mm=(Ak-A)/(Ak-Ka)$$

where A is any one of A1, A2 and A3.

The correcting means 409 uses the reciprocal of the above projection magnification as a magnification M for enlarging the length of the image data from the optical axis address Ak to the boundary address T to the original length from the optical axis address Ak to the position K of the flat page portion. The optical axis address Ak is assumed to be 2,400th pixel.

In the illustrative embodiment an optical axis position setting mode is available and input on an operation panel, not shown, as desired. FIG. 28 demonstrates how the correcting means 409 calculates a projection magnification and determines an optical axis position. As shown, when the above mode is input on the operation panel, the correcting means 409 determines a boundary position on one side of the spread book 402 and then determines a boundary position on the other side of the book 402. As a result, measured values A respectively representative of the boundary position Ka of the page portion of one side and the boundary position Kb of the page portion of the other side in the main scanning direction are output. While A is one of A1, A2 and A3, B is one of B1, B2 and B3 corresponding to A1, A2 and A3, respectively.

Subsequently, the correcting means 409 produces a length (Kb−Ka) of the page portion or flat portion in the main scanning direction while producing a difference (B−A) as the length of the bound portion in the main scanning direction. A is one of A1, A2 and A3 while B is one of B1, B2 and B3. The correcting means 409 calculates a ratio between the length of the bound portion and that of the page portion or flat portion and then determines a magnification Mm. The correcting means 409 calculates a magnification Mm by using (Ak−A)/(Ak−Ka) stated earlier. Then, the correcting unit 409 produces the position Ak of the optical axis from the magnification Mm, page boundary position A, and page portion position Ka, and stores the position Ak.

If the optical axis position setting mode is not input, the correcting means 409 sequentially executes, based on the position Ak, the processing for determining a page boundary position at one side and the processing for determining a page boundary position at the other side, as stated earlier. Stated another way, the processing means 409 repeats the processing executed with the edge of the spread book 402 also with the other edge of the document 402 in the main scanning direction.

Hereinafter will be described a procedure for executing restoration in the subscanning direction. To correct the distortion of an image representative of the bound portion, the correcting means 409 calculates image density data of lines corresponding to an integer number of pixels such that the restored image has a length greater than one pixel. As soon as data resulting to surrounding pixels for calculating a unit line of restored image are output, the correcting means 409 performs calculation for the extension of the image. This realizes real-time position correction as in a copier.

Further, the correcting means 409 extends the image in accordance with a vairation of the depth of the bound portion, as follows. During correction of the image distortion particular to the bound portion, the correcting means 409 executes processing discussed earlier with reference to FIGS. 23A and 23B. Specifically, the correcting means 409 regards the configuration of the bound portion as a sequence of consecutive fine triangles corresponding to consecutive lines. The correcting means 409 calculates the length $L_n$ of one line of image by the equation stated earlier. The lengths $L_n$ are added up to produce a length by which the page should be extended. The oblique side of each triangle is approximate to the configuration of the curved page. The correcting means 409 uses the sum of such oblique sides as the length of the image representative of the page, thereby producing an accurate page length. Particularly, the length can be accurately restored by approximation using the minimum pitch representative of a line.

In the bound portion of the book 402, the pitch at which the pixels are read varies in the spread direction of the book relative to the book. In light of this, the correcting means 409 detects the configuration of the bound portion and restores pixel positions in accordance with the varying sampling pitch.

To correct the distortion of the image representative of the bound portion, the correcting means 409 calculates a restored image by the cubic function convolution method in the direction of the detected boundaries. By calculating the pixel interval of a pixel being observed as a reference "1", the correcting means 409 adapts image extension to the varying interval between lines, i.e., the sampling pixel interval varying relative to a flat document.

Geometrically the depth of the bound portion is proportional to the image length projected in the main scanning direction. The correcting section 409 determines the depth T of the bound portion by using the previously stated equation, as discussed with reference to FIG. 22, and thereby calculates the restored page position by approximation. The correcting section 409 produces, based on the depth T, the line-by-line image length $L_n$ in the subscanning direction, as also discussed previously. As a result, the sum of the resulting image lengths $L_n$ is the page length in the subscanning direction. The correcting means 409 enlarges the image in the subscanning direction by pixel interpolation using the cubic function convolution method in the same manner as in the enlargement in the main scanning direction. Such a calculation scheme is sufficiently accurate.

Usually, a variation of the depth of the bound portion increases with an increase in depth. In light of this, the correcting section 409 limits the extension of the image in accordance with the depth of the bound portion. Specifically, the correcting section 409 limits difference between nearby boundary addresses to [depth (mm)/5 (pixels] so as to obviate errors in the restoration in the subscanning direction.

Figure 29:
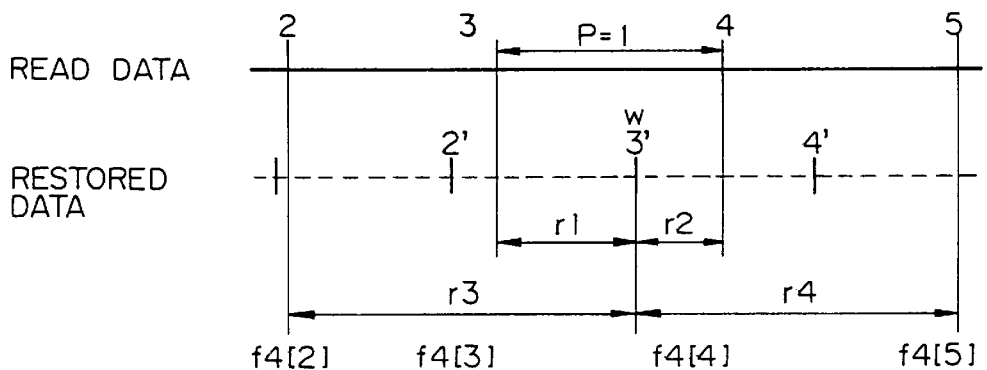
FIG. 29 shows the interpolation of pixels in the main scanning direction particular to the illustrative embodiment.

As regards restoration in the subscanning direction, the image length $L_n$ differs from one position to another position. As shown in FIG. 29, the intervals between read data are not constant. In FIG. 29, to determine the density of a position 3' as the density of restored data, use is made of the density data of positions 2, 3, 4 and 5 of read data. On the other hand, as for r1 (distance between 3 and 3'/distance between 3 and 4), r2 (1−r1), r3 (distance between 2 and 3'/distance between 3 and 4) and r4 (distance between 3' and 5/distance between 3 and 4), the distance between 3 and 4 is selected to be 1. The correcting means 409 assume them to be r and executes pixel interpolation by the cubic function convolution method.

Figure 30:
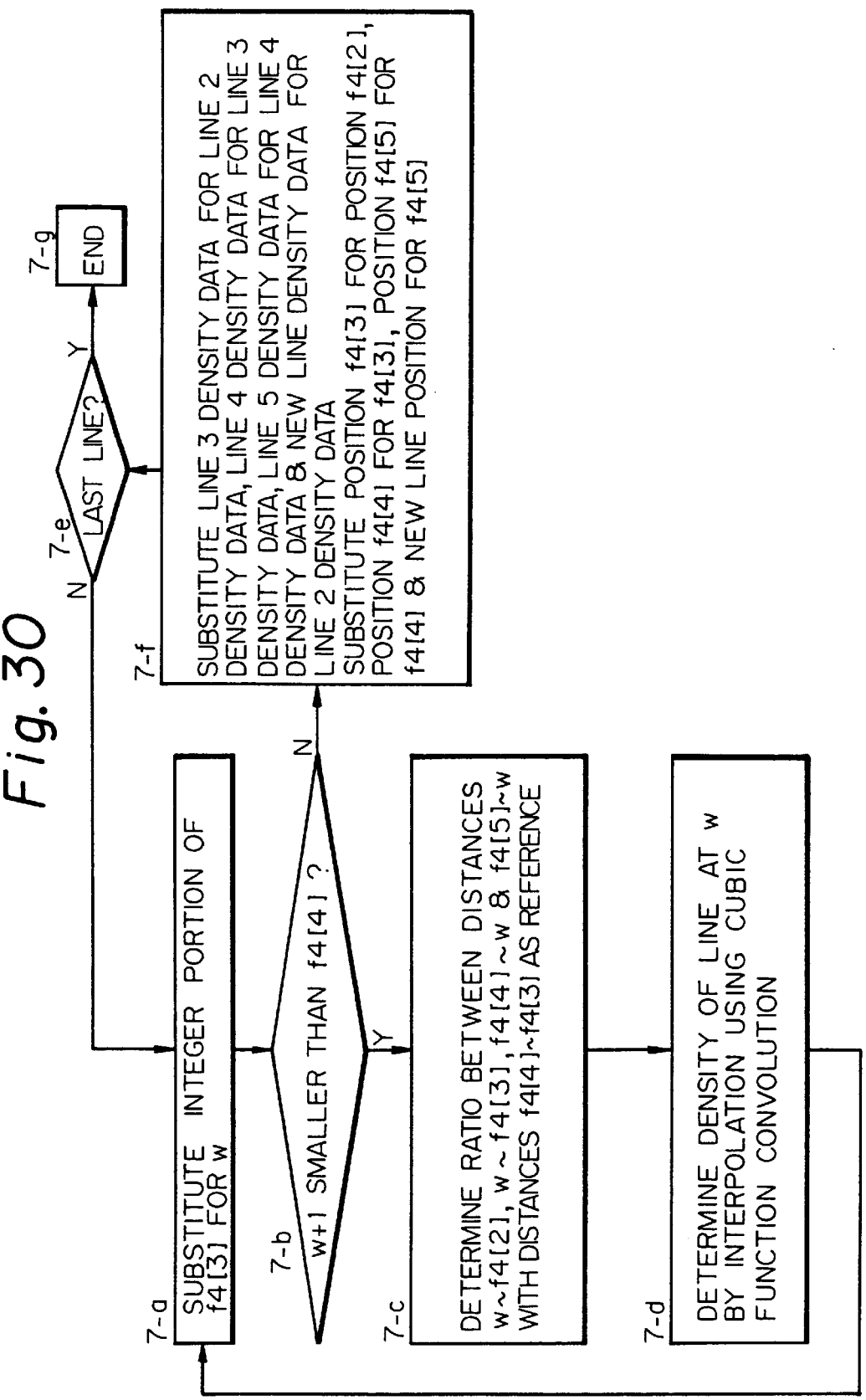
FIG. 30 is a flowchart showing a restoration procedure particular to the illustrative embodiment and relating to the subscanning direction.

The restoration in the subscanning direction will be described more specifically with reference to FIG. 30. In FIG. 29, the sum of the image lengths $L_n$ is the page length in the subscanning direction and assumed to be the position of the spread book. Numerals 2, 3, 4 and 5 are representative of consecutive main scanning lines and respectively located at positions f4[2], f4[3], f4[4] and f4[5]. Labeled w is the position of a line to be interpolated and which is an integer at a position between the positions f4[3] and f4[4].

The correcting means 409 substitutes the integer portion of f4[3] for w (step 7-*l*). At this instant, w is positioned between f4[2] and f4[3]. The correcting means 409 determines whether or not w+1 is less than f4[4] (step 7-*b*). If the answer of the step 7-*b* is N, then the correcting means 409 executes a step 7-*f*. In the step 7-*f*, the correcting means 409 does not execute interpolation, but shifts density data with a four-line buffer in order to begin interpolation between the lines 4 and 5. Specifically, the correcting means 409 replaces the density data of the line 3 with the density data of the line 2, replaces the density data of the line 4 with the density data of the line 3, and replaces the density data of the line 5 with the density data of the line 2. Further, the correction means 409 replaces the position f4[2] with the position f[3], replaces the position f4[3] with the position f4[4], replaces the position f4[4] with the position f4[5], and replaces the position [f4[5] with a new position f4[5].

Subsequently, the correcting means 409 determines whether or not the current line is the last line of the read image (step 7-e). If the answer of the step 7-e is Y, then the correcting means 409 ends the processing. If the answer of the step 7-e is N, then the correcting means 409 returns to the step 7-a. If w+1 is less than f4[4] (Y, step 7-b), then the correcting means 409 determines r1, r2, r3 and r4 necessary for the cubic convolution method (step 7-c). Because the intervals between the read data are not constant, the correcting means 409 selects the interval between the lines of the read data sandwiching the position to be interpolated (3 and 4 or f4[4] and f4[3]) to be 1.

Thereafter, the correcting means 409 produces the following:

$$r1=(w-f4[3])/(f4[4]-f4[3])$$

$$r2=1-r1$$

$$r3=(w-f4[2])/(f4[4]-f4[3])$$

$$r4=(w-f4[5])/(f4[4]-f4[3])$$

The correcting means 409 determines the density of the line at the position w by interpolation using the cubic function convolution method (step 7-d) and then returns to the step 7-a.

Figure 31:
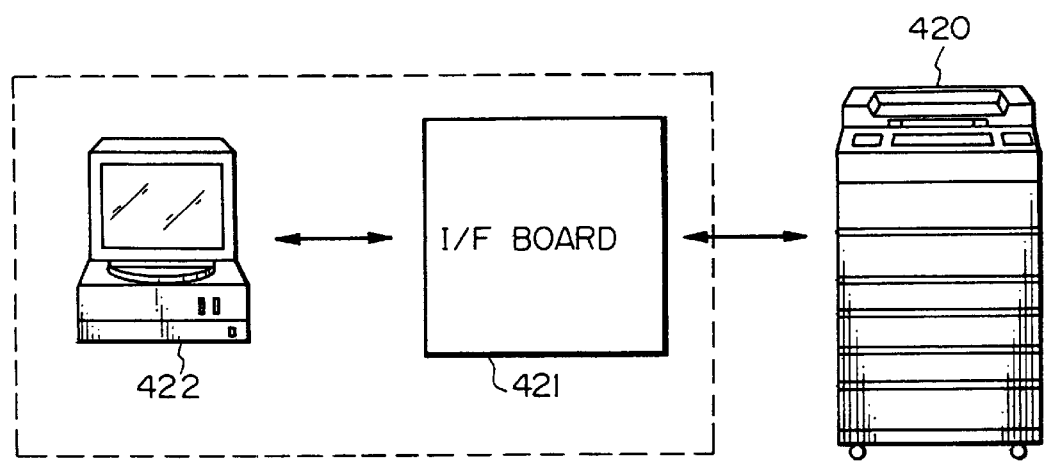
FIG. 31 shows the connection of an image forming apparatus and a personal computer representative of an alternative embodiment of the present invention.

As shown in FIG. 31, a digital copier 420 of the illustrative embodiment is connectable to a personal computer 422 via an interface (I/F) board 421. In this condition, the scanner 400 of the copier 420 is driven by the personal computer 422, so that image data output from the correcting section 409 can be sent to the computer 422.

In the illustrative embodiment, a read image is divided into page portions (flat portions) and a bound portion. The page portions are subjected to image shift for skew correction while the bound portion is subjected to extension in the main and subscanning direction. The embodiment was found to successfully restore the read image to a flat image by experiments.

Figure 60:
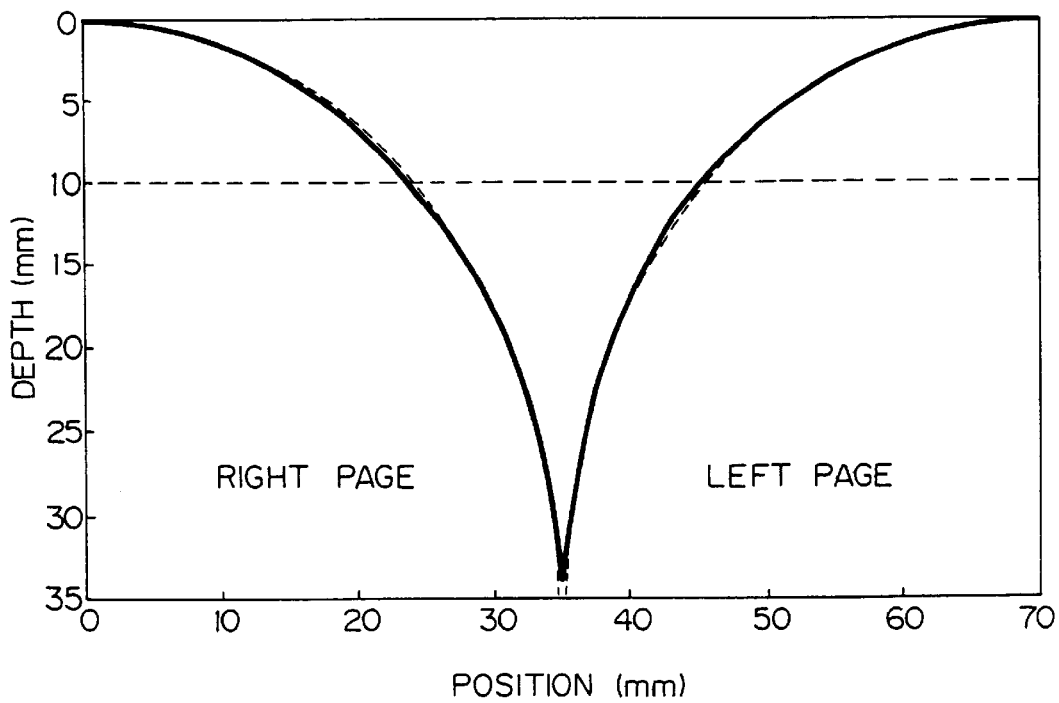
FIG. 60 shows the depths of a spread book which the illustrative embodiment can detect.
Figure 61:
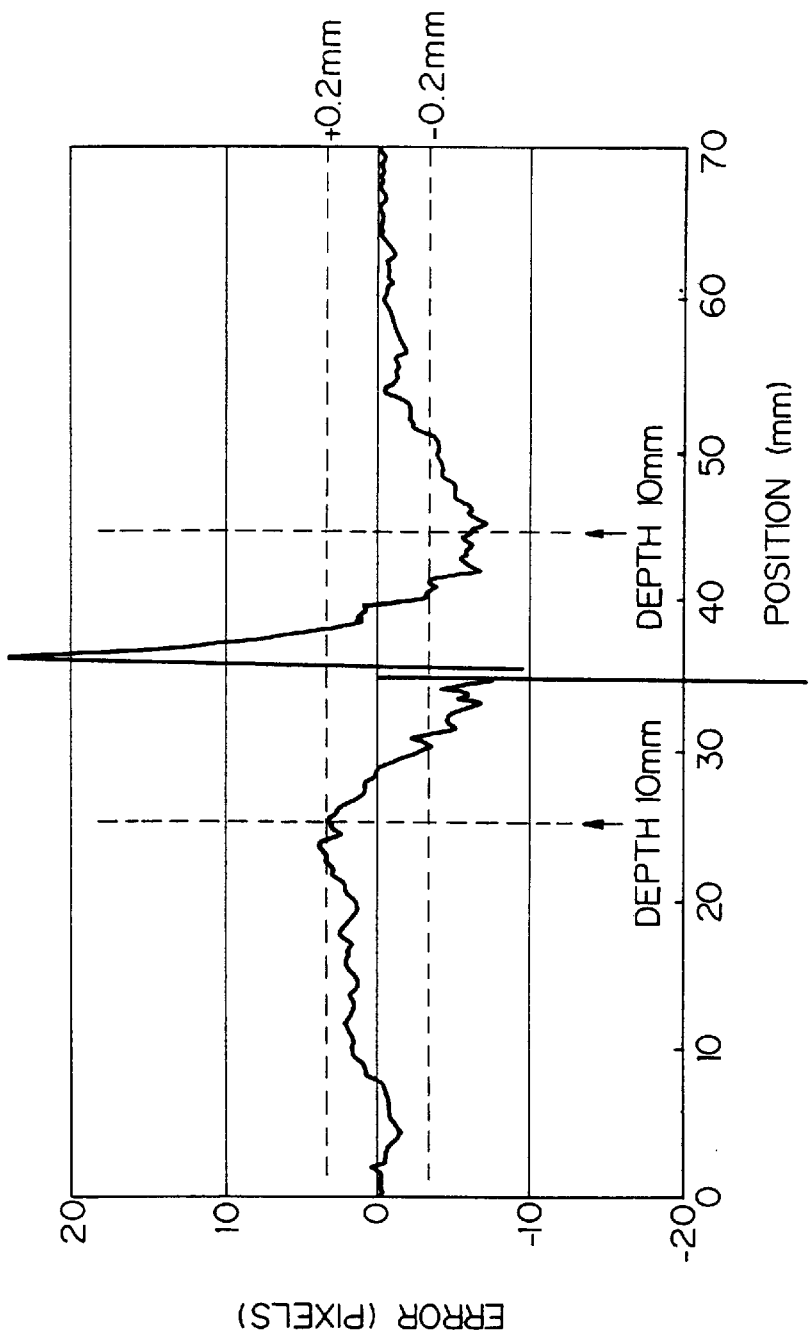
FIG. 61 shows depth detection errors particular to the illustrative embodiment.

The above embodiment is capable of detecting a bound portion as deep as up to 35 mm and the inclination of a bound portion as great as up to 90 degrees. In FIG. 60, a dotted curve shows the depth of the bound portion of a spread book while a solid curve shows a depth which the illustrative embodiment could actually measure with the above book. Specifically, when the depth of the bound portion was detected up to the depth of 10 mm with the beginning of the bound portion used as a restriction point, an error was as small as ±0.4 mm while the error range was ±0.2 mm.

FIG. 62 lists magnification errors particular to the above embodiment and representative of restoration accuracy in the subscanning direction. As shown, the embodiment achieves a magnification error of less ±10% in the range of depths of 10 mm and below. FIG. 63 lists bends in the subscanning direction and representative of restoration accuracy in the main scanning direction. As shown, the embodiment achieves a bend of less than ±0.5 mm in the range of depths of 10 mm and below.

Figure 64:
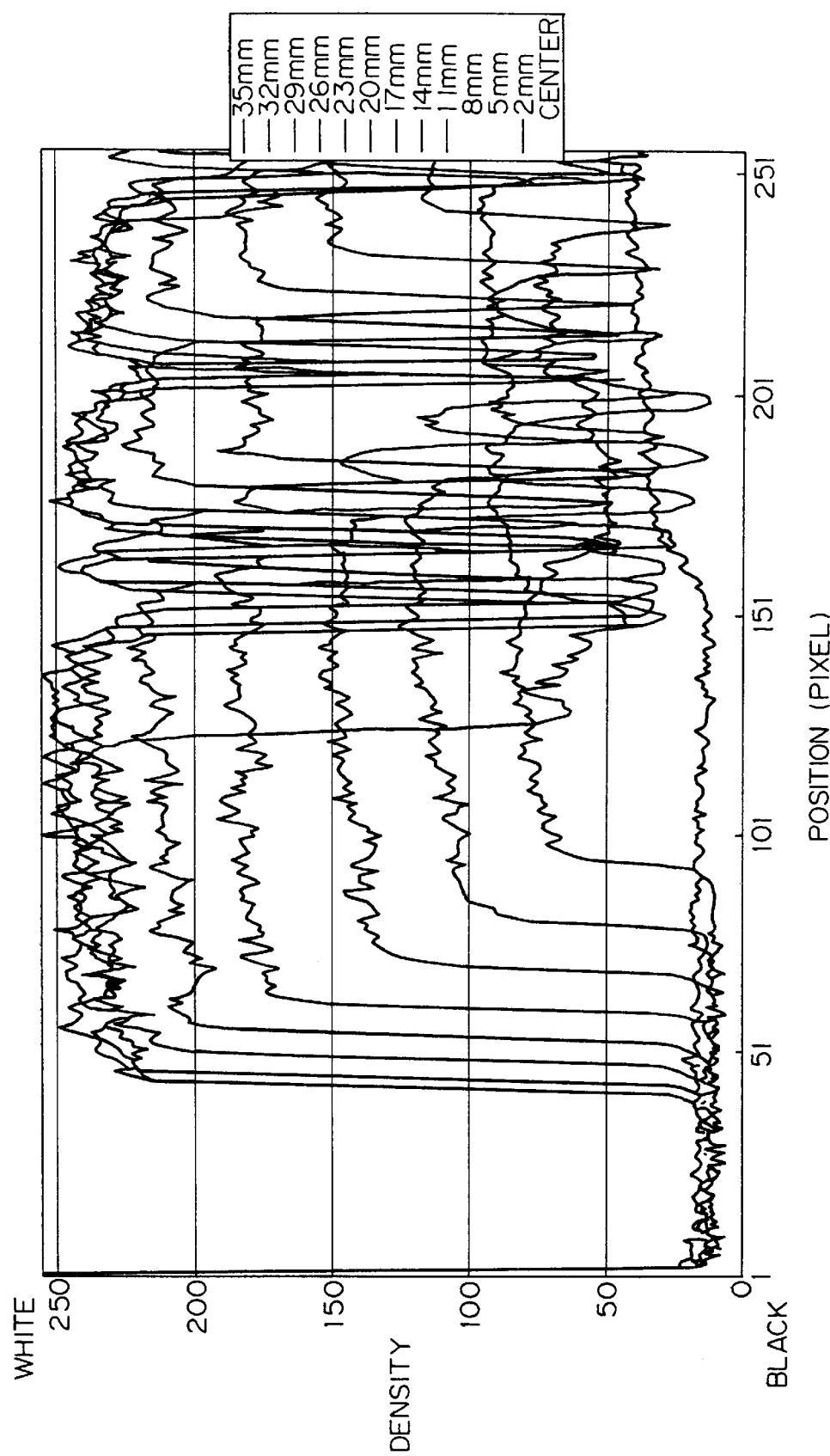
FIG. 64 shows the density distribution of data output from the scanner of the illustrative embodiment.

FIG. 64 shows a specific density distribution of image data output from the scanner by sampling the data at the intervals of 3 mm in the subscanning direction. As shown, a space portion, page background portions, rules and character portions are distributed. As FIG. 64 indicates, the background level is extremely low (dark) at the deep points of the bound portion, and noise-like irregularities occur in the page background portions. FIG. 65 shows a density distribution achievable with the illustrative embodiment and derived from the eight-pixel moving averages of the read data in the main scanning direction. It will be seen that the density distribution particular to the illustrative embodiment is far smoother than the distribution shown in FIG. 64.

The illustrative embodiment was found to be capable of detecting depths of up to 35 mm (corresponding to a 70 mm thick book) and detecting page boundary positions up to about 90° in terms of the inclination of the bound portion. Experiments showed that for the detection of page boundary positions use should preferably be made of moving averages in the main scanning direction, an adaptive threshold based on the black peak and white peak of a density distribution, and moving averages in the subscanning direction. Although the density distribution of a boundary extends over several pixels even at the focal plane due to the MTF of optics and obstructs the accurate detection of a boundary position, restoration is achievable because the relative position of a page boundary is smoothed.

Figure 32:
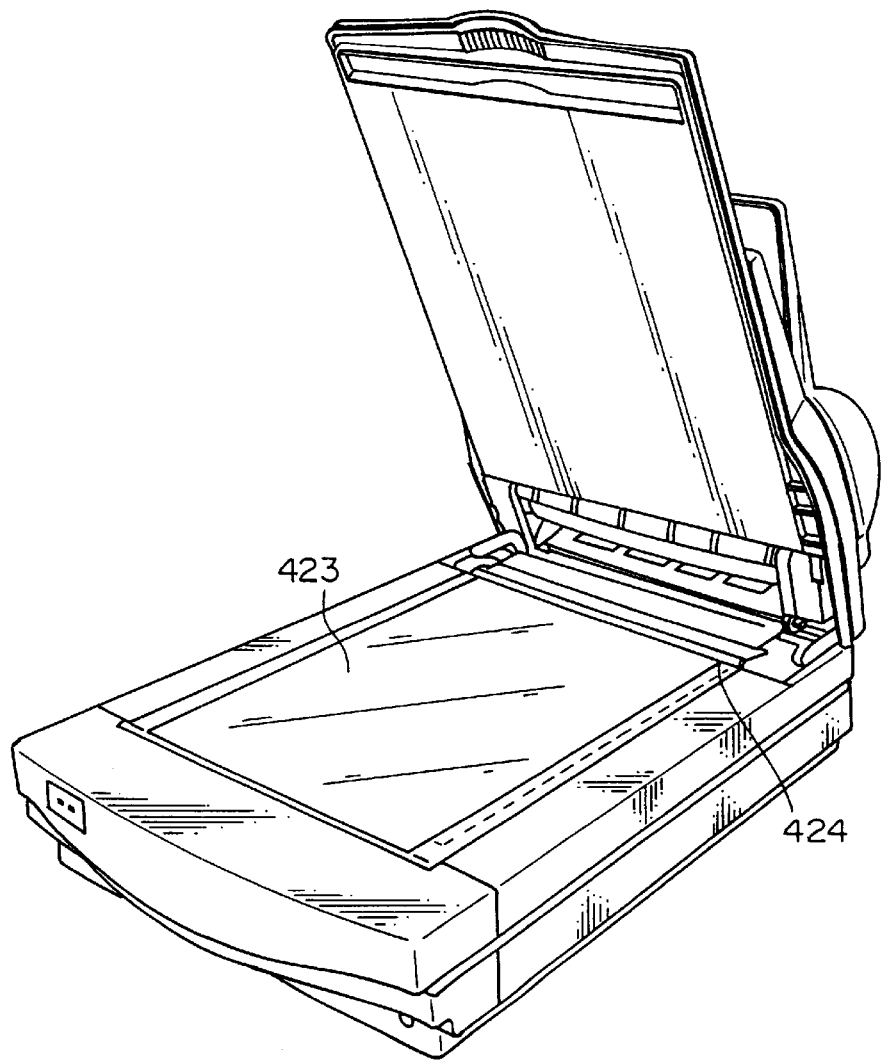
FIG. 32 is a perspective view of an image scanner included in the alternative embodiment.
Figure 33:
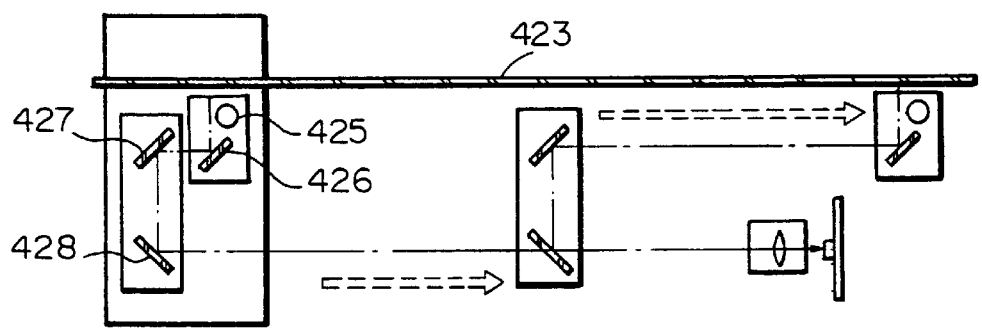
FIG. 33 shows optics arranged in the scanner of FIG. 32.

FIG. 32 shows a flat bed type scanner representative of an alternative embodiment of the present invention. As shown, the scanner includes a flat glass platen 423 on which a spread book is laid by using a scale 424 as a reference. As shown in FIG. 33, while a lamp 425 illuminates the document, the resulting reflection from the document is incident to an image sensor 430 via a group of mirrors 426–428 and a lens 429. The lamp 425 and mirrors 426–428 are moved to scan the document.

The alternative embodiment also includes the read processing means 408 and bound correcting means 409. Image data output from the image sensor 430 are sequentially processed by the read processing means 408 and bound portion correcting means 409. Again, the image scanner is connectable to the personal computer 422 shown in FIG. 31 via the I/F board 421. In the condition shown in FIG. 31, the image scanner may be driven by the personal computer 422 so as to send the image data output from the correcting means 409 to the computer 422.

Figure 34:
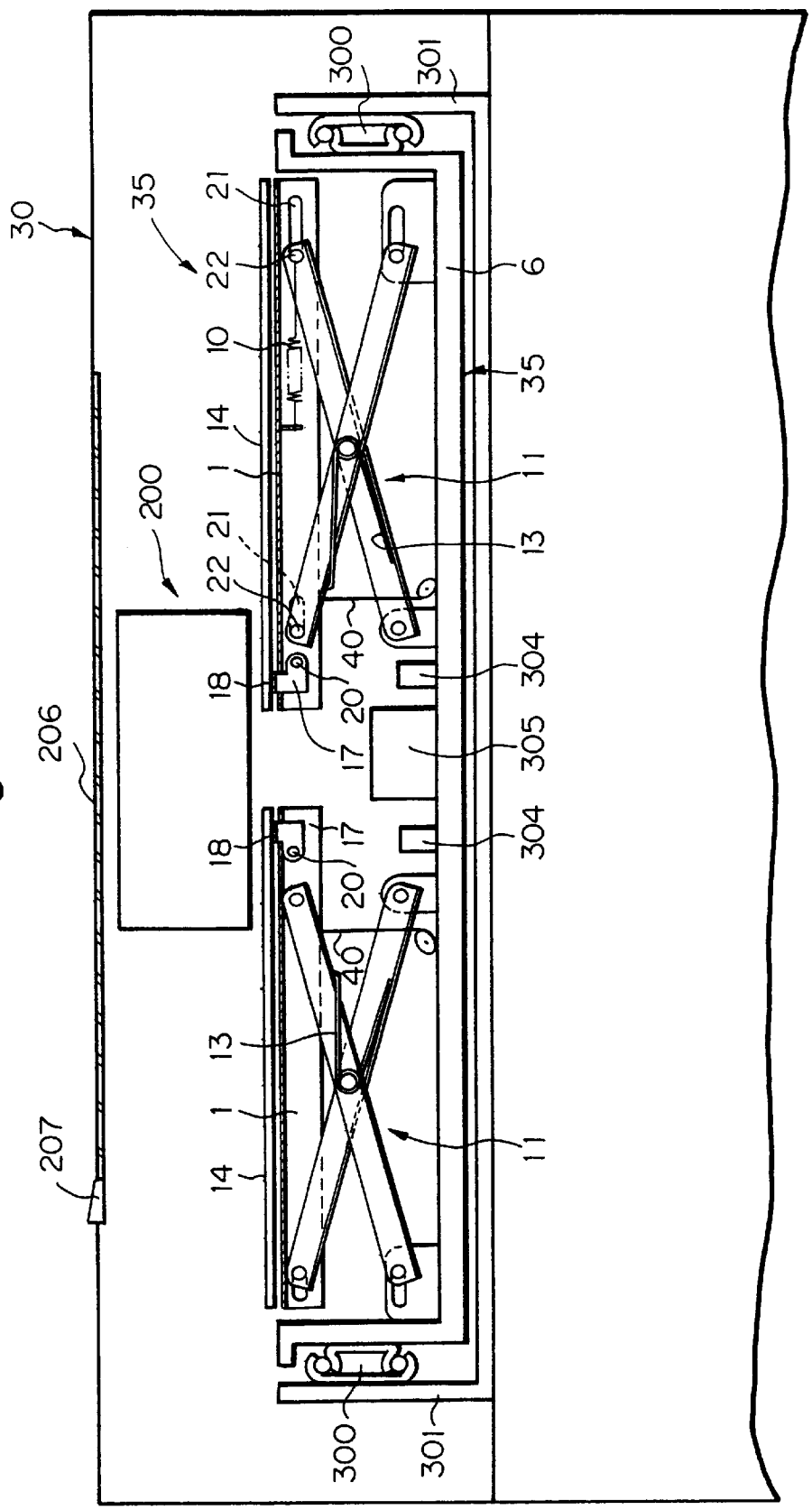
FIG. 34 shows a scanner representative of another alternative embodiment of the present invention.

Another alternative embodiment of the present invention will be described hereinafter which is implemented as an image forming apparatus capable of selectively copying a document in the form of a book or a sheet, as desired. FIG. 34 shows the arrangement of a scanner included in this embodiment. As shown, a scanning unit 200 has a glass platen 206 and a scale 207 mounted on the top of its body. A sheet is laid on the glass platen 206 and pressed by a cover plate not shown. The scanning unit 200 scans the sheet in order to read its image. The upper half of the scanner body is implemented as a scanner unit 30. The scanning unit 200 is movable in the right-and-left direction, as viewed in FIG. 34, within the scanner unit 30 while scanning the sheet.

Figure 35:
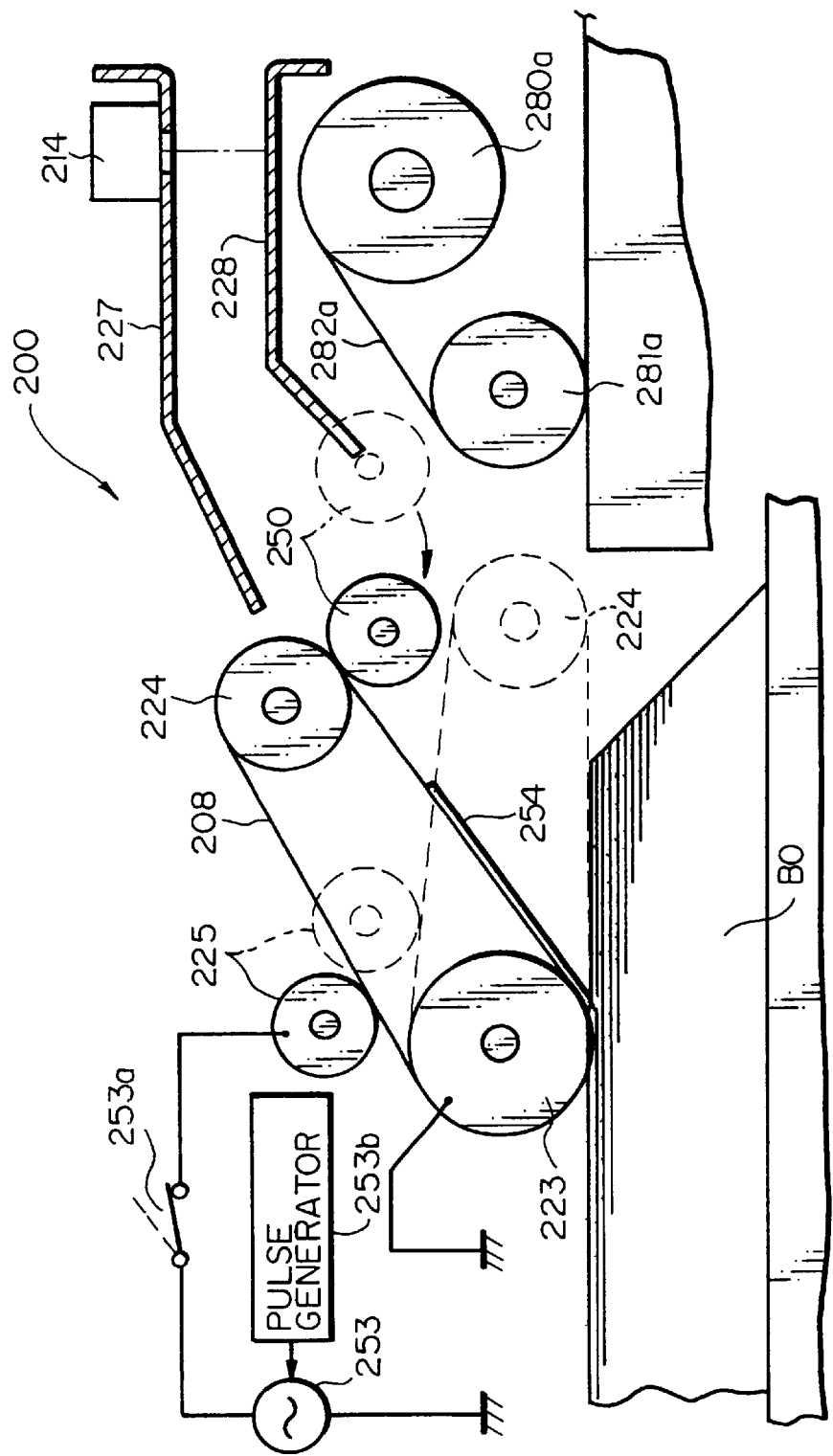
FIG. 35 is a section showing a page turning section included in the scanner of FIG. 34.

FIG. 35 shows a page turning section included in the scanning unit 200. A turn belt 208 for turning the page of a spread book is formed of PET, PC, PVT or similar material. The turn belt 208 has a double layer structure consisting of a front layer or film whose resistance is as high as $10^{14}$ Ω or above and a rear layer or film whose resistance is as low as $10^8$ Ω or below. A drive roller 223 for driving the turn belt 208 is made up of a metal roller connected to ground and conductive rubber covering the roller. With this configuration, the drive roller 223 insures the drive of the turn belt 208 and grounding. The turn belt 208 is passed over the drive roller 223 and a driven roller 224.

A charge roller 225 is implemented by a metal roller with or without a conductive rubber coating. An AC power source 253 applies a high voltage of ±2 kV to 4 kV to the charge roller 225 via a switch 253a at a preselected timing. The AC power source 253 is controlled by pulses output from a pulse generator 253b. While the scanning unit 200 is in movement with the turn belt 208 being driven, the switch 253a is turned on at a preselected timing which will be described. As a result, +2 kV to 4 kV matching with the frequency of the pulse generator 253b is applied from the AC power source 253 to the charge roller 225 via the switch 253a, producing an alternating electric field on the front of the turn belt 208. The resulting electrostatic attraction causes the top page 254 of a spread book BO contacting the turn belt 208 to adhere to the belt 208. The AC power source 253 is included in the scanning unit 200.

Figure 36:
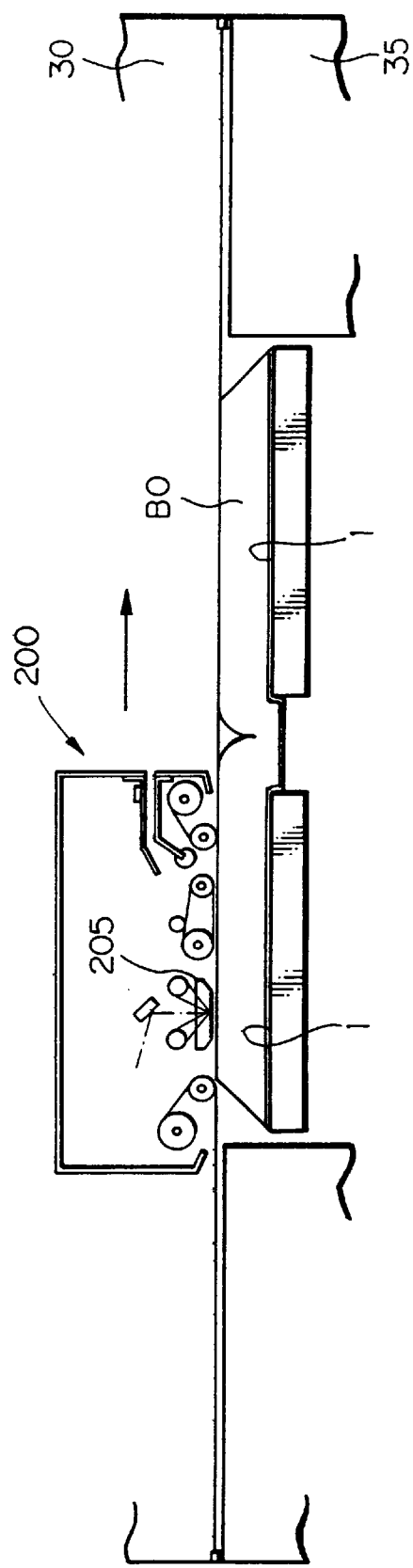
FIGS. 36–41 show the consecutive positions of a scanning unit included in the scanner of FIG. 34.

To start reading the spread book BO, the scanning unit 200 held at its home position defined at the left end of the scanning unit 30 moves to the right, as viewed in FIG. 36. At this instant, a solenoid, not shown, moves the turn belt 208 and a page feed roller 250 to positions indicated by solid lines in FIG. 35. As shown in FIG. 36, when a book reading position defined on the underside of the glass platen 205 reaches the left page of the book BO, the scanning unit 200 starts reading the book BO and sequentially reads it from the left page to the right page. The position where the scanning unit 200 starts reading the book BO depends on the size of the book BO.

Figure 37:
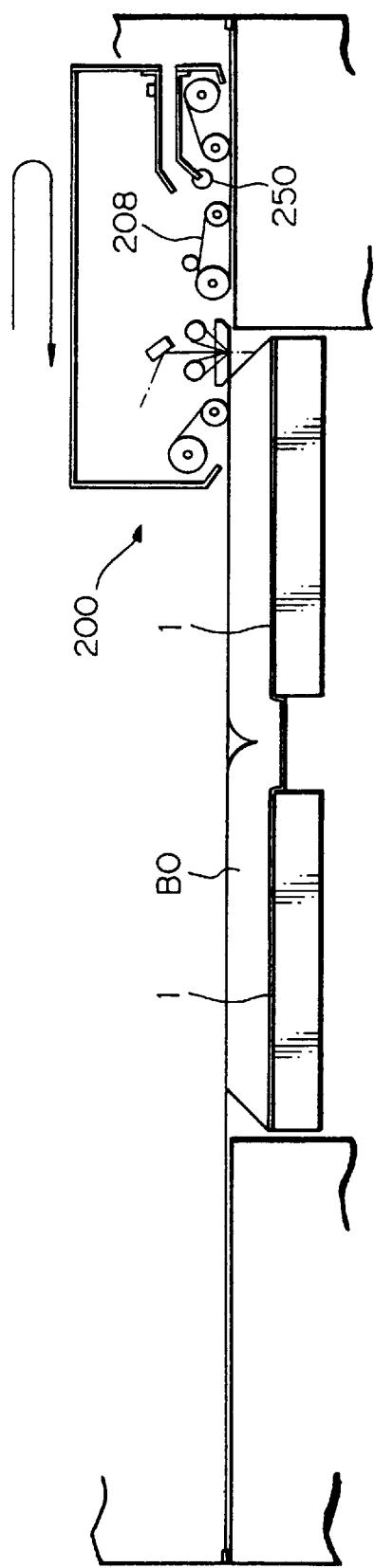

While the scanning unit 200 reads the document BO, as shown in FIG. 36, the turn belt 208 and page feed roller 250 are held in their solid line positions shown in FIG. 35. As shown in FIG. 37, when the scanning unit 200 fully reads the document BO to the edge of the right page, the running direction of the unit 200 is reversed. At this time, the turn belt 208 and page feed roller 250 are moved to positions indicated by phantom lines in FIG. 35 by the solenoid. Substantially at the same time, the switch 253a is turned on with the result that the AC voltage having a preselected frequency is applied from the AC power source 253 to the charge roller 225, forming a charge pattern on the front of the turn belt 208.

Figure 38:
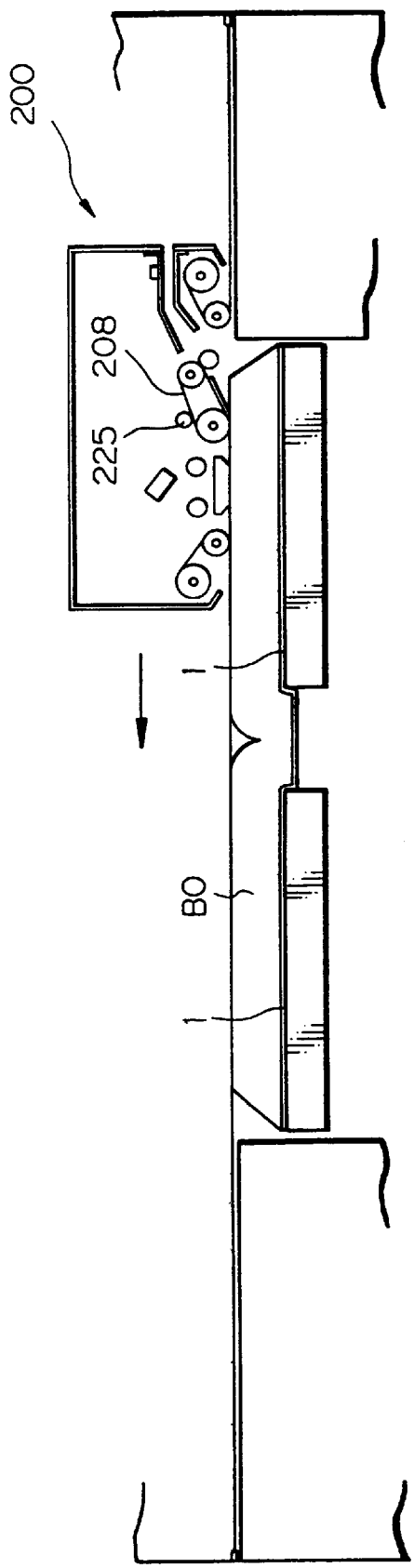

When the page of the book BO is to be turned over, the turn belt 208 and page feed roller 250 are held in the phantom line positions shown in FIG. 35. Before the scanning unit 200 starts turning over the right page, a charge pattern formed on the front of the turn belt 208 is caused to overly the top page 254 of the book BO. When the edge of the top page 254 moves over the center of the lower run of the turn belt 208, the belt 208 and page feed roller 250 are moved to the solid line positions shown in FIG. 35 by the solenoid, as shown in FIG. 38. As a result, only the top page 254 is cause to adhere to the front of the turn belt 208 by the electrostatic attraction of the partial electric field formed on the belt 208 by the charge pattern. Therefore, the edge of the top page 254 is lifted together with the turn belt 208.

Figure 39:
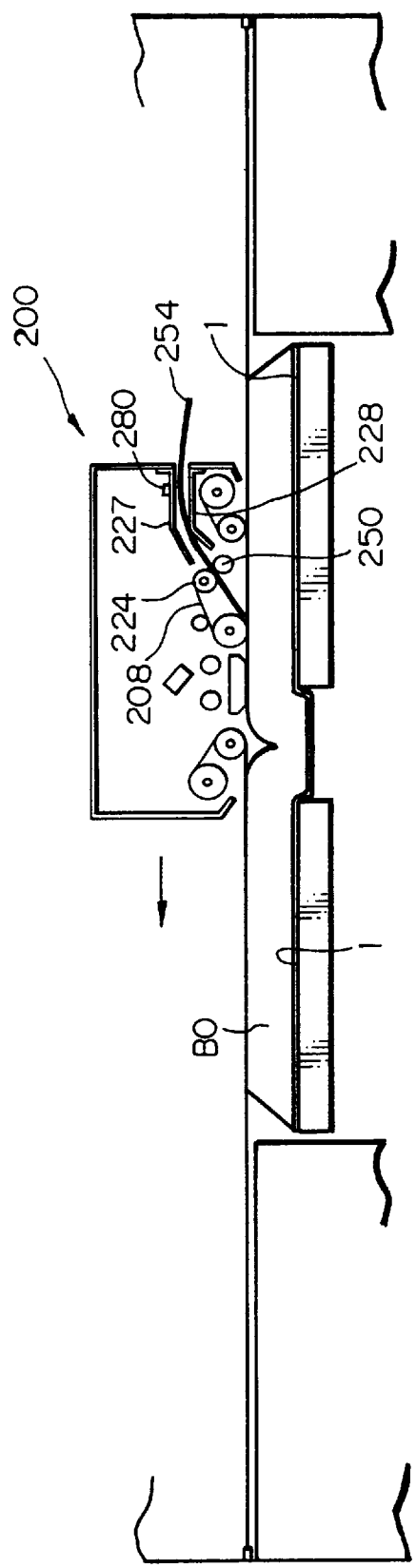

The scanning unit 200 runs toward its end home position while lifting the top page 254, as shown in FIG. 38. As a result, as shown in FIG. 39, the top page 254 is surely conveyed by being nipped between the turn roller 224 and the page feed roller 250. The top page 254 has its edge sequentially fed out to the outside of the scanning unit 200 via the path between the page guides 227 and 228 positioned at the right end of the scanning unit 200. The page sensor 214 mounted on the upper page guide 227 senses the top page 254 protruding to the outside of the scanning unit 200, and shows that the top page 254 has been accurately lifted.

Figure 40:
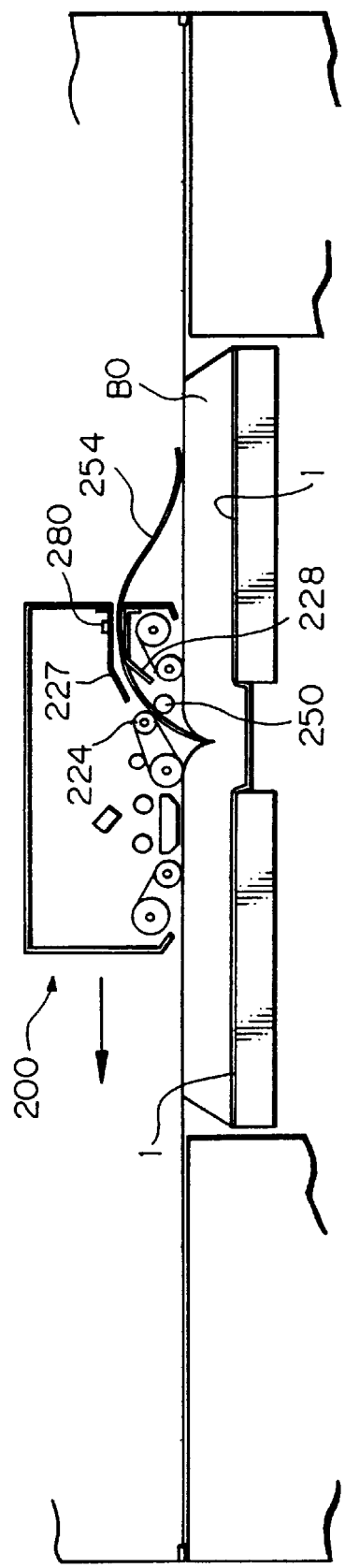
Figure 41:
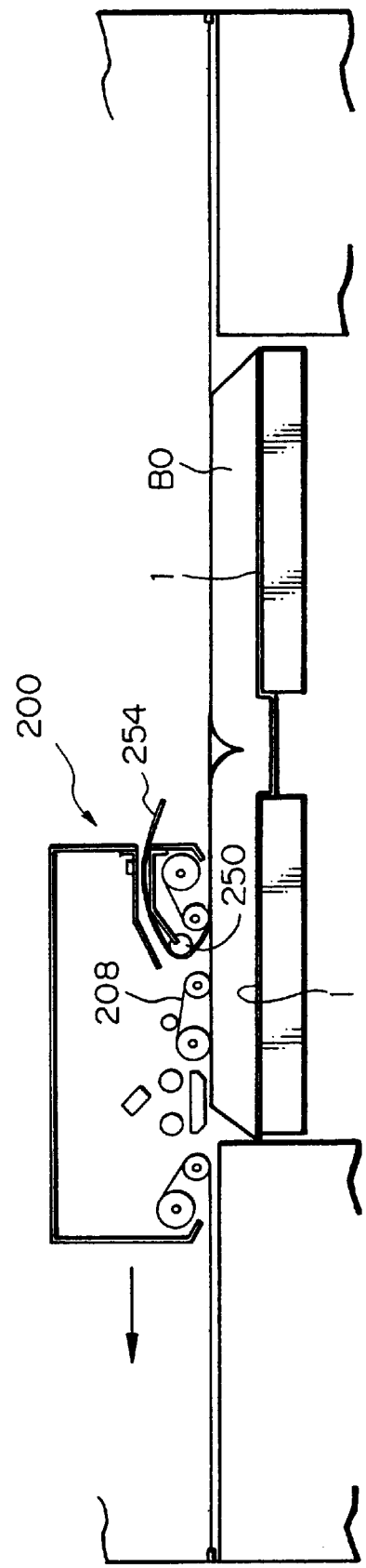

Subsequently, as shown in FIG. 40, as soon as the top page 254 is lifted up to the bound portion of the book BO, the turn belt 208 and page feed roller 250 return to their phantom line positions shown in FIG. 35. As the scanning unit 200 further moves toward its end home position, the page 254 is pulled by the bound portion of the book BO and sequentially laid on the left page of the book BO while sequentially coming out of the path between the page guides 227 and 228.

When the top page 254 is fully laid on the left page of the book BO, the scanning unit 200 completes a single image reading and page turning operation. To repeat the image reading and page turning operation with the book BO or to repeat either the image reading operation or the page turning operation, the scanning unit 200 is reversed as soon as the top page 254 is fully laid on the left page, and caused to repeat its reciprocating movement at the shortest distance to the surface of the book BO. It is to be no ted that the scanning unit 200 may be operated only to read the images of the book BO or only to turn over the pages of the book BO.

To turn over the top page 254 electrostatically adhered to the turn belt 208, the turn belt 208 is lifted by the solenoid so as to raise the edge of the page 254 toward the scanning unit 200. At this instant, the page sensor 214 determines whether or not the page 254 has been successfully lifted. When the page sensor 214 does not sense the page 254 at a preselected timing, the scanning unit 200 repeats the above page turning operation.

Figure 42:
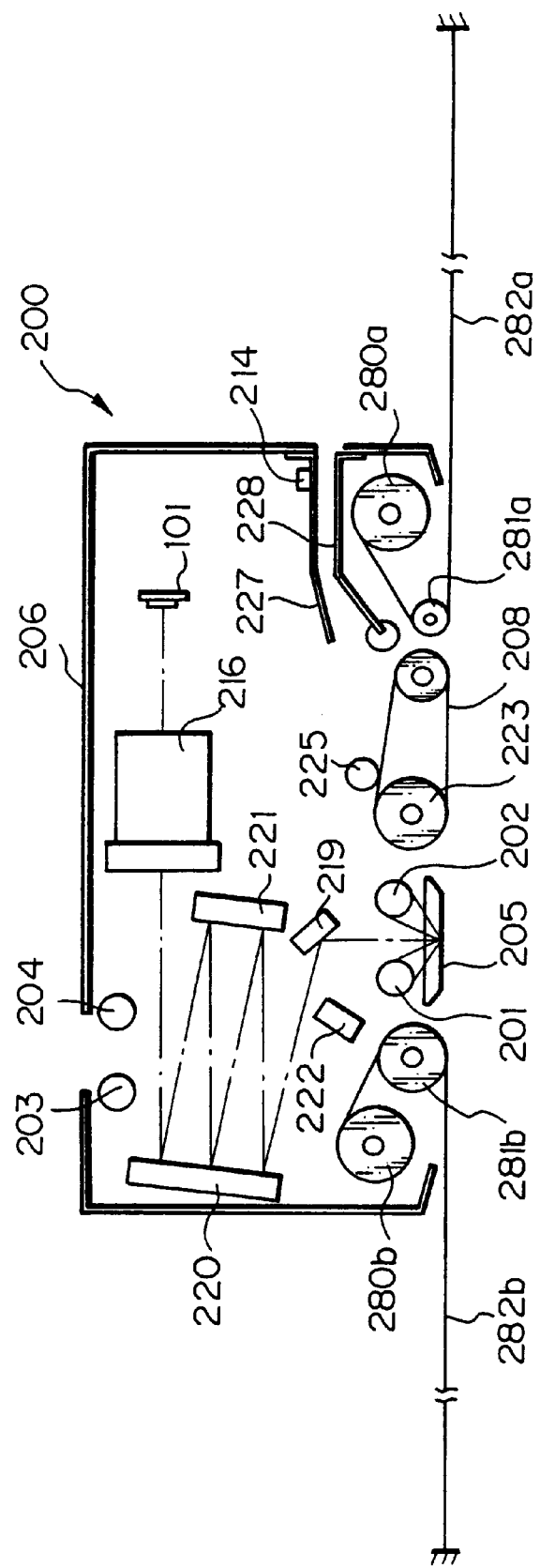
FIG. 42 is a section of the scanning unit.

As shown in FIG. 42, the retractable mirror 222 is driven by a mirror switching solenoid to move into or out of the optical path, thereby selecting either the optical path assigned to a book or the optical path assigned to a sheet. The fluorescent lamps 201 and 202 mounted on the scanning unit 200 are used to illuminate a book. Two fluorescent lamps 203 and 304 are positioned above the lamps 201 and 202 in order to illuminate a sheet.

Specifically, to read a sheet laid on the glass platen 206, the mirror 222 is brought into the optical path, so that the lamps 203 and 204 illuminate the document. The resulting reflection from the sheet is incident to the CCD image sensor of the image reading board 101 via the mirrors 222, 220 and 221 and lens 216. On the other hand, to read a book laid on the right and left tables 1, the mirror 222 is retracted from the optical path, so that the lamps 201 and 202 illuminate the document via the glass platen 205. The resulting reflection from the sheet document is incident to the CCD image sensor via the mirrors 219, 220 and 221 and lens 216.

Figure 43:
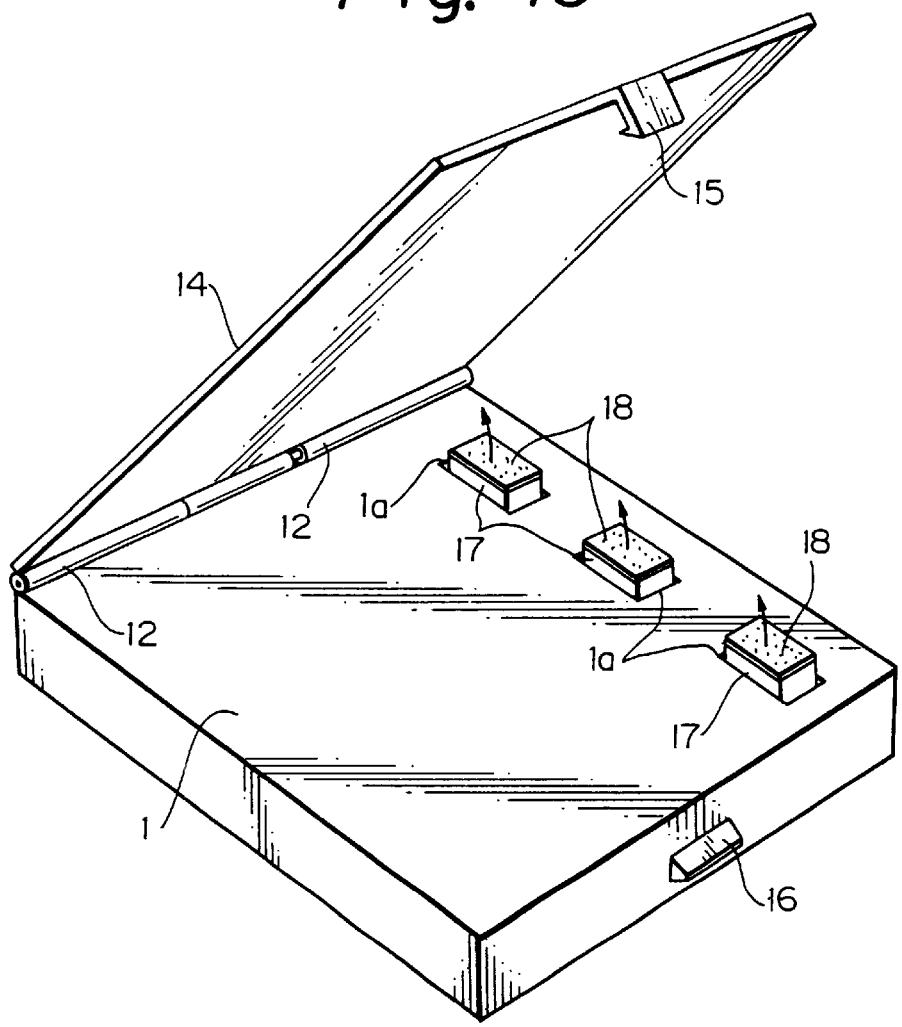
FIG. 43 is a perspective view of a table unit included in the embodiment of FIG. 34.

As shown in FIG. 34, the right and left tables 1 are disposed in a table unit 36, and each is movable up and down by being driven by a respective link mechanism 11. A spring 13 is anchored to each link mechanism 11 and constantly biases the associated table 1 upward. As shown in FIG. 43, a press plate 14 is rotatably connected to the rear side of each table 1 by a hinge 12. A catch 15 is provided on the free end of the press plate 14. When the press plate 14 is lowered onto the table 1, as viewed in FIG. 43, the catch 15 catches a stop 16 provided on the front end of the table 1. Because such a stop mechanism is arranged on the front on the table unit 36, the press plate 14 is easy to handle.

A plurality of holes 1a are formed in the top of each table 1. A fixing member 17 is received in the respective hole 1a while partly protruding from the hole 1a. A rubber plate 18 is fitted on each fixing member 17 in order to surely press and affix the front cover or the rear cover of the book BO. The fixing members 17 are rotatably supported by a shaft 20 (see FIG. 44) affixed to the portion of each table 1 adjoining the center of the scanner unit 30. The fixing members 17 each is constantly biased by a respective spring, not shown, in the direction indicated by an arrow in FIG. 43.

Figure 44:
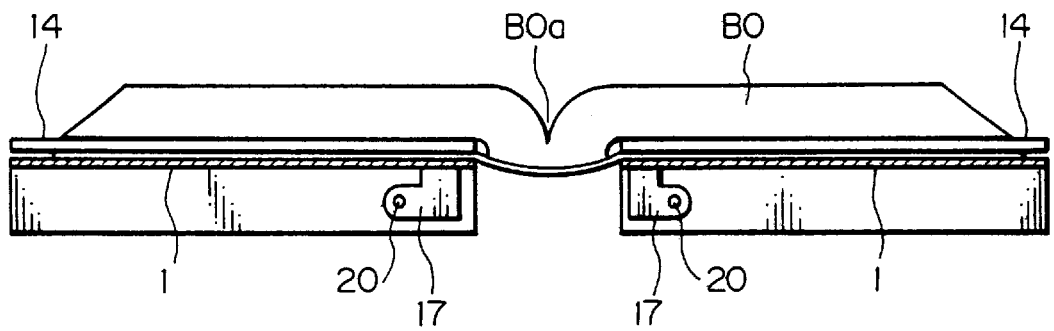
FIG. 44 is a section of a book loading section included in the embodiment of FIG. 34.

As shown in FIG. 44, the book BO is surely retained on the left and right tables 1 with its front cover and rear cover respectively held between the tables 1 and the press plates 14. The catch 15 of each press plate 14 is engaged with the stop 16 of the associated table 1. Because the fixing members 17 are arranged in the vicinity of the center of the scanner unit 30, the front cover and rear cover of the book BO are pressed between the fixing members 17 and the press plates 14 at their portions adjoining the bound portion labeled BOa in FIG. 52. This allows the book BO to be more surely fixed in place on the tables 1.

When the press plates 14 are locked to the associated tables 1 while the book BO is absent, a gap of several millimeters exists between each press plate 14 and the table 1 facing each other. Such gaps allow even a book having relatively thick front and rear covers to be fixed in place on the tables 1. Further as shown in FIG. 34, the left table 1 is movable only in the up-and-down direction in order to prevent the book BO from being dislocated. On the other hand, the right table 1 is movable not only in the up-and-direction but also in the right-and-left direction, as viewed in FIG. 34, via slots 21. A spring 10 constantly biases the right table 1 leftward, as viewed in FIG. 34. When shafts 22 each being slidably received in the respective slot 21 abut against the edges of the slots 21, the leftward movement of the right table 1 is stopped.

The illustrative embodiment further includes table pressure switching devices and table retracting devices each to being associated with the respective table, as follows. The tables 1 movable up and down each is constantly biased upward by the respective spring 13, as stated with reference to FIG. 34. Therefore, in a table press mode in which the table unit 35 is received in the scanner unit 30, the tables 1 constantly press the book BO spread thereon upward such that the right and left pages of the book BO are pressed against the bottom of the scanning unit 200.

The pressures exerted by the top pages of the spread document BO usually act on the scanning unit 200. However, when the scanning unit 200 is moved to a position outside of the book BO, it is likely that the tables 1 and book BO move further upward into the scanner unit 30 because the tables 1 are biased upward, obstructing the smooth movement of the scanning unit 200. It is therefore necessary that the tables 1 be fixed in place on reaching an adequate level. Further, when the mirror 222 is switched in order to read a sheet laid on the glass platen 206, the tables 1 must be retracted to the lower portion of the table unit 35 so as not to contact the bottom of the scanning unit 200.

Figure 45:
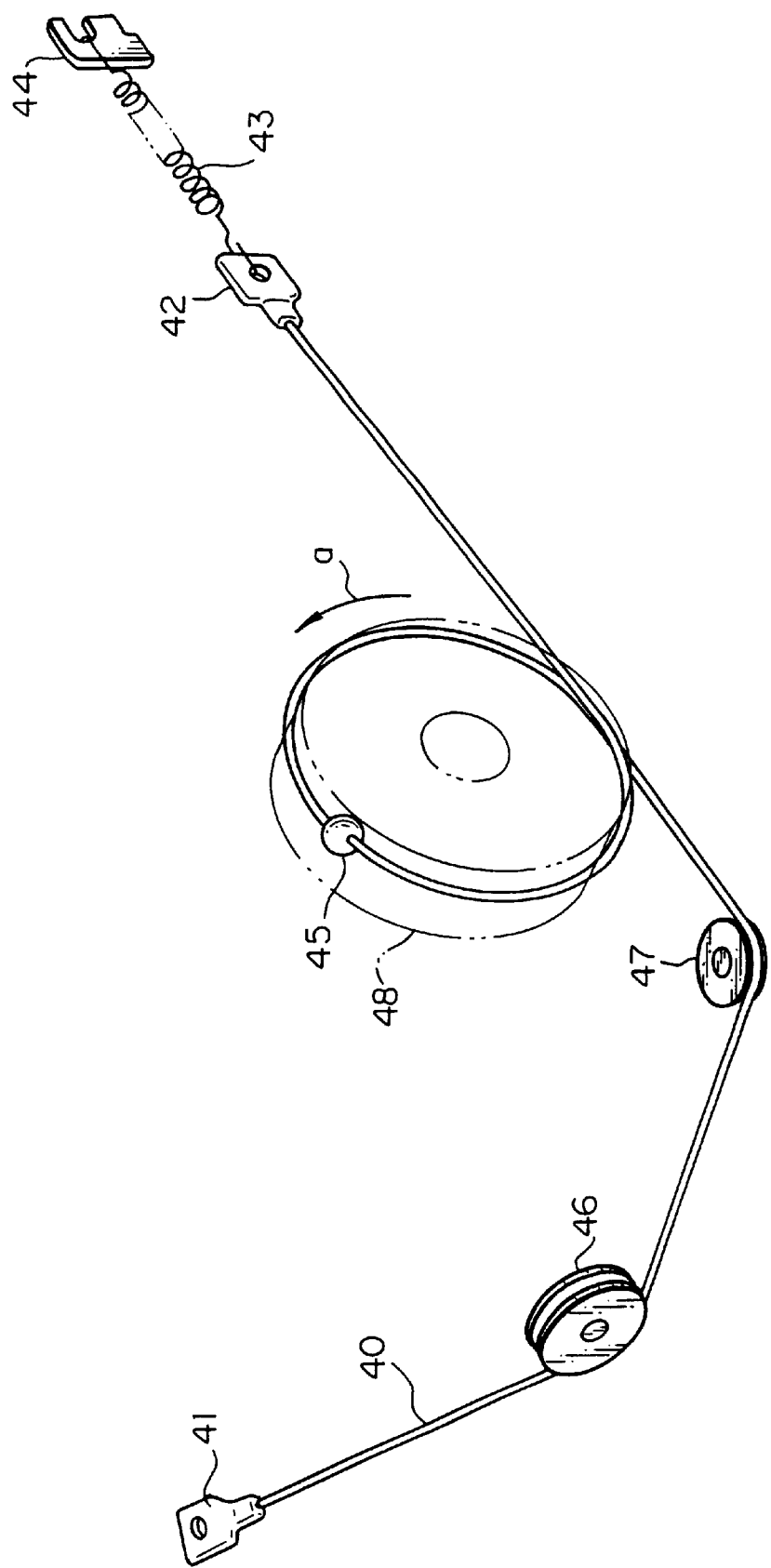
FIG. 45 is a perspective view of a table pressure switching device and a table retracting device included in the embodiment of FIG. 34.

Each table pressure switching device and associated table retracting device to be described satisfy the above conditions and are implemented by a single mechanism, as will be described with reference to FIGS. 45–49. As shown in FIG. 45, a control wire 40 has a hook 41 affixed to one end thereof. Another hook 42 is affixed to the other end of the control wire 40 while a stop ball 45 is affixed to substantially the intermediate between the opposite ends of the wire 40.

Figure 46:
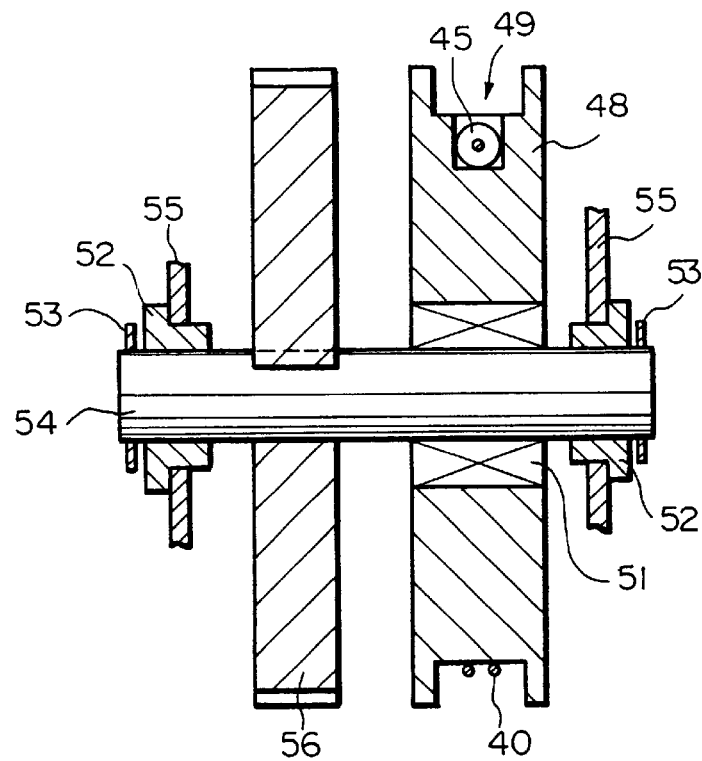
FIG. 46 is a section of the devices shown in FIG. 45.
Figure 47:
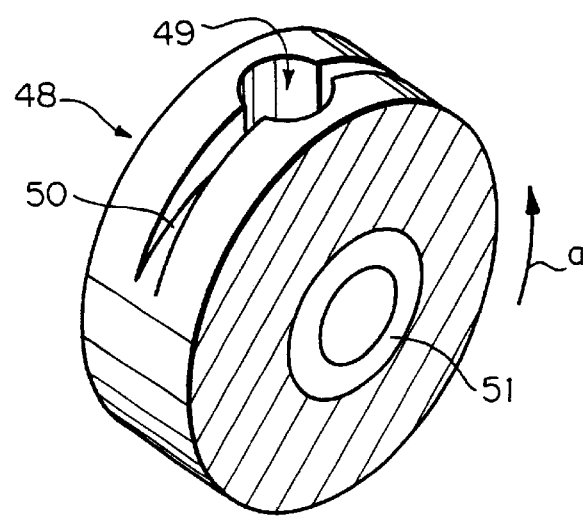
FIG. 47 is a perspective view of a control pulley included in the devices shown in FIG. 45.

The hook 41 is affixed to the outer end of the link mechanism 11 which moves up and down due to the movement of the table 1. The control wire 40 extending from the hook 41 has its direction changed by pulleys 46 and 47 and is wound round a control pulley 48. As shown in FIGS. 46 and 47, the control wire 40 is received in a groove 50 formed in the control pulley 48 while the stop ball 45 is received in a bore 49 also formed in the pulley 48. In this condition, the movement of the control wire 40 is surely transformed to the rotation of the control pulley 48.

A tension spring 43 is anchored at one end thereof to the hook 42 of the control wire 40. The other end of the spring 43 is anchored to a hook 44 affixed to a base 6 included in the table unit 35. The spring 43 therefore constantly pulls the control wire 40. As shown in FIG. 46, the control pulley 48 is supported by a shaft 54 via a one-way clutch 51. Slide bearings 52 each is mounted on one of opposite side walls 55. The shaft 54 is rotatably supported by the slide bearings 52 while being prevented from slipping out by E rings 53. In this configuration, the control pulley 48 is freely rotatable relative to the shaft 54 in one direction a shown in FIG. 47, but prevented from rotating in the other direction relative to the shaft 54 by the one-way clutch 51. Therefore, when the shaft 54 is locked by a mechanism which will be described, the control pulley 48 is rotatable only in the direction a as when the table 1 is lowered.

How the table pressure switching device moves the table 1 downward and fixes it as follows. In FIGS. 45–47, assume that the table 1 is pressed downward by some extraneous force, e.g., the weight of the book BO or the pressure ascribable to page turning. Then, the end portion of the control wire 40 including the hook 41 and affixed to the table 1 slackens. At the same time, the control pulley 48 rotates in the direction a while absorbing the slack of the control wire 40, allowing the wire 40 to move toward the hook 44 side while maintaining its initial tension. Because the control pulley 48 is not movable in the direction opposite to the direction a due to the one-way clutch 51, it is prevented from rotating in the above direction despite the bias acting of the table 1 even though the bias may exceed the pressure forcing the table 1 downward. As a result, the control pulley 48 is stopped in the position rotated in the direction a. The control wire 40 wound round the control pulley 48 is also stopped. The table 1 is therefore brought to a stop at its lowered position.

Figure 48:
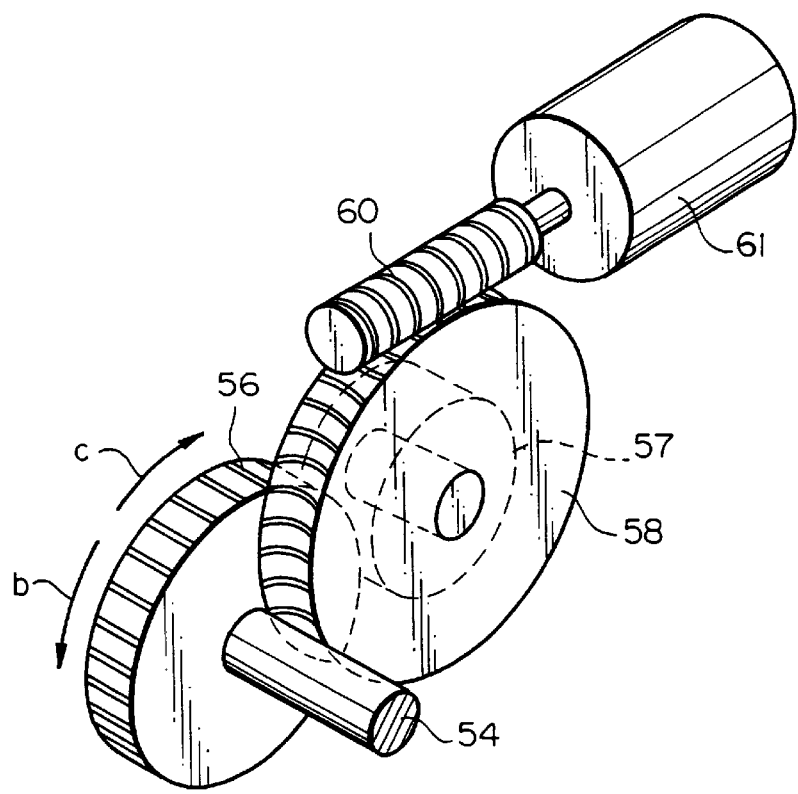
FIG. 48 is a fragmentary perspective view of the devices shown in FIG. 45.
Figure 49:
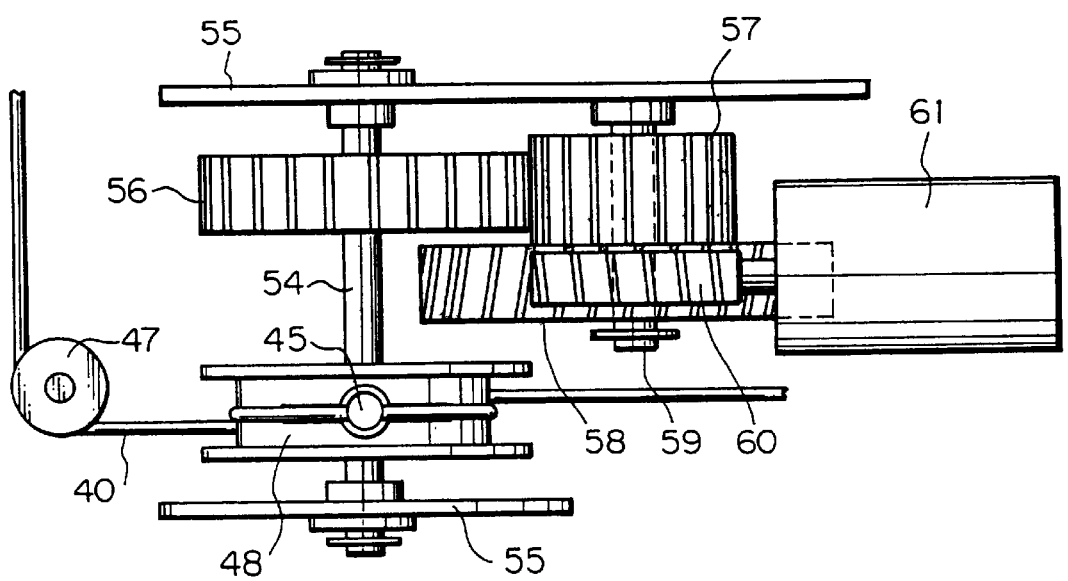
FIG. 49 is a fragmentary side elevation showing another portion of the devices shown in FIG. 45.

The shaft 54 is locked by the following table moving mechanism. As shown in FIG. 48, a gear 56 is affixed to the shaft 54 and rotatable integrally with the shaft 54. As shown in FIG. 49, the gear 56 is held in mesh with another gear 57 rotatably supported by a stud 59 which is affixed to the side wall 55. The rotation of the gear 56 is transmitted to the gear 57. The gear 57 is molded integrally with a worm wheel 58. A worm gear 60 affixed to the output shaft of a table motor 61 is held in mesh with the worm wheel 58. In this configuration, when the motor 61 is not energized, the worm wheel 58 meshing with the worm gear 60 cannot rotate and locks the shaft 54 connected to the worm wheel 58 via the gears 57 and 56.

Figure 50:
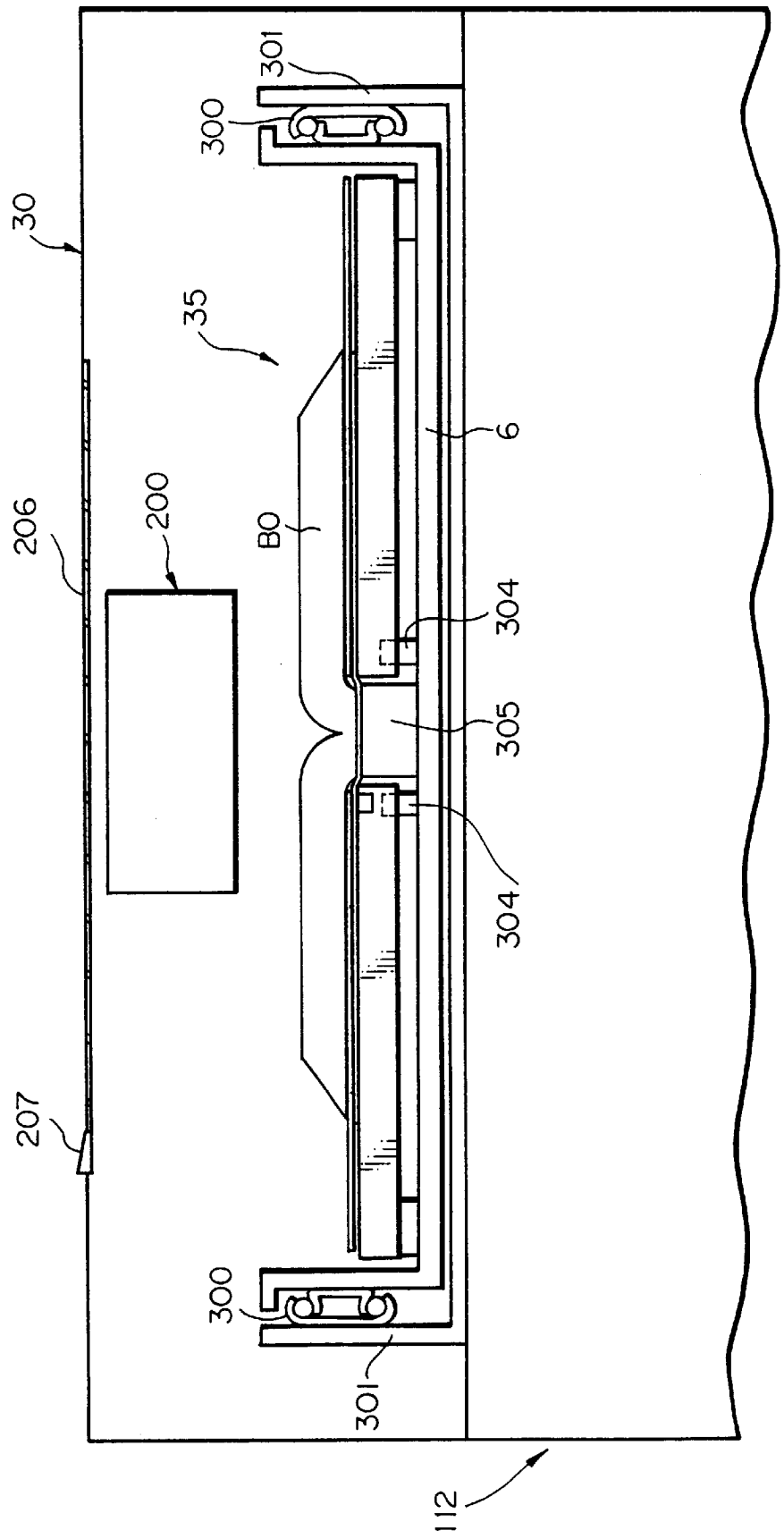
FIG. 50 is a section showing tables brought to their retracted positions.
Figure 51:
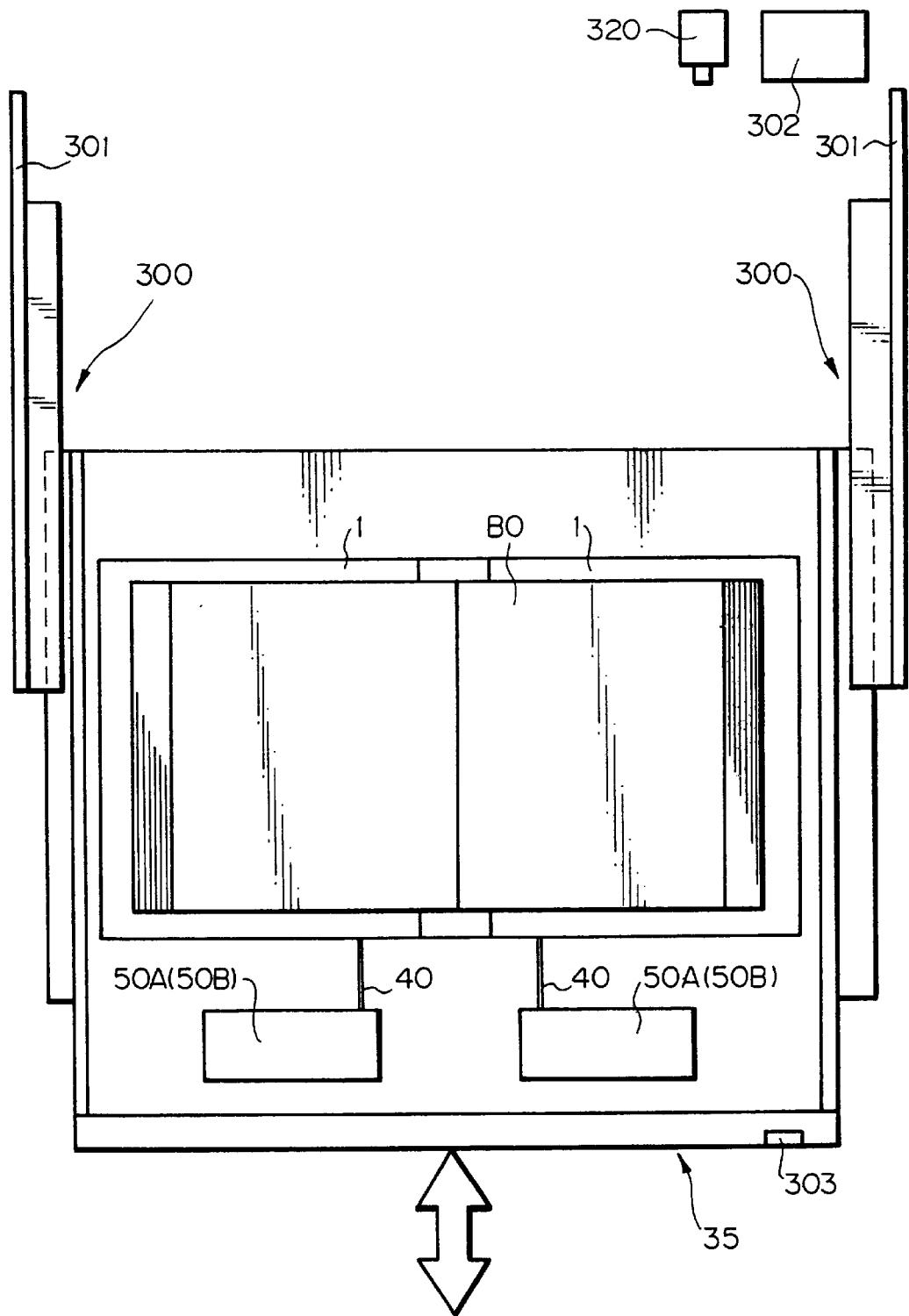
FIG. 51 is a plan view showing the tables in the retracted positions.

A procedure for retracting the tables 1 to the lower portion of the table unit 35 will be described. In FIGS. 48 and 49, when the table motor 6 1 is so driven as to rotate the gear 56 in a direction b, the control pulley 48 and shaft 54 are rotated integrally via the one-way clutch 51. As a result, the control pulley 48 is rotated in the direction a, causing the control wire 40 to move toward the hook 44 side. As shown in FIGS. 34 and 51, such a movement of the control wire 40 causes the associated table 1 to move downward. When a right and a left lower limit sensor 304 (see FIG. 50) respectively sense the right and left tables 1, the table motors 61 is deenergized in order to stop the tables 1. That is, the tables 1 each is retracted to the lower portion of the table unit 35 spaced from the scanning unit 200, as shown in FIG. 50. This procedure is executed at the time of power-up, in a waiting status in which the reading operation is not performed, when a sheet laid on the glass platen 206 is read, and when the table unit 35 is drawn out.

The tables 1 are pushed upward to the upper portion of the table unit 35, as follows. As shown in FIGS. 48 and 49, when each table motor 61 is so driven as to rotate the gear 56 in a direction c, the shaft 54 is rotated in the direction opposite to the direction a, FIG. 45, with the result that the control pulley 48 becomes freely rotatable relative to the shaft 54 due to the one-way clutch 51. In the illustrative embodiment, the torsion springs 13 biasing the tables 1 upward each exerts a force greater than the force pulling the control wire 40 downward.

Therefore, while the control pulley 48 is freely rotatable in the direction opposite to the direction a, the associated control wire 40 moves to the hook 41 side due to the action of the spring 13 biasing the table 1 upward. As a result, in FIG. 34, the right and left tables 1 rise and press the opposite pages of the book BO spread thereon against the scanning unit 200.

As stated above, when the table motors 61 are continuously driven with the opposite pages of the spread book BO contacting the scanning unit 200, the shafts 54 become freely rotatable relative to the control pulley 48 due to the associated one-way clutches 51 and hold the book BO in contact with the scanning unit 200. This operation is executed only when the scanning unit 200 is positioned above the tables 1.

As shown in FIG. 34, the table pressure switching device and table retracting device, respectively labeled 50A and 50B, are provided in a pair for each of the right and left tables 1. Two pairs of these devices are controlled independently of each other in accordance with the position of the scanning unit 200. More specifically, two table motors 61 are respectively assigned to the above two pairs and controlled independently of each other.

Figure 52:
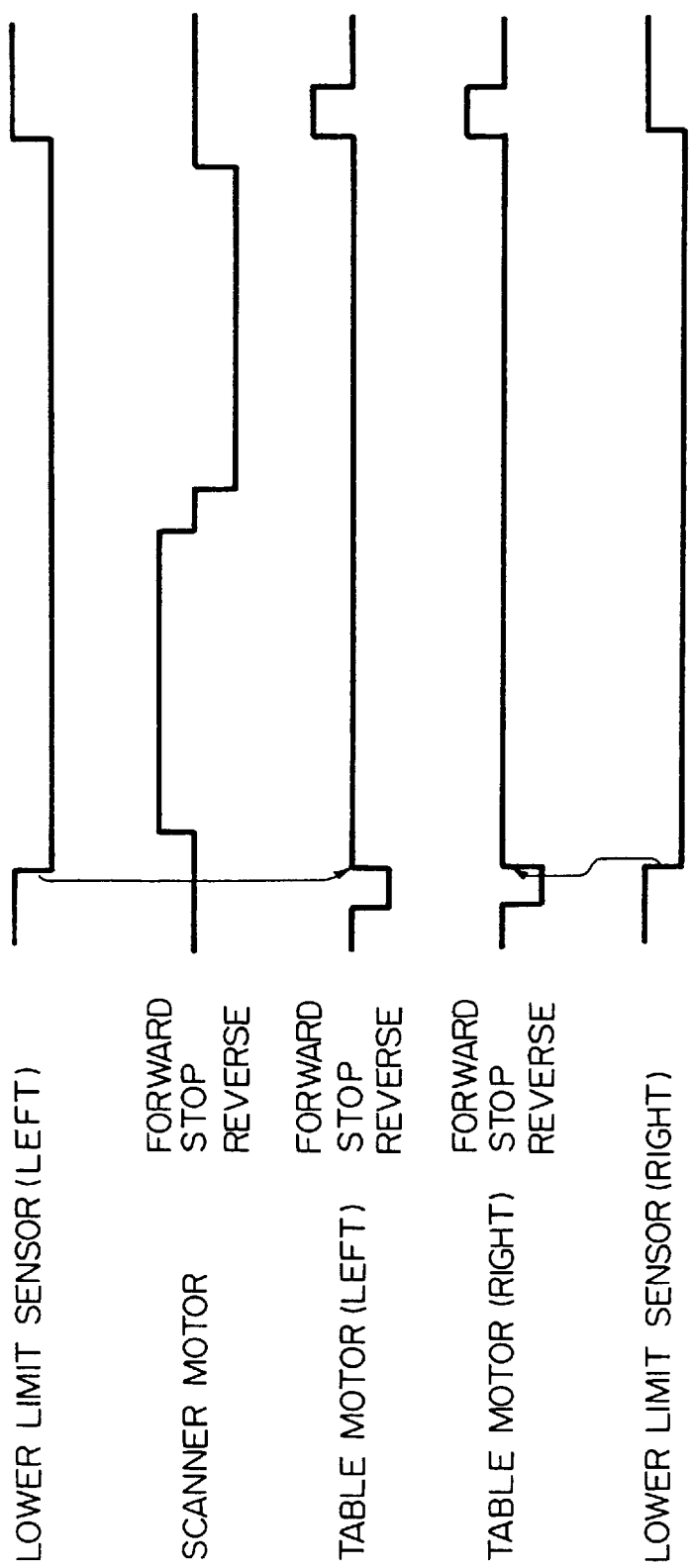
FIG. 52 is a timing chart demonstrating the retraction of the tables.

FIG. 51 shows the retraction of the tables 1 in the above retract mode while FIG. 52 demonstrates it in a timing chart. As shown in FIG. 52, before the start of movement of the scanning unit 200, the right and left table motors 61 are reversed until the right and left lower limit sensors 304 respectively sense the right and left tables 1. As a result, the two tables 1 are lowered to the positions shown in FIG. 50. Subsequently, the scanner motor 106 is energized to move, repeatedly if necessary, the scanning unit 200 in the preselected direction. At the end of the retract mode, the scanning unit 200 returns to its center home position. At this time, the two table motors 60 each makes a preselected number of rotations forward, raising the associated table 1 to its original position.

To read a sheet laid on the glass platen 206, the scale 207 is used as a reference for positioning the edge of the sheet. This reference differs from the read start position assigned to a book and minimizes the configuration. Therefore, the point where the scanning unit 200 starts reading a sheet remains constant, and the control is simplified. In the sheet mode, after the tables 1 have been retracted downward, the scanning unit 200 moves to the left from its center home position. When the end HP sensor senses the scanning unit 200 reached the end home position shown in FIG. 53, the scanning unit 200 is brought to a stop. The scanning unit 200 waits in this condition until the operator inputs desired reading conditions and operates the start switch. On the operation of the start switch, the scanner motor 106 is energized to cause the scanning unit 200 to move to the right, as viewed in FIG. 34, while scanning the sheet.

Figure 54:
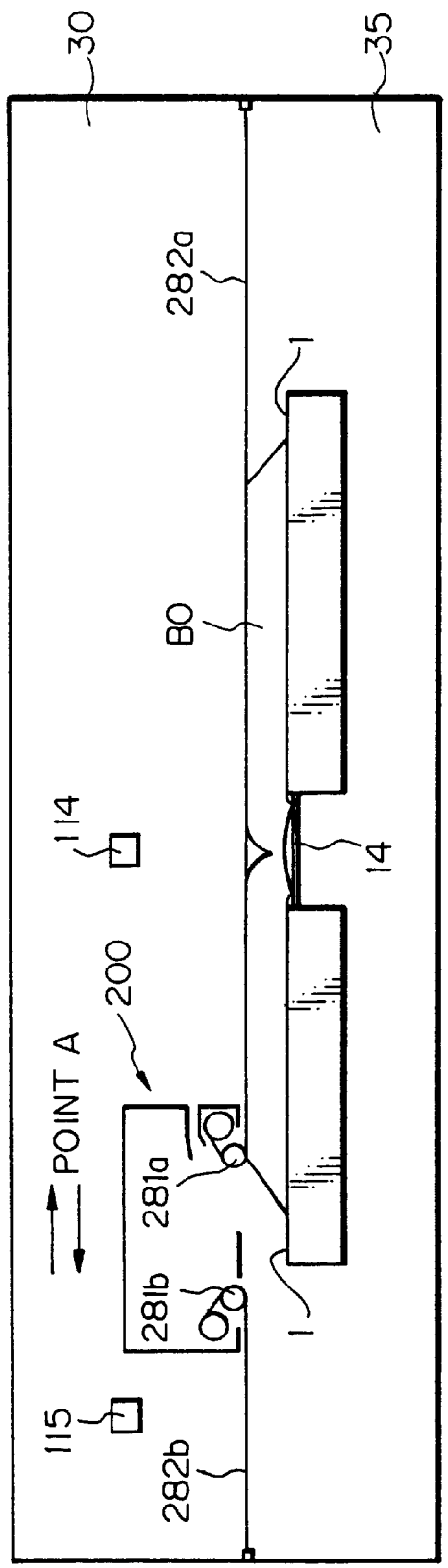
Figure 55:
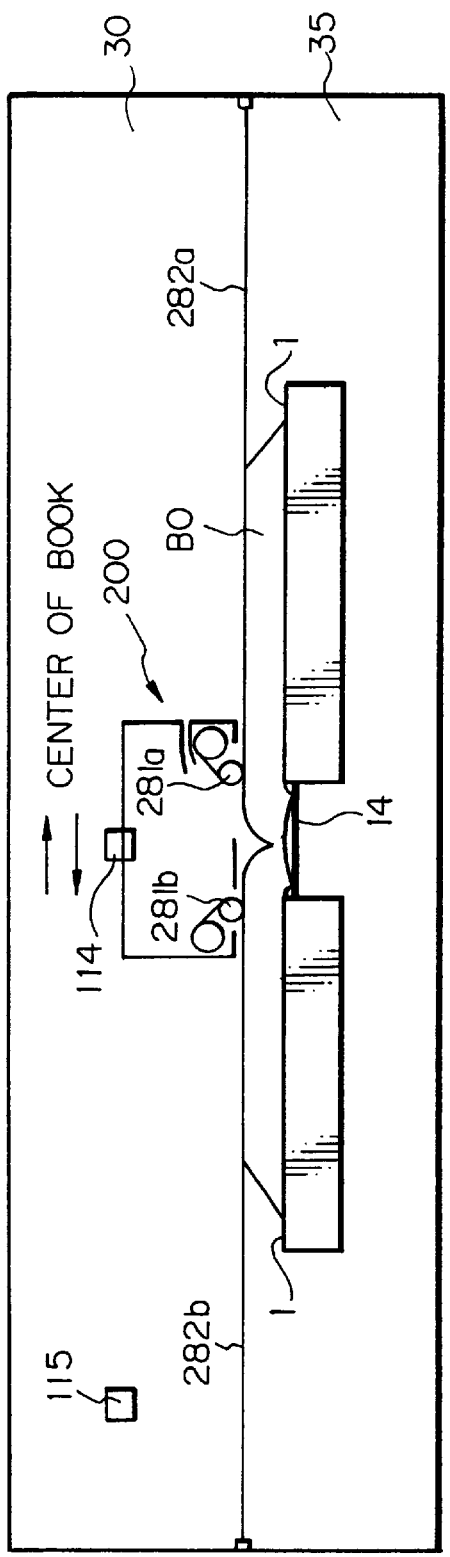

A table press and fix mode particular to the illustrative embodiment is as follows. When the operation of the scanning unit 200 ends in the book mode, the unit 200 is brought to its center home position shown in FIG. 34. The scanning unit 200 is therefore held in the center home position also when the book BO is to be set on the unit 200. Because the book BO is set by using the center of the scanner as a reference, locating the scanning unit 200 at the above home position at the time of setting of the book BO is successful to surely press a book of any size when the tables 1 of the table unit 35 slid into the apparatus body are raised. At the beginning of this mode operation, the center HP sensor again determines whether or not the scanning unit 200 is held a the center home position. The scanning unit 200 moves to the left from the center home position and then stops on reaching the end home position (see FIG. 54) where the end HP sensor is located.

Figure 58:
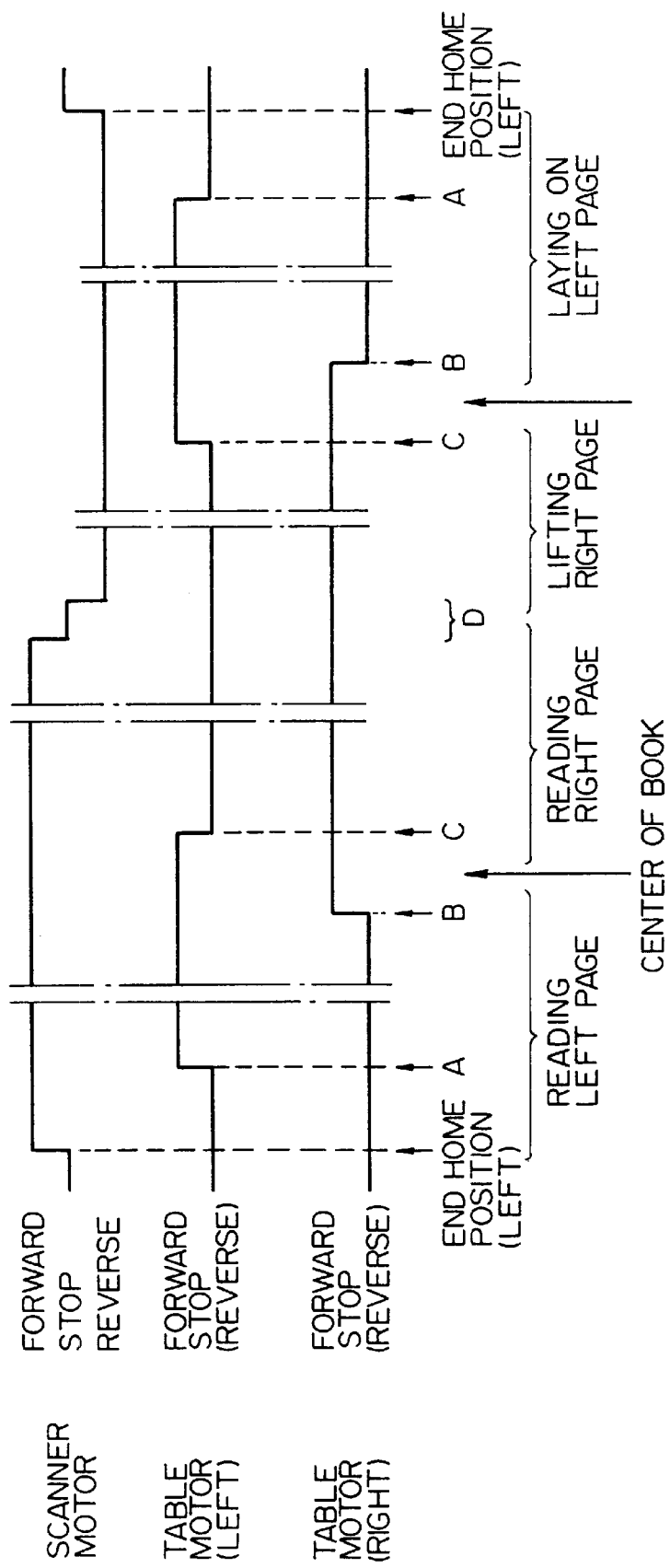
FIG. 58 is a timing chart demonstrating the operation of the scanning unit of the alternative embodiment.

FIGS. 53–57 show the consecutive positions of the scanning unit 200 to occur in the table press and fix mode while FIG. 58 demonstrates them in a timing chart. The end home position of the scanning unit 200 (see FIG. 53) is the point where the unit 200 starts its image reading and page turning operation and ends it. At the end home position, the scanning unit 200 does not overly the tables 1. In this condition, the two table motors 6 1 are not energized, maintaining the associated tables 1 stationary.

Figure 53:
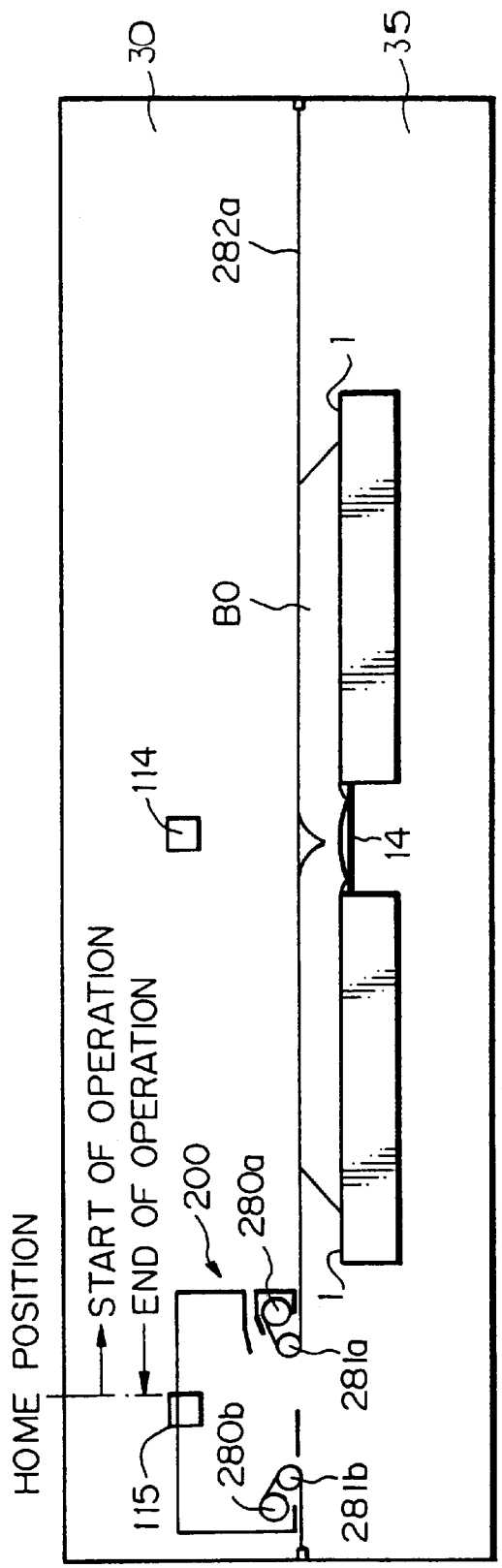
FIGS. 53–57 each shows the scanning unit of the alternative embodiment at a particular position.

The press and fix mode operation begins with the step of driving the scanner motor 106 in the forward direction and thereby moving the scanning unit 200 to the right, as viewed in FIG. 53. When the right press roller 281a of the scanning unit 200 arrives at the left edge of the spread book BO (point A shown in FIG. 54), the left table motor 61 is caused to rotate forward so as to press the left table 1, i.e., the book BO against the scanning unit 200. In this condition, the scanning unit 200 is capable of reading the book BO in the optimal condition.

Just before the scanning unit 200 reaches the center point of the book (see FIG. 55), the right press roller 281a aligns with the left edge of the right table 1 (point B shown in FIG. 58). At this time, the right table motor 61 is rotated forward so as to press the right table 1 against the scanning unit 200 with the intermediary of the book BO. The scanning unit 200 moves away from the center point of the book BO and starts reading the right page of the book BO. When the left press roller 281b aligns with the right edge of the left table 1 (point C shown in FIG. 58), the left table motor 61 is deenergized with the result that the left table 1 is locked in position. Consequently, the book BO is fixed in place and pressed by the press sheet 282b without protruding into the scanner unit 30. The book BO therefore waits until the next passage of the scanning unit 200 while remaining at the same level or height.

Figure 56:
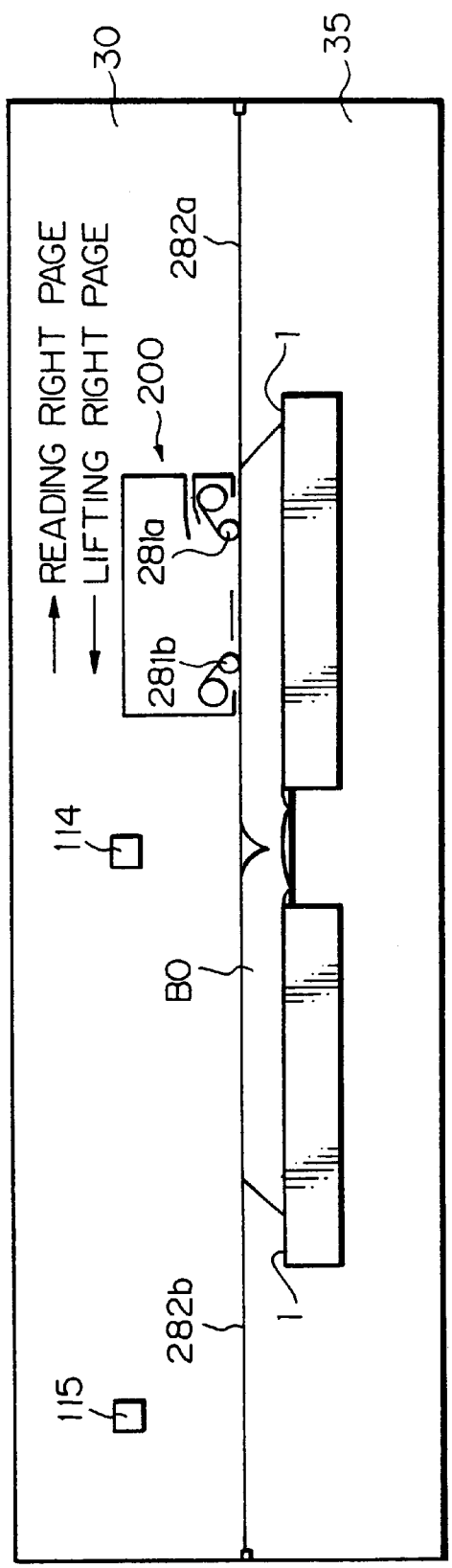
Figure 57:
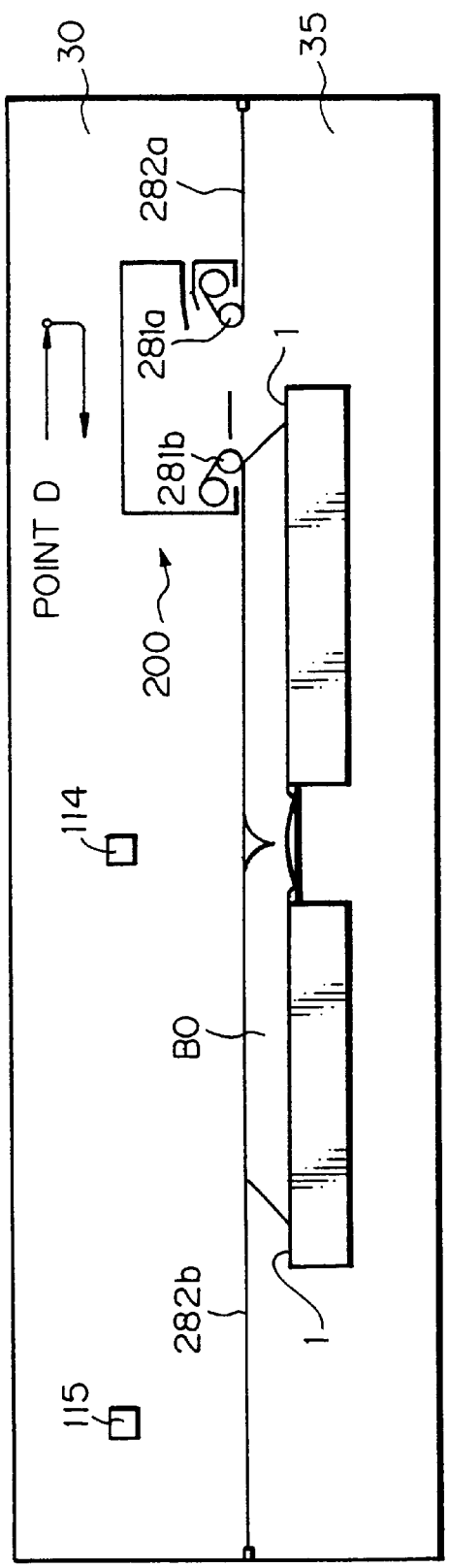

FIG. 56 shows the position of the scanning unit 200 reading the right page of the book BO or turning over the right page of the same. On fully reading the right page of the book BO, the scanning unit 300 is brought to a stop when the left press roller 282b aligns with the right edge of the right table 1 (point D shown in FIG. 57). Then, the scanner motor 106 is reversed in order to move the scanning unit 200 to the left. The scanning unit 200 moves to the left while lifting the right page of the book BO. Just before the scanning unit 200 reaches the center point, FIG. 55, of the book BO, the left press roller 28 1b aligns with the right edge of the left table 1 (point C). At this time, the left table motor 61 is rotated forward in order to bring the left table 1 to the pressing position.

The scanning unit 200 moved away from the center point starts laying the lifted right page on the left page. When the right press roller 281a aligns with the left edge of the right table (point B), the right table motor 61 is deenergized so as to lock the right table 1. The book BO is fixed in place and pressed by the press sheet 282a without protruding into the scanner unit 30. The book BO therefore waits until the next passage of the scanning unit 200 while remaining at the same level or height.

The scanning unit 200 moves further to the left while laying the right page on the left page. After the right page has been laid flat on the left page, the right press roller 281a arrives at the left edge of the left table 1 (point A, FIG. 54). Then, the left table motor 61 is deenergized so as to lock the left table 1. The book BO is fixed in place and pressed by the press sheet 282b without protruding into the scanner unit 30. The book BO therefore waits until the next passage of the scanning unit 200 while remaining at the same level or height. The scanning unit 200 stops on reaching the end home position (see FIG. 53).

A mechanism for allowing the table unit 35 to be drawn out of the scanner unit 30 will be described hereinafter. As shown in FIGS. 34 and 51, slide rails 300 are mounted on the right and left sides of the table unit 35 and respectively connected to rail brackets 301 disposed in the scanner unit 30. The slide rails 300 are slidable in the front-and-rear direction of the apparatus body. So long as the table unit 35 is set in the scanner unit 30, a locking device 302 shown in FIG. 51 locks the table unit 35 to the scanner unit 30 unless it receives a particular command, preventing the operator from pulling out the table unit 35. This condition is sensed by a lock sensor 320. The slide rails 300 are extendable such that the table unit 35 can be sufficiently pulled out from the front of the apparatus body. An open/close switch 303 and a knob, not shown, for facilitating the pull-out of the table unit 35 are mounted on the front end of the table unit 35.

To set a book on the tables 1, the operator presses the open/close switch 303 after confirming that the book mode is set up on the operation panel 99. If the book mode is not set up, the operator presses the book mode switch provided on the operation panel 99. In any case, if the tables 1 are not held in the lowered or retracted positions, the procedure for retracting them is executed. If the scanning unit 200 is not held at the center home position, the procedure for moving it to the center home position is executed.

If the scanning unit 200 is held at the center home position, the locking device 302 is deenergized to allow the operator to draw out the table unit 35. At this instant, a message showing the operator that the table unit 35 can be pulled out appears on the operation panel 99. The operator pulls the table unit 35 toward the front of the apparatus body by gripping the knob. Then, the operator releases the catches 15 of the right and left press plates 14 from the stops 16 and lifts the front ends of the press plates 14 so as to uncover the tables 1 (see FIG. 43).

In the above condition, the operator places the front and rear covers of the book BO on the two tables 1 while positioning the book BO in the previously stated manner. Then, the operator turns down the press plates 14 so as to sandwich the front and rear covers between the press plates 14 and the tables 1 facing them, and locks the catches 15 to the stops 16 (see FIG. 44).

Subsequently, the operator opens the book BO at a desired page to copy first and then pushes the table unit 35 into the scanner unit 30 while pressing the bound portion of the spread book BO with one hand. When the lock sensor 320 senses the table unit 35 set in the scanner unit 30 by the operator, the locking device 302 again locks the table unit 35 at a preselected position. Thereafter, the two motors 61 are driven to raise the tables 1 until the book BO reaches the preselected reading position.

The above embodiment is practicable with the read processing means 408, bound portion correcting means 409, write processing means 410 and printer 411 stated earlier. In a book mode, image data read out of the image reading board 101 are sequentially processed by the correcting means 409 and write processing means 410 and then input to the printer 411.

In summary, it will be seen that the present invention provides an image processing device capable of accurately detecting the bound portion of a spread document by recognizing the configuration of the bound portion on the basis of a read image. The device can therefore accurately correct the distortion of an image representative of the bound portion without resorting to a range finding sensor or similar special sensing means. Moreover, the device is capable of restoring a curved document to a flat document by image processing based on the recognition of the configuration of the bound portion.

Various modifications will become possible for those skilled in the art after receiving the teachings of the present disclosure without departing from the scope thereof.

What is claimed is:

1. An image processing device comprising:
a glass platen configured to contact a spread book in an area of the spread book containing an image for processing by the image processing device;
reading means for reading said image of the spread book;
recognizing means for recognizing a configuration of the spread book based on the image read from the reading means;
separating means for separating, based on data output from said reading means, a bound portion of the spread book between page portions; and
correcting means for correcting, based on the configuration of the spread book recognized, a curvature distortion of an image representative of the bound portion of said spread book by performing an image shift in a main and sub-scanning direction.

2. An image processing device as claimed in claim 1, wherein said separating means comprises:
detecting means for detecting positions in the image of the spread book for separating the bound portion; and
limiting means for limiting a range over which said detecting means searches for the positions for separating the bound portion.

3. An image processing device as claimed in claim 1, further comprising:
sensing means for sensing a size of the spread book; and
calculating means for calculating a position of the bound portion on the basis of the size sensed by said sensing means;
said separating means detecting, based on the data output from said sensing means, a bound region of the spread book in a preselected range around the position calculated by said calculating means, and separating said bound region as the bound portion.

4. An image processing device as claimed in claim 3, wherein the preselected range in which said separating means searches for the bound region is determined in accordance with a depth of the bound portion.

5. An image processing device as claimed in claim 3, wherein the preselected range in which said separating means searches for the bound region is a range which allows a configuration of a maximum bound region applicable to image processing of the spread book to be detected.

6. An image processing device as claimed in claim 3, wherein the preselected range in which said separating means searches for the bound region extends over a same width on a right and a left page of the spread book at both sides of said calculated position of the bound portion.

7. An image processing device comprising:
a glass platen configured to contact a spread book in an area of the spread book containing an image for processing by the image processing device;

reading means for reading said image of the spread book;

boundary reading means for reading a page boundary of the spread book based on the image read from the reading means;

page boundary recognizing means for recognizing, based on read data output from said boundary reading means, a configuration of the page boundary;

book recognizing means for recognizing a configuration of the spread book on the basis of the configuration recognized by said page boundary recognizing means; and correcting means for correcting, based on the configuration of the spread book recognized, a curvature distortion of an image representative of the bound portion of said spread book by performing an image shift in a main and sub-scanning direction.

8. An image processing device as claimed in claim 7, wherein said page boundary recognizing means selects a particular adaptive threshold for each of a plurality of read lines on the basis of, among image density data of said read lines which are perpendicular to a line above or below the page boundary of the spread book, pixel data at a high density side and pixel data at a low density side, and calculates a position of said page boundary by use of data representative of a page.

9. An image processing device as claimed in claim 8, wherein the adaptive threshold comprises read line data dividing the density data at the high density side and the density data at the low density side in a ratio of 1:2.

10. An image processing device as claimed in claim 8, wherein said page boundary recognizing means compares, read line by read line, image density data with the adaptive threshold over a preselected range to thereby calculate the position of the page boundary by use of the data representative of the page.

11. An image processing device as claimed in claim 10, wherein said book recognizing means limits a variation of a depth of the bound portion in accordance with a depth of a current position of said bound portion.

12. An image processing device as claimed in claim 7, wherein said page boundary recognizing means compares the image density data of each of a plurality of read lines perpendicular to a line above or below the page boundary of the spread book with a threshold, reads a density distribution by linear interpolation out of nearby pixels adjoining each other at a point where said threshold occurs, and calculates the position of the page boundary with a unit smaller than a minimum pixel.

13. An image processing device as claimed in claim 11, wherein said book recognizing means limits a variation of a depth of the bound portion to $\frac{1}{80}$ of a depth of said bound portion at a current position.

14. An image processing device as claimed in claim 7, wherein said page boundary recognizing means produces a moving average of image density data of each of a plurality of read lines perpendicular to a line above or below the page boundary of the spread book, compares the density data subjected to moving average processing with a threshold, and calculates the position of the page boundary by use of data representative of a page.

15. An image processing device as claimed in claim 7, wherein said page boundary recognizing means produces a moving average of image density data of each of a plurality of read lines perpendicular to a line above or below the page boundary of the spread book, determines a particular adaptive threshold for each read line on the basis of a preselected ratio between, among the density data subjected to moving average processing, pixel data at a high density side and pixel data at a low density side, and determines, when a plurality of pixel data above said threshold continuously appear, that the page boundary is reached.

16. An image processing device as claimed in claim 7, wherein said page boundary recognizing means determines a particular adaptive threshold for each of a plurality of read lines on the basis of a preselected ratio between, among the image density data on said read lines which are perpendicular to a line above or below the page boundary of the spread book, pixel data at a high density side and pixel data at a low density side, and calculates the position of the page boundary in a range in which said pixel data at the high density side and the low density side have appeared.

17. An image processing device as claimed in claim 7, wherein said page boundary recognizing means produces a moving average of image density data of each of a plurality of read lines perpendicular to a line above or below the page boundary of the spread book, determines a particular adaptive threshold for each read line on the basis of a preselected ratio between, among the density data subjected to moving average processing, pixel data at a high density side and pixel data at a low density side, calculates the position of the page boundary in a range in which said pixel data at the high density side and the low density side have appeared, and determines the position of the page boundary by producing a moving average of data existing at the position calculated.

18. An image processing device as claimed in claim 7, wherein said page boundary recognizing means detemines a particular adaptive threshold for each of a plurality of read lines on the basis of a preselected ratio between, among the image density data on said read lines which are perpendicular to a line above or below the page boundary of the spread book, pixel data at a high density side and pixel data at a low density side, and calculates the position of the page boundary in a range in which said pixel data at the high density side and the low density side have appeared, but short of a range in which a page image region is detected.

19. An image processing device as claimed in claim 18, wherein said page boundary recognizing means detects a peak of the pixel data at the high density side, detects, based on said peak, the pixel data above a preselected level at the low density side, and identifies the page image region on detecting a pixel above said peak.

20. An image processing device as claimed in claim 7, wherein said book recognizing means calculates a depth T of the bound portion by using an equation:

$$T=P*A/(Ak-A)$$

where A denotes the page boundary position detected by said page boundary recognizing means, Ak denotes a position of an optical axis of said reading means and said page boundary reading means, and P denotes a focal distance.

21. An image processing device as claimed in claim 7, wherein said book recognizing means calculates a depth T of the bound portion by using an equation:

$$T=P*(A-Ka)/\{(Ak-A)-(A-Ka)\}$$

where A denotes a page boundary position detected by said page boundary recognizing means, Ak denotes a position of an optical axis of said reading means and said page boundary reading means, P denotes a focal distance P, and Ka denotes a position of a flat page portion.

22. An image processing device as claimed in claim 7, wherein said book recognizing means calculates a depth of the bound portion on the basis of a page boundary position detected by said page boundary detecting means, and limits a variation of said depth calculated.

23. An image processing device as claimed in claim 7, wherein said correcting means calculates a projection magnification Mm in a direction perpendicular to the page boundary of the spread book by using an equation:

Mm=(Ak−A)/(Ak−Ka)

where A denotes a page boundary position detected by said page boundary recognizing means, Ak denotes a position of an optical axis of said reading means and said page boundary reading means, and Ka denotes a position of a flat page portion, and extends image data output from said reading means by a magnification which is a reciprocal of said projection magnification Mm.

24. An image processing device as claimed in claim 7, wherein said correcting means calculates a projection magnification in a direction perpendicular to the page boundary of the spread book, and extends image data output from said reading means by said projection magnification, said image processing device further comprising optical axis position determining means for determining, based on a result of extension output from said correcting means, a position of an optical axis of said reading means and said page boundary reading means.

25. An image processing device as claimed in claim 7, further comprising optical axis position determining means for determining, in an optical axis position setting mode, positions of both sides of the spread book, determining a length of the bound portion and a length of a page portion on the basis of said positions, calculating a projection magnification in a direction perpendicular to the page boundary of the spread book on the basis of a ratio between said lengths, and determining a position of an optical axis of said reading means and said page boundary recognizing means on the basis of said projection magnification, a boundary position at one side of a flat page portion, and a page boundary position of the bound portion.

26. An image processing device as claimed in claim 25, wherein said correcting means further calculates a projection magnification Mm in a direction perpendicular to the page boundary of the spread book by using an equation:

Mm=(Ak−A)/(Ak−Ka)

where A denotes a page boundary position detected by said page boundary recognizing means, Ak denotes a position of an optical axis of said reading means and said page boundary reading means and determined in said optical axis position setting mode, and Ka denotes a position of a flat page portion, and extends the image data output from said reading means by a magnification which is a reciprocal of said projection magnification Mm.

27. An image processing device comprising:
a glass platen configured to contact a spread book in an area of the spread book containing an image for processing by the image processing device;
reading means for reading said image of the spread book;
separating means for separating a bound portion of the spread book based on the image read from the reading means;
book recognizing means for recognizing a configuration of the spread book; and
correcting means for correcting a curvature distortion of the image of the spread book in accordance with the configuration of said spread book recognized by performing an image shift in a main and sub-scanning direction.

28. An image processing device as claimed in claim 27, wherein said correcting means executes an image shift in a direction of a page boundary by correcting a page image of the spread book.

29. An image processing device as claimed in claim 28, wherein said correcting means executes the image shift by using page boundary position data with a resolution of less than 1 pixel.

30. An image processing device as claimed in claim 28, wherein said correcting means executes said image shift by a first execution, with an integer portion of an amount of pixels of the page boundary position data, of an image shift in a direction of the page boundary by address conversion, and a second execution, with a fraction portion, of an image shift in the direction of the page boundary by a cubic function convolution method.

31. An image processing device as claimed in claim 27, further comprising:
page boundary reading means for reading a page boundary of the spread book;
page boundary recognizing means for recognizing a configuration of the page boundary on the basis of data output from said page boundary reading means; and
identifying means for identifying the bound portion of the spread book on the basis of the configuration of the page boundary recognized.

32. An image processing device as claimed in claim 31, wherein said identifying means calculates inclinations and positions of a right or a left page of the spread book on the basis of position data representative of, among position data output from said page boundary recognizing means at an associated page boundary, two spaced points.

33. An image processing device as claimed in claim 32, wherein the position data representative of the two spaced points comprise data representative of symmetrical positions of the right and left pages of the spread book.

34. An image processing device as claimed in claim 31, wherein said identifying means calculates inclinations and positions of straight portions at a boundary between a right and a left page of the spread book from position data output from said page boundary recognizing means by using a minimum square method.

35. An image processing device as claimed in claim 31, wherein said identifying means calculates straight portions at a boundary between a right and a left page of the spread book from position data output from said page boundary recognizing means, and identifies the bound portion if said bound portion is spaced from extensions of said straight portions by a preselected distance and does not further approach said extensions in a preselected range.

36. An image processing device as claimed in claim 35, wherein said preselected distance corresponds to four of pixels read.

37. An image processing device as claimed in claim 31, wherein a position lying between two spaced points on a respective right and a left page of the spread book which define the bound portion, and having a deepest depth in said bound portion is determined to be a boundary between the right and left pages of the spread book.

38. An image processing device as claimed in claim 31, wherein an amount of distortion of the bound portion is determined, in a range between two spaced points on a respective right and a left page of the spread book and which define the bound portion, on the basis of inclinations and positions of straight portions at the page boundary and position data output from said page boundary recognizing means.

39. An image processing device as claimed in claim 27, wherein said book recognizing means and said correcting means together produce a moving average of image density data representative of read lines perpendicular to a line above or below each page boundary of the spread book, determine a particular adaptive threshold for each line on the basis of a preselected ratio between pixel data at a high density side and pixel data at a low density side, detect the position of the page boundary in a range in which said pixel data at the high density side and the low density side have appeared, produce a moving average of data existing at the position calculated, and execute an image shift in a direction of the page boundary detected by using said data subjected to moving average processing.

40. An image processing device as claimed in claim 27, wherein said separating means, said book recognizing means and said correcting means separate the bound portion with respect to image processing, and extend an image of the bound portion in a main and a subscanning direction by use of boundary position data detected.

41. An image processing device as claimed in claim 27, wherein said separating means, said book recognizing means and said correcting means separate the bound portion, execute image correction with boundary position data of the bound portion, and execute particular image correction with each separated region to thereby provide boundary position data at separated points with uniformity.

42. An image processing device as claimed in claim 27, wherein said correcting means calculates image density data representative of lines corresponding to an integral number of pixels such that an image restored in a direction of the boundary has a length greater than one pixel.

43. An image processing device as claimed in claim 27, wherein said correcting means translates the configuration of the bound portion to a sequence of fine triangles and calculates an image length Ln on a single read line by using an equation:

$$Ln = \sqrt{1 + (T_n - T_{n-1})^2}$$

where T represents a depth of said bound portion, and determines a sum of the image lengths Ln to be an extended length of a page.

44. An image processing device as claimed in claim 27, wherein said correcting means calculates, in a direction of the boundary detected, a restored image by using a cubic function convolution method, while determining a pixel interval of a pixel being observed to be "1".

45. An image processing apparatus comprising:

a glass platen configured to contact a spread book in an area of the spread book containing an image for processing by the image processing device;

a reading device configured to read said image of the spread book;

a recognizing device configured to recognize a configuration of the spread book based on the image read from the reading device;

a separating device configured to separate a bound portion of the spread book based on data output from said reading device; and a correcting device configured to correct a curvature distortion of an image representative of the bound portion based on said configuration of the spread book by performing an image shift in a main and sub-scanning direction.

46. An image processing apparatus as claimed in claim 45, wherein said separating device comprises:

a detecting device configured to detect positions in the image of the spread book, said positions used in separating the bound portion; and a limiting device configured to limit a range over which the detecting device searches for the positions.

47. An image processing apparatus as claimed in claim 45, further comprising:

a sensing device configured to sense a size of the spread book; and a calculating device configured to calculate a position of the bound portion on the basis of a size sensed by said sensing device;

said separating device also configured to detect, based on the data output from said sensing device, a bound region of the spread book in a preselected range around the position calculated by said calculating device, and to separate said bound region.

48. An image processing apparatus comprising:

a glass platen configured to contact a spread book in an area of the spread book containing an image for processing by the image processing device;

a reading device configured to read said image of the spread book;

a boundary reading device configured to read a page boundary of the spread book based on the image read from the reading device;

a page boundary recognizing device configured to recognize a configuration of the page boundary based on read data output from said boundary reading device;

a book recognizing device configured to recognize a configuration of the spread book on the basis of the configuration recognized by said page boundary recognizing device; and a correcting device configured to correct a curvature distortion of an image representative of a bound portion of said spread book based on the configuration of the spread book by performing an image shift in a main and sub-scanning direction.

49. An image processing device as claimed in claim 48, further comprising:

an optical axis position determining device configured to determine, in an optical axis position setting mode, positions of opposing sides of the spread book, to determine a length of the bound portion and a length of a page portion on the basis of said positions, to calculate a projection magnification in a direction perpendicular to the page boundary of the spread book on the basis of a ratio between said lengths, to determine a position of an optical axis of said reading device and said page boundary recognizing device, to determine a boundary position at one side of a flat page portion on the basis of said projection magnification, and to determine a page boundary position of the bound portion.

50. An image processing apparatus comprising:

a glass platen configured to contact a spread book in an area of the spread book containing an image for processing by the image processing device;

a reading device configured to read said image of the spread book;

a separating device configured to separate a bound portion of the spread book with respect to image processing;

a book recognizing device configured to recognize a configuration of the spread book based on the image read from the reading device; and a correcting device configured to correct a curvature distortion of the bound portion of the image of the spread book in accordance with the recognized configuration of said spread book by performing an image shift in a main and sub-scanning direction.

51. An image processing apparatus as claimed in claim 50, further comprising:

a page boundary reading device configured to read a page boundary of the spread book;

a page boundary recognizing device configured to recognize a configuration of the page boundary on the basis of data output from said page boundary reading device; and an identifying device configured to identify the bound portion of the spread book on the basis of the recognized con figuration of the page boundary.

* * * * *